US011899528B2

(12) United States Patent
Harutyunyan et al.

(10) Patent No.: US 11,899,528 B2
(45) Date of Patent: Feb. 13, 2024

(54) METHODS AND SYSTEMS FOR IDENTIFYING AND RESOLVING ROOT CAUSES OF PERFORMANCE PROBLEMS IN DATA CENTER OBJECT

(71) Applicant: VMware LLC, Palo Alto, CA (US)

(72) Inventors: Ashot Nshan Harutyunyan, Yerevan (AM); Arnak Poghosyan, Yerevan (AM); Naira Movses Grigoryan, Yerevan (AM)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/683,601

(22) Filed: Mar. 1, 2022

(65) Prior Publication Data
US 2023/0281070 A1 Sep. 7, 2023

(51) Int. Cl.
*G06F 11/07* (2006.01)
*G06N 20/00* (2019.01)
*G06F 11/30* (2006.01)
*G06F 18/214* (2023.01)

(52) U.S. Cl.
CPC ........ *G06F 11/079* (2013.01); *G06F 11/3006* (2013.01); *G06F 18/214* (2023.01); *G06N 20/00* (2019.01)

(58) Field of Classification Search
CPC .... G06F 11/079; G06F 11/3006; G06N 20/00
See application file for complete search history.

(56) References Cited

U.S. PATENT DOCUMENTS

| 10,515,469 | B2 * | 12/2019 | Fletcher | G06T 11/206 |
| 11,403,207 | B2 * | 8/2022 | Miller | G06F 8/43 |
| 2021/0304091 | A1 * | 9/2021 | Paluch | G06F 16/283 |

* cited by examiner

Primary Examiner — Nadeem Iqbal
(74) *Attorney, Agent, or Firm* — Quarles & Brady LLP

(57) ABSTRACT

Automated methods and systems for identifying and resolving performance problems of objects of a data center are described. The automated methods and systems construct a model for identifying objects of the datacenter that are experiencing performance problems based on baseline distributions of events of the objects in a historical time period and event distributions of events of the objects in a time window located outside the historical time period. A root causes and recommendations database is constructed for resolving performance problems based on remedial measures previously performed for resolving performance problems. The model is used to monitor the objects of data center for runtime performance problems. When a performance problem with an object is detected, the root causes and recommendations database is used to identify a root cause of the performance problem and generate a recommendation for resolving the performance problem in near real time.

21 Claims, 47 Drawing Sheets

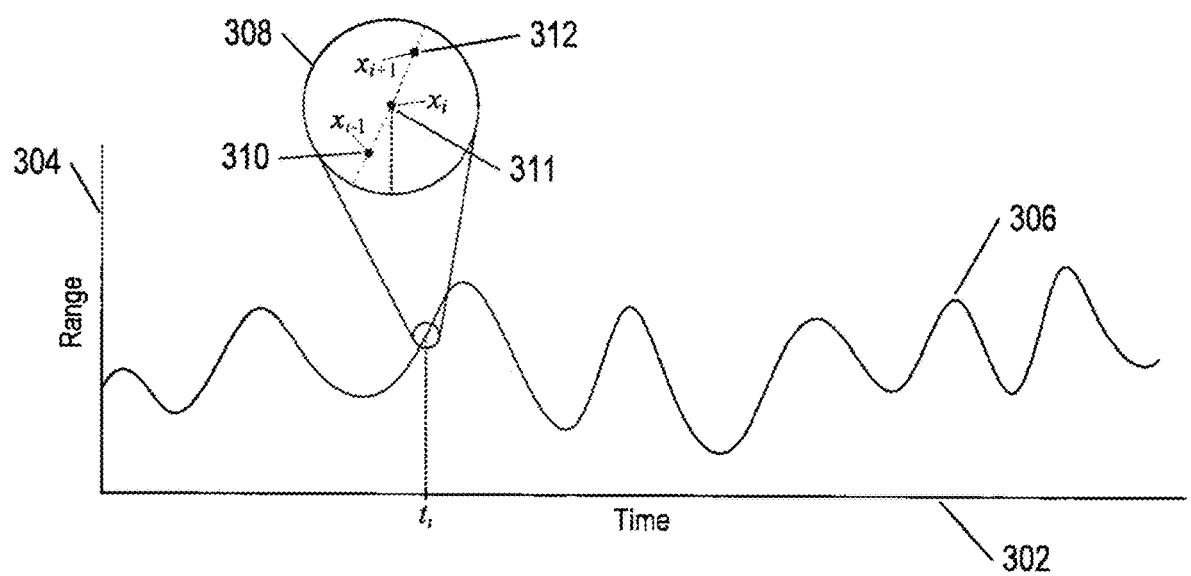
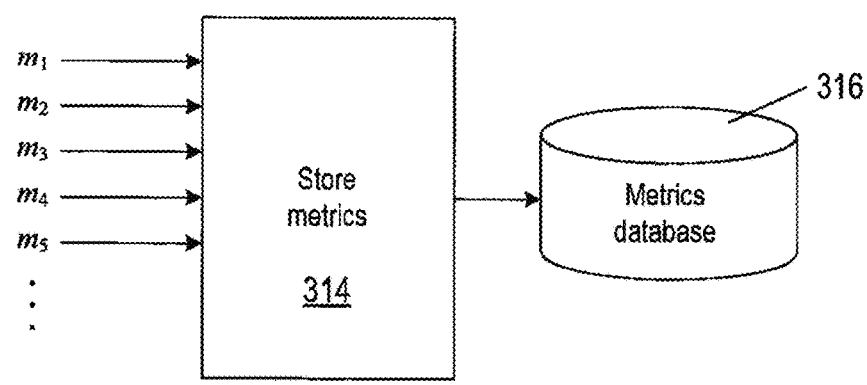
FIG.3

```
log.write([$Time_date] [Thread-$X/$IP/INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[$Time_date] Repair session $RS for range $range finished)
```
⟵ 604  ⟵ 605  ⟵ 606  ⟵ 608  ⟵ 610  ⟵ 602

FIG. 6

```
[2019-03-10 23:43:36.859+0000] [Thread-1822496/127.0.0.1 INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[2015-03-10 23:43:36,716] Repair session 51312720-c77e-11e4-ad72-4769d614a3f2 for range
(-6899937477772353537626, -6896547230076663429) finished]
```
⟵ 704  ⟵ 705  ⟵ 706  ⟵ 702

FIG. 7

```
                                          ← 802
       ╱808    ╱810    ⋮    ╱812
┌──────────────────────────────────────────┐
│ 2021-12-02T10:44:24.095Z li-qe-esx5.vmware.com Rhttpproxy: │ ← 804
│ [28959B90 verbose 'Proxy Req 46691'] Connected to          │
│ localhost:8307                        ╲806                 │
├──────────────────────────────────────────┤
│ 2021-12-02T10:44:24.094Z li-qe-esx5.vmware.com Rhttpproxy: │
│ [FFFC2B90 verbose 'Proxy Req 46691'] new proxy client      │
│ TCP (local=127.0.0.1:80, peer=127.0.0.1:50155)             │
├──────────────────────────────────────────┤
│ 2021-12-02T10:44:24.093Z li-qe-esx5.vmware.com Rhttpproxy: │
│ [2889B90 verbose 'Proxy Req 46685'] The client closed the  │
│ stream, not unexpectedly.                                  │
├──────────────────────────────────────────┤
│ Dec  2 18:48:29 strata-vc 2021-12-02T18:48:30.273Z         │
│ [7FA39448B700 info 'commonvpxLro' opID=1947d6f9] [VpxLRO]  │
│ -- FINISH task-internal-2163522 -- -- vim.SessionManager.logout -│
├──────────────────────────────────────────┤
│ 2021-12-02T18:48:51.396Z strata-esx1.eng.vmware.com Vpxa:  │
│ [65B5AB90 verbose 'VpxaHalCnxHostagent' opID=WFU-ed393333] │
│ [WaitForUpdatesDone] Completed callback                    │
├──────────────────────────────────────────┤
│ 2021-12-02T18:48:51.395Z strata-esx1.eng.vmware.com Vpxa:  │
│ [65B5AB90 verbose 'VpxaHalCnxHostagent' opID=WFU-ed393333] │
│ [WaitForUpdatesDone] Starting next WaitForUpdates() call to│
│ hostd                                                      │
├──────────────────────────────────────────┤
│ 2021-12-02T18:48:51.395Z strata-esx1.eng.vmware.com Vpxa:  │
│ [65B5AB90 verbose 'vpxavpxaInvtVm' opID=WFU-ed393333]      │
│ [VpxaInvtVmChangeListener] Guest DiskInfo Changed          │
├──────────────────────────────────────────┤
│ 2021-12-02T18:48:51.395Z strata-esx1.eng.vmware.com Vpxa:  │
│ [65B5AB90 verbose 'vpxavpxaInvtVm' opID=WFU-ed393333]      │
│ [VpxaInvtVmChangeListener] Guest DiskInfo Changed          │
└──────────────────────────────────────────┘
                    ⋮
```

FIG. 8

| Grok pattern — 932 | Regular Expression (Regex) — 934 |
|---|---|
| INT | `(?:[+-]?(?:[0-9]+))` |
| POSINT | `\b(?:[1-9][0-9]*)\b]` |
| BASE10NUM | `(?<![0-9.+-])(?>[+-]?(?:(?:[0-9]+(?:\.[0-9]+)?)|(?:\.[0-9]+)))` |
| USERNAME — 936 | `[a-zA-Z0-9._-]+` —— 938 |
| YEAR | `(?>\d\d){1,2}` |
| MONTH | `b(?:Jan(?:uary)?|Feb(?:ruary)?|Mar(?:ch)?|Apr(?:il)?|May|Jun(?:e)?|Jul(?:y)?|Aug(?:ust)?|Sep(?:tember)?|Oct(?:ober)?|Nov(?:ember)?|Dec(?:ember)?)\b` |
| MONTHNUM | `(?:0?[1-9]|1[0-2])` |
| DAY | `(?:Mon(?:day)?|Tue(?:sday)?|Wed(?:nesday)?|Thu(?:rsday)?|Fri(?:day)?|Sat(?:urday)?|Sun(?:day)?)` |
| HOUR | `(?:2[0123]|[01]?[0-9])` |
| MINUTE | `(?:[0-5][0-9])` |
| SECOND | `(?:(?:[0-5][0-9]|60)(?:[:.,][0-9]+)?)` |
| EMAILLOCALPART | `[a-zA-Z][a-zA-Z0-9_.+-=:]+` |
| IPV4 | `(?<![0-9])(?:(?:25[0-5]|2[0-4][0-9]|[0-1]?[0-9]{1,2})[.](?:25[0-5]|2[0-4][0-9]|[0-1]?[0-9]{1,2})[.](?:25[0-5]|2[0-4][0-9]|[0-1]?[0-9]{1,2})[.](?:25[0-5]|2[0-4][0-9]|[0-1]?[0-9]{1,2}))(?![0-9])` |
| HOSTNAME — 940 | `\b(?:[0-9A-Za-z][0-9A-Za-z-]{0,62})(?:\.(?:[0-9A-Za-z][0-9A-Za-z-]{0,62}))*(\.?|\b)` — 942 |
| SPACE | `\s*` |

FIG. 9B

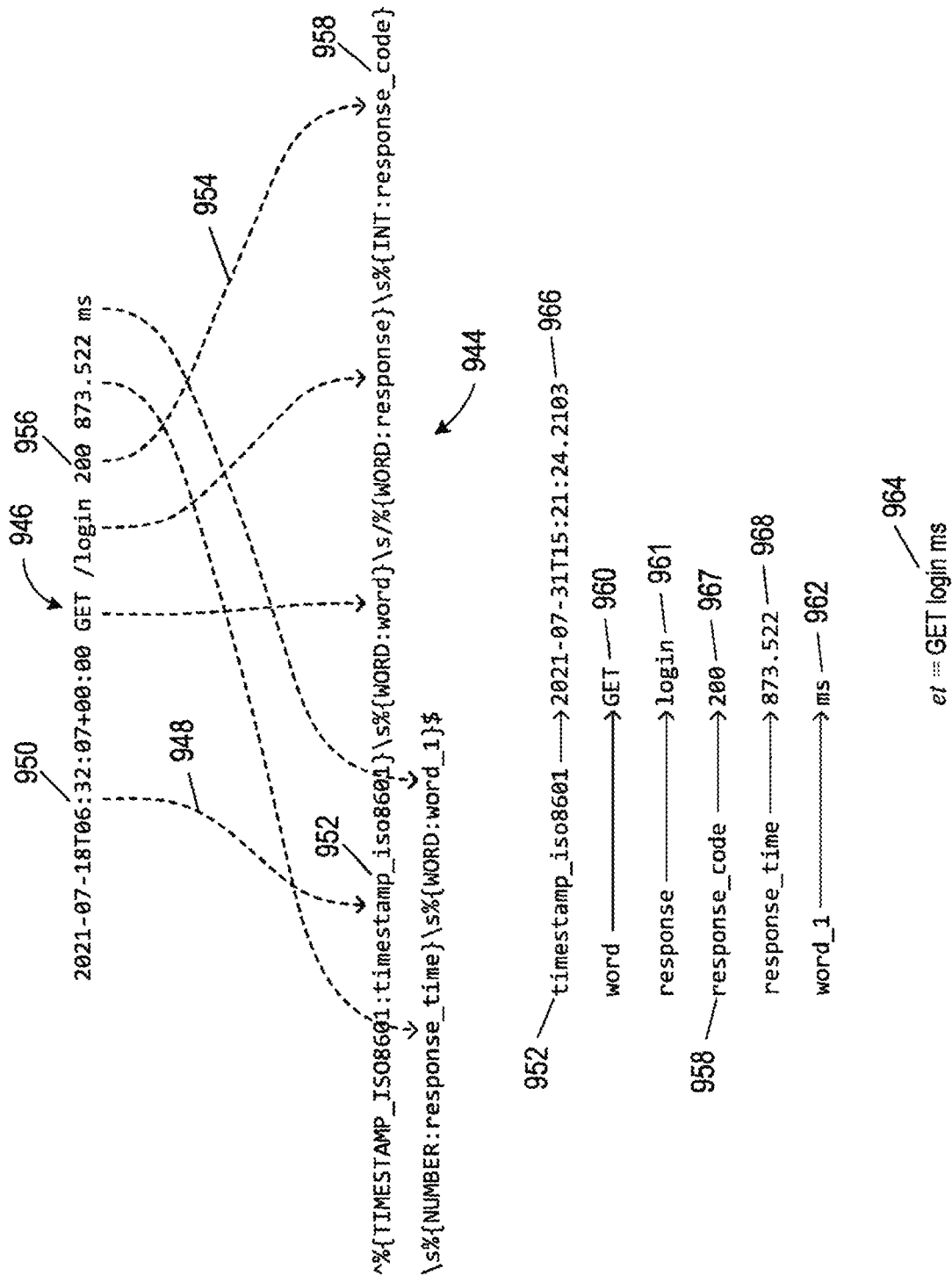

|  | $P_1^o$ | $P_2^o$ | $P_3^o$ | $P_4^o$ | $P_5^o$ | $P_6^o$ | $P_7^o$ |
|---|---|---|---|---|---|---|---|
| $P_1^o$ | 0 | .5 | .42 | 1 | .25 | .625 | .375 |
| $P_2^o$ |  | 0 | .704 | .834 | .667 | .2 | .777 |
| $P_3^o$ |  |  | 0 | 1 | .429 | .667 | .333 |
| $P_4^o$ |  |  |  | 0 | 1 | .8 | .857 |
| $P_5^o$ |  |  |  |  | 0 | .767 | .375 |
| $P_6^o$ |  |  |  |  |  | 0 | .75 |
| $P_7^o$ |  |  |  |  |  |  | 0 |

|  | $P_1^o$ | $(P_2^o, P_6^o)$ | $P_3^o$ | $P_4^o$ | $P_5^o$ | $P_7^o$ |
|---|---|---|---|---|---|---|
| $P_1^o$ | 0 | .5 | .42 | 1 | .25 | .375 |
| $(P_2^o, P_6^o)$ |  | 0 | .667 | .8 | .667 | .75 |
| $P_3^o$ |  |  | 0 | 1 | .429 | .333 |
| $P_4^o$ |  |  |  | 0 | 1 | .857 |
| $P_5^o$ |  |  |  |  | 0 | .375 |
| $P_7^o$ |  |  |  |  |  | 0 |

|  | $(P_1^{ro}, P_5^{ro})$ | $(P_2^o, P_6^o)$ | $P_3^o$ | $P_4^o$ | $P_7^o$ |
|---|---|---|---|---|---|
| $(P_1^o, P_5^o)$ | 0 | .5 | .42 | 1 | .375 ← 2010 |
| $(P_2^o, P_6^o)$ | 2008 → | 0 | .667 | .8 | .75 |
| $P_3^o$ |  |  | 0 | 1 | .333 — 2012 |
| $P_4^o$ |  |  |  | 0 | .857 |
| $P_7^o$ |  |  |  |  | 0 |

|  | $(P_1^o, P_5^o)$ | $(P_2^o, P_6^o)$ | $(P_3^o, P_7^o)$ | $P_4^o$ |
|---|---|---|---|---|
| $(P_1^o, P_5^o)$ | 0 | .5 | .375 | 1 |
| $(P_2^o, P_6^o)$ |  | 0 | .667 | .8 |
| $(P_3^o, P_7^o)$ |  |  | 0 | .857 |
| $P_4^{ro}$ |  |  |  | 0 |

$$\begin{array}{c|cc} & (P_1^o, P_5^o, P_3^o, P_7^o, P_2^o, P_6^o) & P_4^o \\ \hline (P_1^o, P_5^o, P_3^o, P_7^o, P_2^o, P_6^o) & 0 & .8 \\ P_4^o & & 0 \end{array}$$

METHODS AND SYSTEMS FOR IDENTIFYING AND RESOLVING ROOT CAUSES OF PERFORMANCE PROBLEMS IN DATA CENTER OBJECT

TECHNICAL FIELD

This disclosure is directed to identifying root causes of problems with objects of a data center.

BACKGROUND

Electronic computing has evolved from primitive, vacuum-tube-based computer systems, initially developed during the 1940s, to modern electronic computing systems in which large numbers of multi-processor computer systems are networked together with large-capacity data-storage devices and other electronic devices to produce geographically distributed data centers that provide enormous computational bandwidths and data-storage capacities. Data centers are made possible by advances in virtualization, computer networking, distributed operating systems, data-storage appliances, computer hardware, and software technologies. In recent years, an increasing number of businesses, governments, and other organizations rent data processing services and data storage space as data center tenants. Data center tenants conduct business and provide cloud services over the internet on software platforms that are maintained and run entirely in data centers, which reduces the cost of maintaining their own centralized computing networks and hosts.

Because data centers have an enormous number of computational resources and execute thousands of computer programs, various management tools have been developed to collect performance information, such as metrics and log messages, and aid systems administrators and data center tenants with detection of hardware and software performance problems. The metrics include CPU usage, memory usage, response time, and network metrics for tens of thousands of virtual and physical objects running in a data center. Log messages are unstructured or semi-structured time-stamped messages that record information about the state of an operating system, state of a program, state of a service, or state of computer hardware at a point in time. Typical management tools can generate an alert when a metric violates a threshold or when certain log messages that describe a problem are detected, thereby making systems administrators and data center tenants aware of a problem. However, typical management tools are not able to timely troubleshoot root causes of many types of problems from the information collected. For example, a management tool may generate an alert that identifies a problem with a program or piece of hardware running in the data center, but the root cause of the problem might actually be the result of a different problem occurring with hardware and/or software located elsewhere in the data center and is not identified in the alert.

Because typical management tools cannot identify the root cause of most problems occurring in a data center, the search for root causes of problems is performed by teams of engineers, such as a field engineering team, an escalation engineering team, and a research and development engineering team. Each team searches for a root cause of a problem by manually filtering metrics and log messages through different sub-teams. However, because of the enormous numbers of metrics and log messages, the troubleshooting process can take days and weeks, and in some cases months. Data center tenants cannot afford long periods of time spent sifting through metrics and log files for a root cause of a problem. Employing teams of engineers to spend days and weeks to search for a problem is expensive and error prone. Problems with a data center tenant's applications result in downtime or slow performance of their applications, which frustrates users, damages a brand name, causes lost revenue, and in many cases can deny people access to services provided by data center tenants. Systems administrators and data center tenants seek automated methods and systems that identify root causes of problems in a data center within hours or minutes and significantly reduce the reliance on teams of engineers to search for problems.

SUMMARY

This disclosure is directed to automated methods and systems for identifying and resolving performance problems of objects of a data center. The automated methods are executed by an operations management server that runs in a server computer of the data center. The operations management server uses machine learning to construct a model for identifying objects of the datacenter that are experiencing performance problems based on baseline distributions of events of the objects in a historical time period and event distributions of events of the objects in a time window located outside the historical time period. The operations management server constructs a root causes and recommendations database for resolving performance problems based on remedial measures previously used to resolve performance problems. The model is used by the operations management server to monitor the objects of data center for performance problems in runtime windows. When a performance problem with an object is detected, the operations management server uses the root causes and recommendations database to identify a root cause of the performance problem and generate a recommendation for resolving the performance problem in near real time. An alert is in a graphical user interface of a systems administrator or a data center tenant. The alert identifies the object, the root cause of the performance problem, and the recommendation for resolving the performance problem, thereby reducing the time to identifying the root cause of the performance problem and providing a recommendation for resolving the performance problem.

DESCRIPTION OF THE DRAWINGS

FIG. 3 shows a plot of an example of a metric.

FIG. 6 shows an example of a log write instruction.

FIG. 7 shows an example of a log message generated by the log write instruction in FIG. 6.

FIG. 8 shows a small, eight-entry portion of a log file.

FIG. 9B shows a table of examples primary Grok patterns and corresponding regular expressions.

FIG. 9C shows an example of a Grok expression used to extract tokens from a log message.

DETAILED DESCRIPTION

This disclosure presents automated methods and systems for identifying and resolving a performance problem with a data center object. Metrics, log messages, and traces associated with data center objects are described in a first subsection. Automated methods and system for identifying and resolving root causes of performance problems in data center objects are described in a second subsection.

Metrics, Log Messages, and Traces

Figure 1:
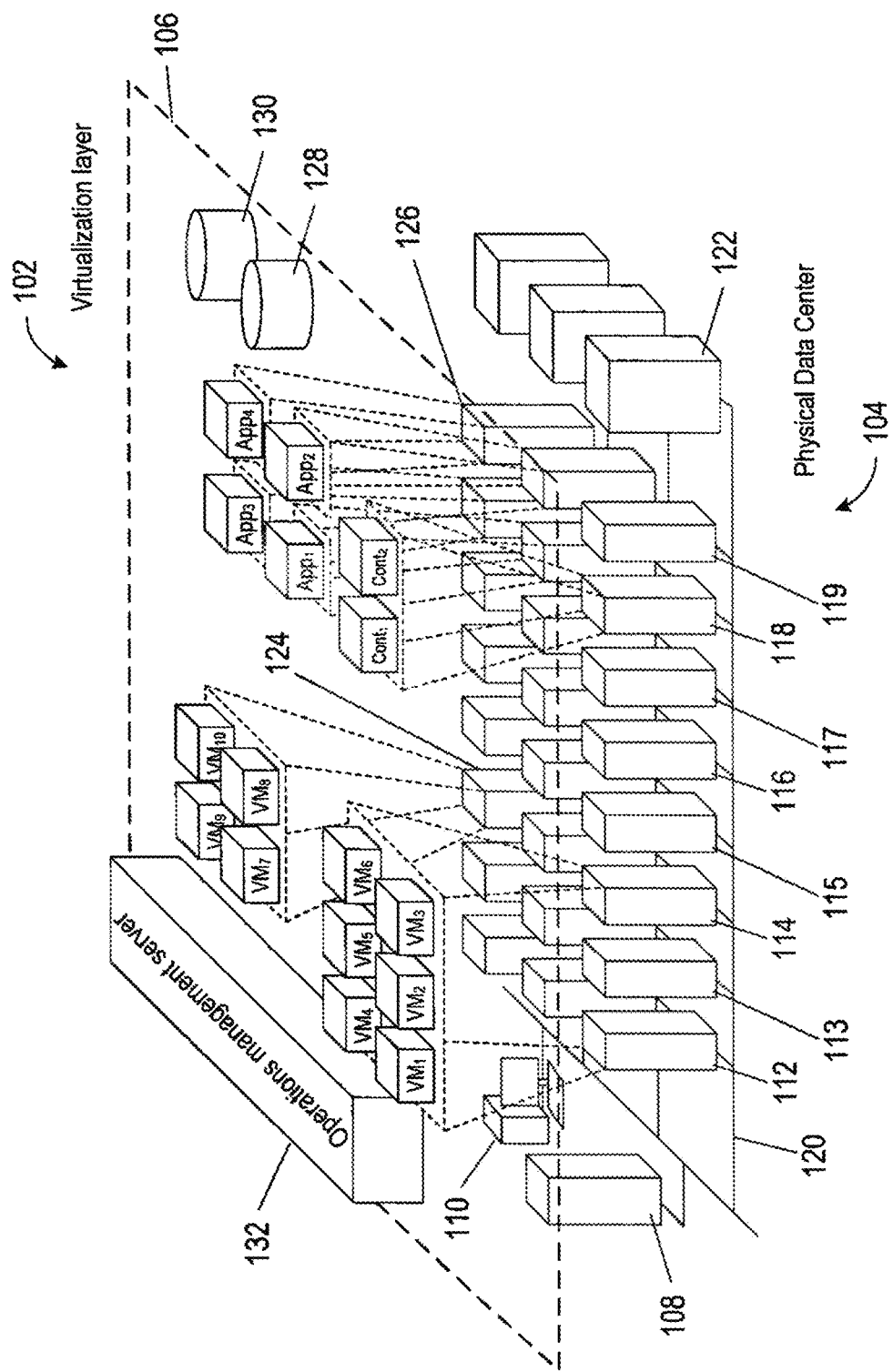
FIG. 1 shows an example of a virtualization layer located above a physical data center.

FIG. 1 shows an example of a virtualization layer 102 located above a physical data center 104. For the sake of illustration, the virtualization layer 102 is separated from the physical data center 104 by a virtual-interface plane 106. The physical data center 104 is an example of a distributed computing system. The physical data center 104 comprises physical objects, including an administration computer system 108, any of various computers, such as PC 110, on which an operations management interface may be displayed in a graphical user interface to system administrators and other users, server computers, such as server computers 112-119, data-storage devices, and network devices. The server computers may be networked together to form server-computer groups within the data center 104. The example physical data center 104 includes three server-computer groups each of which have eight server computers. For example, server-computer group 120 comprises interconnected server computers 112-119 that are connected to a mass-storage array 122. Within each server-computer group, certain server computers are grouped together to form a cluster that provides an aggregate set of resources (i.e., resource pool) to objects in the virtualization layer 102. Different physical data centers may include many different types of computers, networks, data-storage systems, and devices connected according to many different types of connection topologies.

The virtualization layer 102 includes virtual objects, such as virtual machines ("VMs"), applications, and containers, hosted by the server computers in the physical data center 104. A VM is a compute resource that uses software instead of a physical computer to run programs and deploy applications. One or more VMs run on a physical "host" server computer. Each VM runs its own operating system called a "guest operating system" and functions separately from the other VMs, even though the VMs may all be running on the same host. While VMs virtualize the hardware layer to create a virtual computing environment, a container contains a single program or application along with dependencies and containers share the same operating system. The virtualization layer 102 may also include a virtual network (not illustrated) of virtual switches, routers, load balancers formed from the physical switches, routers, and NICs of the physical data center 104. Certain server computers host VMs and containers as described above. For example, server computer 118 hosts two containers identified as $Cont_1$ and $Cont_2$; cluster of server computers 112-114 host six VMs identified as $VM_1$, $VM_2$, $VM_3$, $VM_4$, $VM_5$, and $VM_6$; server computer 124 hosts four VMs identified as $VM_7$, $VM_8$, $VM_9$, $VM_{10}$. Other server computers may host applications. For example, server computer 126 hosts an application identified as $App_4$.

The virtual-interface plane 106 abstracts the resources of the physical data center 104 to one or more VDCs comprising the virtual objects and one or more virtual data stores, such as virtual data stores 128 and 130. For example, one VDC may comprise the VMs running on server computer 124 and virtual data store 128. Automated methods and systems described herein are executed by an operations management server 132 in one or more VMs on the administration computer system 108. The operations management server 132 provides several interfaces, such as graphical user interfaces, for data center management, system administrators, and application owners. The operations management server 132 receives object information, such as streams of metric data, log messages, and traces from various physical and virtual objects of the data center described below.

Figure 2A:
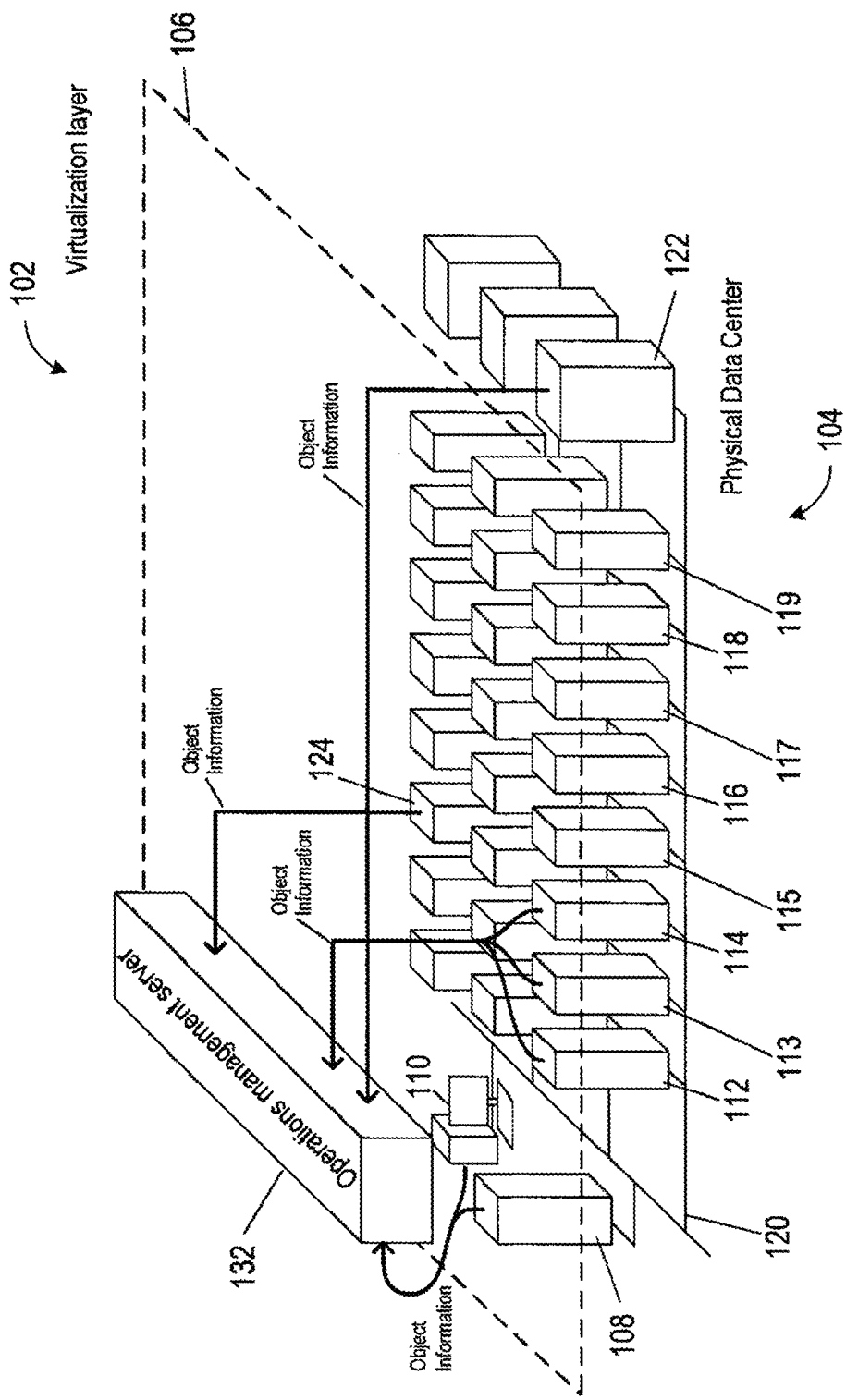
FIGS. 2A-2B shows an operations manager that receives object information from various physical and virtual objects.
Figure 2B:
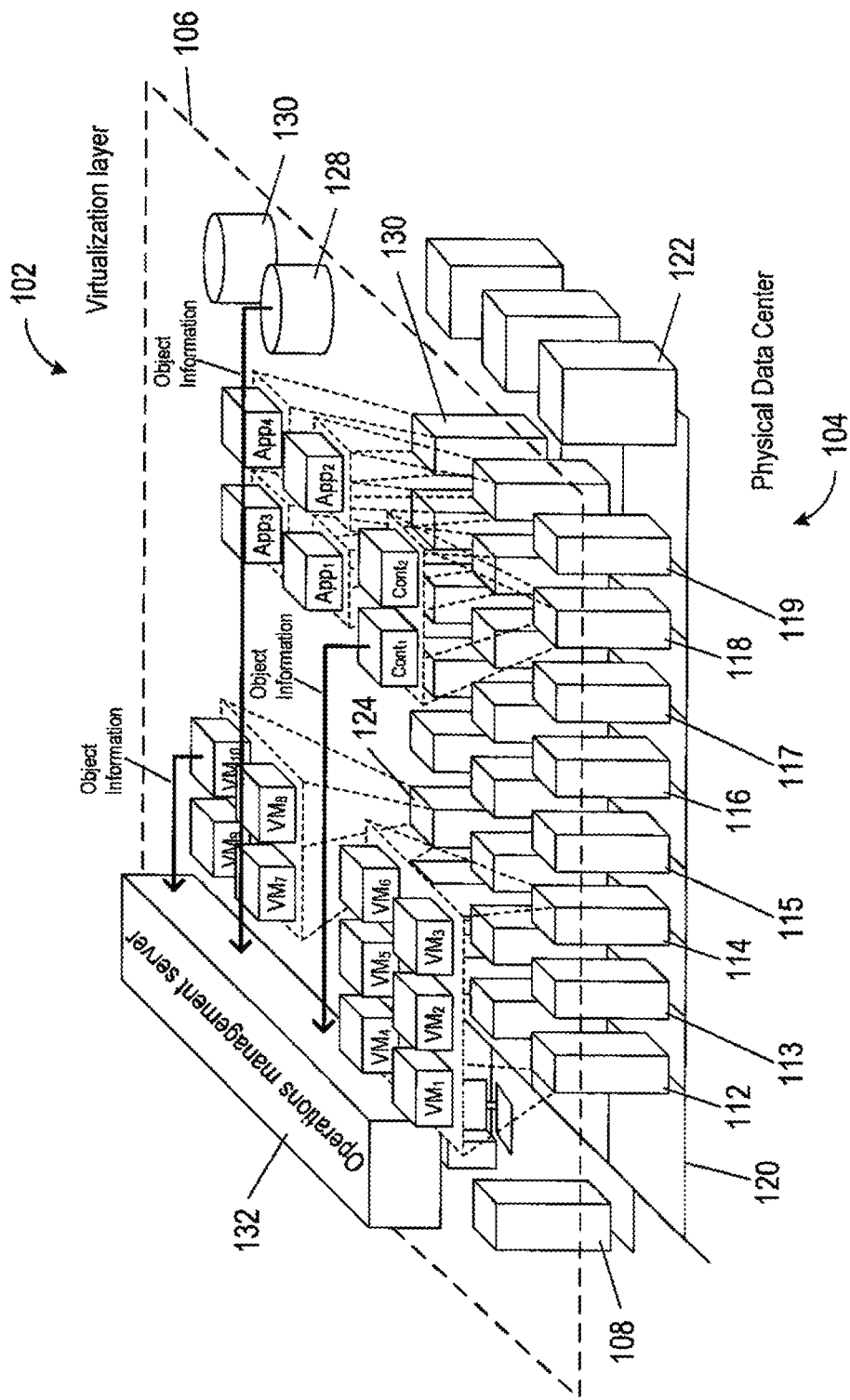

FIGS. 2A-2B show examples of the operations management server 132 receiving object information from various physical and virtual objects. Directional arrows represent object information sent from physical and virtual resources to the operations manager 132. In FIG. 2A, the operating systems of PC 110, server computers 108 and 124, and mass-storage array 122 send object information to the operations management server 132. A cluster of server computers 112-114 send object information to the operations management server 132. In FIG. 2B, the VMs, containers, applications, and virtual storage may independently send object information to the operations management server 132. Certain objects may send metrics as the object information is generated while other objects may only send object information at certain times or when requested to send object information by the operations management server 132. The operations management server 132 may be implemented in a VM to collect and processes the object information as described below to detect performance problems and generate recommendations to correct the performance problems. Depending on the type of the performance problem, recommendations include reconfiguring a virtual network of a VDC or migrating VMs from one server computer to another, powering down server computers, replacing VMs disabled by physical hardware problems and failures, spinning up cloned VMs on additional server computers to ensure that services provided by the VMs are accessible to increasing demand or when one of the VMs becomes compute or data-access bound.

The object information corresponds to a multidimensional space for measuring the performance of the objects of a data center. For example, each of the metrics corresponds to a different dimension in the space, change points in the log messages correspond to other dimensions of the space, and RED metrics correspond to still other dimensions of the space. The operations management server 132 detects events that are recorded in the object information and are associated with anomalous behavior of the objects, troubleshoots the performance problems, and generate recommendations for correcting the performance problems. Detection of events associated with metrics, log messages, traces, and RED metrics are described below.

Metrics

The operations management server 132 receives numerous streams of time-dependent metric data from objects in the data center. Each stream of metric data is time series data that may be generated by an operating system of an object, a resource utilized by the object, or by an object itself. A stream of metric data associated with a resource comprises a sequence of time-ordered metric values that are recorded in spaced points in time called "time stamps." A stream of metric data is simply called a "metric" and is denoted by $$m(x_i)_{i=1}^{N_m} = (x(t_i))_{i=1}^{N_m} \qquad (1)$$

where
$N_m$ is the number of metric values in the sequence;
$x_i = x(t_i)$ is a metric value;
$t_i$ is a time stamp indicating when the metric value was recorded in a data-storage device; and
subscript i is a time stamp index $i = 1, \ldots, N_m$.

FIG. 3 shows a plot of an example metric. Horizontal axis 302 represents time. Vertical axis 304 represents a range of metric value amplitudes. Curve 306 represents a metric as time series data. In practice, a metric comprises a sequence of discrete metric values in which each metric value is recorded in a data-storage device. FIG. 3 includes a magnified view 308 of three consecutive metric values represented by points. Each point represents an amplitude of the metric at a corresponding time stamp. For example, points 310-312 represent consecutive metric values (i.e., amplitudes) $x_{i-1}$, $x_i$, and $x_{i+1}$ recorded in a data-storage device at corresponding time stamps $t_{i-1}$, $t_i$, and $t_{i+1}$. FIG. 3 shows an example of storing metrics denoted by $m_i$, where $i = 1, 2, 3, \ldots$. Block 314 represents a store metrics operation performed by the operations management server 132 to store each of the metrics in a metrics database 316. Each metric value $x_i$ represents a measurement of an object or amount of a resource used by an object at a point in time and is stored in the metrics database as a three tuple ($x_i$, $t_i$, object), where "object" identifies the object, such as a particular VM, server computer, or network device.

Metrics represent different types of measurable quantities of physical and virtual objects of a data center and are stored in a metric database of a data storage appliance. A metric can represent CPU usage of a core in a multicore processor of a server computer over time. A metric can represent the amount of virtual memory a VM uses over time. A metric can represent network throughput for a server computer. Network throughput is the number of bits of data transmitted to and from a physical or virtual object and is recorded in megabits, kilobits, or bits per second. A metric can represent network traffic for a server computer or a VM. Network traffic at a physical or virtual object is a count of the number of data packets received and sent per unit of time. A metric may can represent object performance, such as CPU contention, response time to requests, and wait time for access to a resource of an object. Network flows are metrics that indicate a level of network traffic. Network flows include, but are not limited to, percentage of packets dropped, data transmission rate, data receiver rate, and total throughput.

Each metric has at least one corresponding threshold, denoted by $Th_{metric}$, that is used to detect events associated with an object of the data center. An event may be an indication that the object is in an abnormal state. Depending on the type of metric, the corresponding threshold $Th_{metric}$ can be a dynamic threshold that is automatically adjusted by the operations management server 132 to changes in the object or data center over time or the threshold can be a fix threshold. For example, when one or more metric values of a metric violate a threshold, such as $x_i > Th_{metric}$ for an upper threshold or $x_i < Th_{metric}$ for a lower threshold, an event has occurred with a corresponding object indicating that the object has entered an abnormal state. Determination of thresholds and detection of events in metrics is described in U.S. Pat. No. 10,241,887, which is owned by VMware Inc. and is hereby incorporated by reference.

Log Messages

Figure 4:
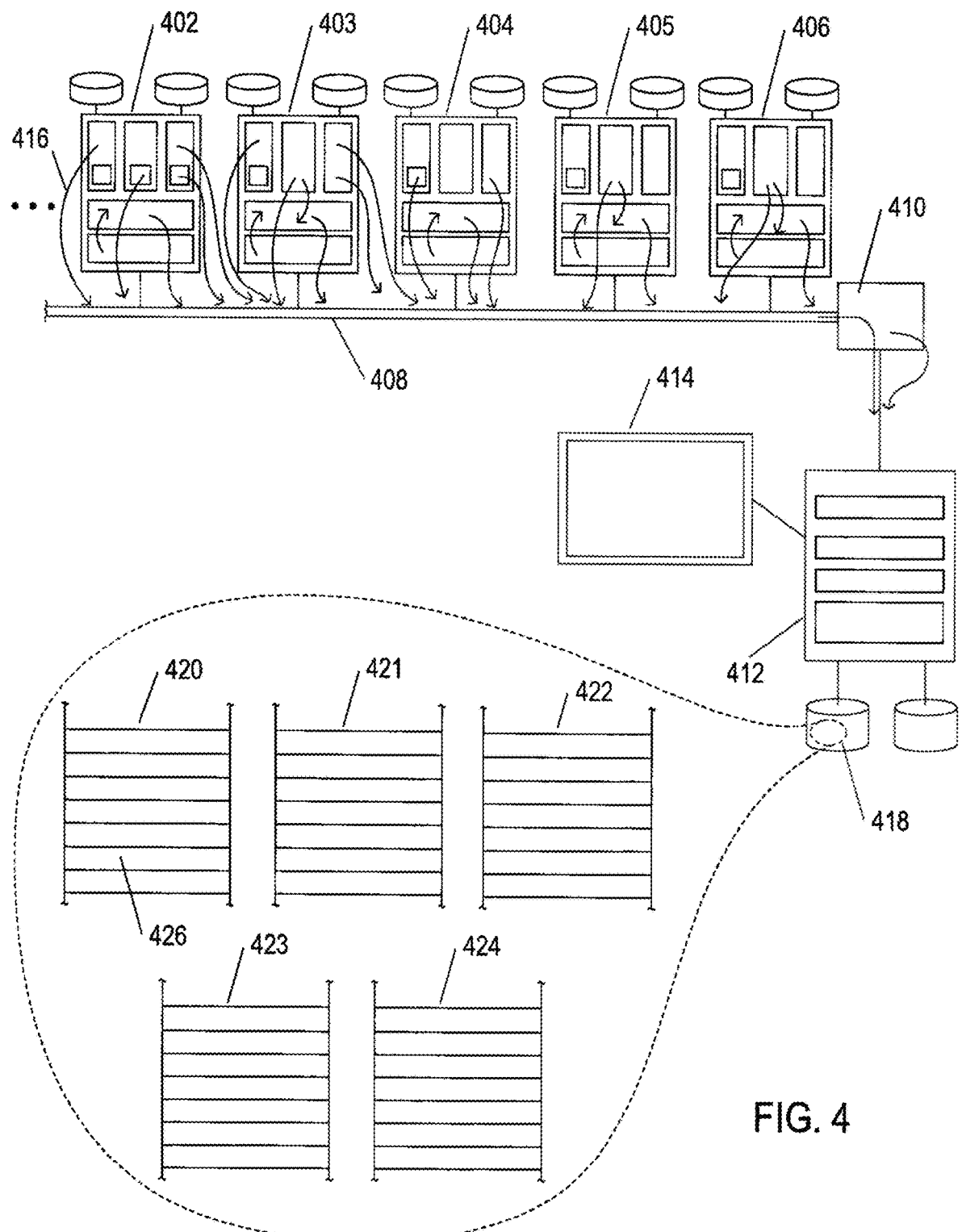
FIG. 4 shows an example of logging log messages in log files.

FIG. 4 shows an example of logging log messages in log files. In FIG. 4, computer systems 402-406 within a data center are linked together by an electronic communications medium 408 and additionally linked through a communications bridge/router 410 to an administration computer system 412 that includes an administrative console 414 and executes a log management server described below. Each of the computer systems 402-406 may run a log monitoring agent that forwards log messages to the operations management server 132 executing on the administration computer system 412. As indicated by curved arrows, such as curved arrow 416, multiple components within each of the computer systems 402-406 as well as the communications bridge/router 410 generate log messages that are forwarded to the operations management server 132. Log messages may be generated by any event source. Event sources may be, but are not limited to, programs, operating systems, VMs, guest operating systems, containers, network devices, machine codes, event channels, and other computer programs or processes running on the computer systems 402-406, the bridge/router 410 and any other components of a data center. Log messages may be received by log monitoring agents at various hierarchical levels within a computer system and then forwarded to the operations management server 132. The operations management server 132 records the log messages in a data-storage device or appliance 418 as log files 420424. Rectangles, such as rectangle 426, represent individual log messages. For example, log file 420 may contain a list of log messages generated within the computer system 402. Each log monitoring agent has a configuration that includes a log path and a log parser. The log path specifies a unique file system path in terms of a directory tree hierarchy that identifies the storage location of a log file on the administration computer system 412 or the data-storage device 418. The log monitoring agent receives specific file and event channel log paths to monitor log files and the log parser includes log parsing rules to extract and format lines of the log message into log message fields described below. Each log monitoring agent sends a constructed structured log message to the operations management server 132.

Figure 5:
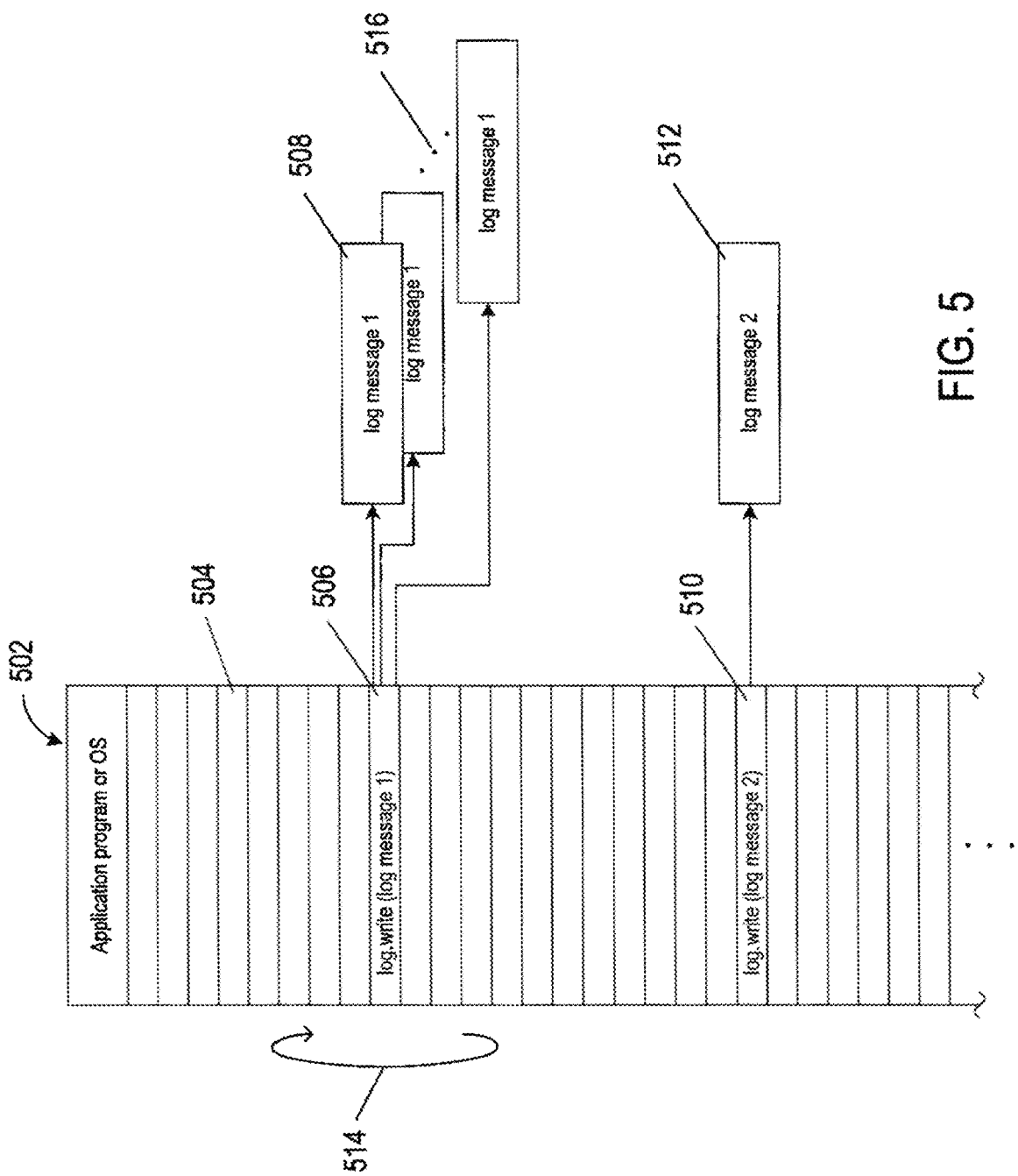
FIG. 5 shows an example source code of an event source.

FIG. 5 shows an example source code 502 of an event source. The event source can be an application, an operating system, a VM, a guest operating system, or any other computer program or machine code that generates log messages. The source code 502 is just one example of an event source that generates log messages. Rectangles, such as rectangle 504, represent a definition, a comment, a statement, or a computer instruction that expresses some action to be executed by a computer. The source code 502 includes log write instructions that generate log messages when certain events predetermined by a developer occur during execution of the source code 502. For example, source code 502 includes an example log write instruction 506 that when executed generates a "log message 1" represented by rectangle 508, and a second example log write instruction 510 that when executed generates "log message 2" represented by rectangle 512. In the example of FIG. 5, the log write instruction 508 is embedded within a set of computer instructions that are repeatedly executed in a loop 514. As shown in FIG. 5, the same log message 1 is repeatedly generated 516. The same type of log write instructions may also be located in different places throughout the source code, which in turns creates repeats of essentially the same type of log message in the log file.

In FIG. 5, the notation "log.write( )" is a general representation of a log write instruction. In practice, the form of the log write instruction varies for different programming languages. In general, the log write instructions are determined by the developer and are unstructured, or semi-structured, and in many cases are relatively cryptic. For example, log write instructions may include instructions for time stamping the log message and contain a message comprising natural-language words and/or phrases as well as various types of text strings that represent file names, path names, and perhaps various alphanumeric parameters that may identify objects, such as VMs, containers, or virtual network interfaces. In practice, a log write instruction may also include the name of the source of the log message (e.g., name of the application program, operating system and version, server computer, and network device) and may include the name of the log file to which the log message is recorded. Log write instructions are written in a source code by the developer of a program or operating system in order to record the state of the application program or operating system at a point in time and to record events that occur while an operating system or application program is executing. For example, a developer may include log write instructions that record informative events including, but are not limited to, identifying startups, shutdowns, I/O operations of applications or devices; errors identifying runtime deviations from normal behavior or unexpected conditions of applications or non-responsive devices; fatal events identifying severe conditions that cause premature termination; and warnings that indicate undesirable or unexpected behaviors that do not rise to the level of errors or fatal events. Problem-related log messages (i.e., log messages indicative of a problem) can be warning log messages, error log messages, and fatal log messages. Informative log messages are indicative of a normal or benign state of an event source.

FIG. 6 shows an example of a log write instruction 602. The log write instruction 602 includes arguments identified with "$" that are filled at the time the log message is created. For example, the log write instruction 602 includes a timestamp argument 604, a thread number argument 606, and an internet protocol ("IP") address argument 608. The example log write instruction 602 also includes text strings and natural-language words and phrases that identify the level of importance of the log message 610 and type of event that triggered the log write instruction, such as "Repair session" argument 612. The text strings between brackets "[ ]" represent file-system paths, such as path 614. When the log write instruction 602 is executed by a log management agent, parameters are assigned to the arguments and the text strings and natural-language words and phrases are stored as a log message of a log file.

FIG. 7 shows an example of a log message 702 generated by the log write instruction 602. The arguments of the log write instruction 602 may be assigned numerical parameters that are recorded in the log message 702 at the time the log message is executed by the log management agent. For example, the time stamp 604, thread 606, and IP address 608 arguments of the log write instruction 602 are assigned corresponding numerical parameters 704, 706, and 708 in the log message 702. Alphanumeric expression 1910 is assigned to a repair session argument 612. The time stamp 704 represents the date and time the log message 702 was generated. The text strings and natural-language words and phrases of the log write instruction 602 also appear unchanged in the log message 702 and may be used to identify the type of event (e.g., informative, warning, error, or fatal) that occurred during execution of the event source.

As log messages are received from various event sources, the log messages are stored in corresponding log files in the order in which the log messages are received. FIG. 8 shows a small, eight-entry portion of a log file 802. In FIG. 8, each rectangular cell, such as rectangular cell 804, of the log file 802 represents a single stored log message. For example, log message 804 includes a short natural-language phrase 806, date 808 and time 810 numerical parameters, and an alphanumeric parameter 812 that identifies a particular host computer.

In one implementation, the operations management server 132 extracts parametric and non-parametric strings of characters called tokens from log messages using regular expressions. A regular expression, also called "regex," is a sequence of symbols that defines a search pattern in text data. Many regex symbols match letters and numbers. For example, the regex symbol "a" matches the letter "a," but not the letter "b," and the regex symbol "100" matches the number "100," but not the number 101. The regex symbol "." matches any character. For example, the regex symbol ".art" matches the words "dart," "cart," and "tart," but does not match the words "art." "hurt," and "dark." A regex followed by an asterisk "*" matches zero or more occurrences of the regex. A regex followed by a plus sign "+" matches one or more occurrences of a one-character regex. A regular expression followed by a questions mark "?" matches zero or one occurrence of a one-character regex. For example, the regex "a*b" matches b, ab, and aaab but does not match "baa." The regex "a+b" matches ab and aaab but does not match b or baa. Other regex symbols include a "\d" that matches a digit in 0123456789, a "\s" matches a white space, and a "\b" matches a word boundary. A string of characters enclosed by square brackets, [ ], matches any one character in that string. A minus sign "−" within square brackets indicates a range of consecutive ASCII characters. For example, the regex [aeiou] matches any vowel, the regex [a-f] matches a letter in the letters abcdef, the regex [0-9] matches a 0123456789, the regex [._%+−] matches any one of the characters ._%+−. The regex [0-9a-f] matches a number in 0123456789 and a single letter in abcdef. For example, [0-9a-f] matches a6, i5, and u2 but does not match ex, 9v, or %6. Regular expressions separated a vertical bar "|" represent an alternative to match the regex on either side of the bar. For example, the regular expression Get|GetValue|Set|SetValue matches any one of the words: Get, GetValue, Set, or SetValue. The braces "{ }" following square brackets may be used to match more than one character enclosed by the square brackets. For example, the regex [0-9]{2} matches two-digit numbers, such as 14 and 73 but not 043 and 4, and the regex [0-9]{1-2} matches any number between 0 and 99, such as 3 and 58 but not 349.

Figure 9A:
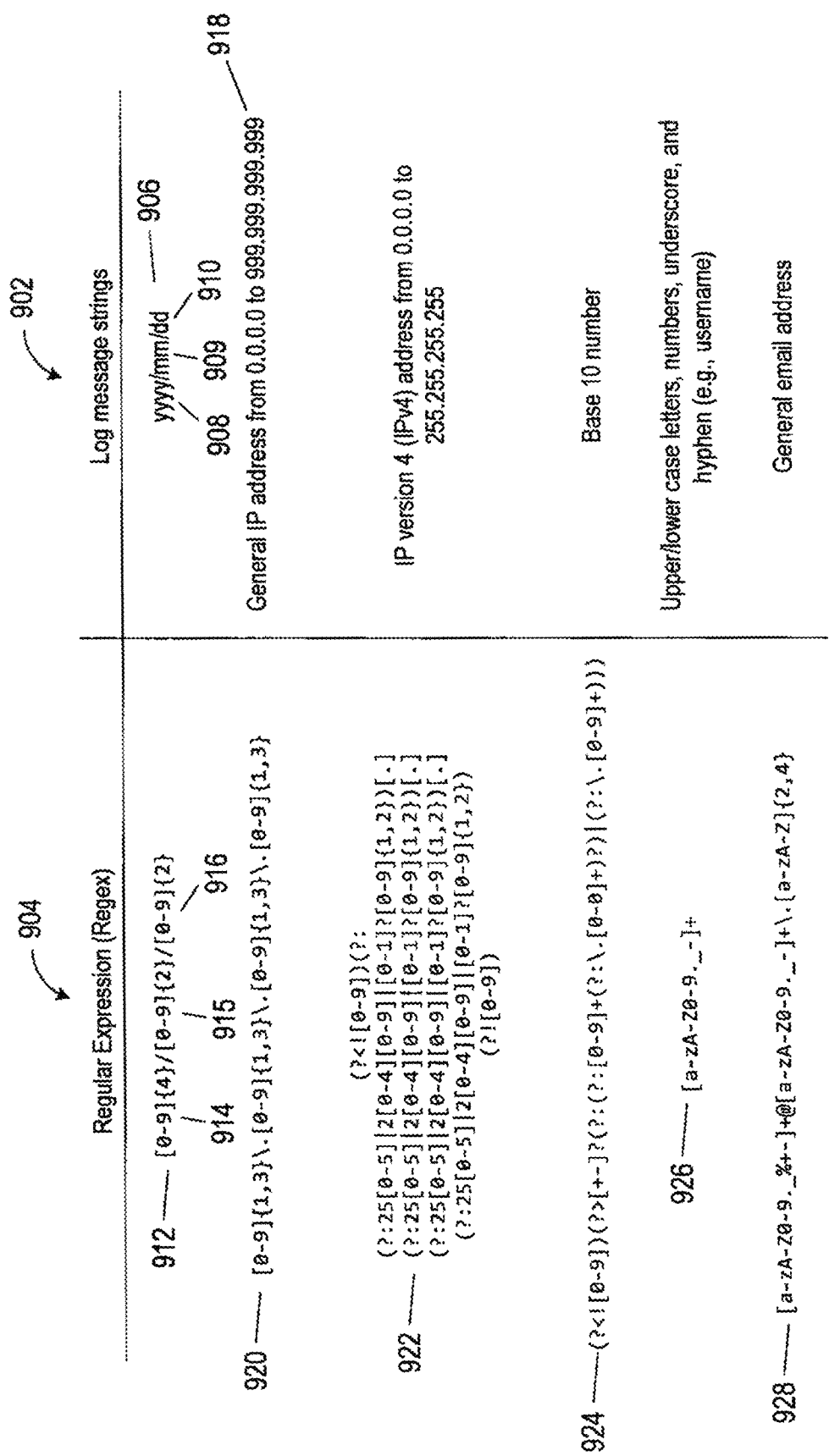
FIG. 9A shown a table of examples of regular expressions designed to match particular character strings of log messages.

Simple regular expressions are combined to form larger regular expressions that match character strings of log messages and can be used to extract the character strings from the log messages. FIG. 9A shown a table of examples of regular expressions designed to match particular character strings of log messages. Column 902 list six different types of strings that may be found in log messages. Column 904 list six regular expressions that match the character strings listed in column 902. For example, an entry 906 of column 902 represents a format for a date used in the time stamp of many types of log messages. The date is represented with a four-digit year 908, a two-digit month 909, and a two-digit day 910 separated by slashes. The regex 912 includes regular expressions 914-916 separated by slashes. The regular expressions 914-916 match the characters used to represent the year 908, month 909, and day 910. Entry 918 of column 902 represents a general format for internet protocol ("IP") addresses. A typical general IP address comprises four numbers. Each number ranges from 0 to 999 and each pair of numbers is separated by a period, such as 27.0.15.123. Regex 920 in column 904 matches a general IP address. The regex [0-9]{1-3} matches a number between 0 and 999. The backslash "\" before each period indicates the period is part of the IP address and is different from the regex symbol "." used to represent any character. Regex 922 matches any IPv4 address. Regex 924 matches any base-10 number. Regex 926 matches one or more occurrences of a lower-case letter, an upper-case letter, a number between 0 and 9, a period, an underscore, and a hyphen in a character string. Regex 928 matches email addresses. Regex 928 includes the regex 926 after the ampersand symbol.

In another implementation, operations management server 132 extracts non-parametric tokens from log messages using Grok expressions. Grok patterns are predefined symbolic representations of regular expressions that reduce the complexity of constructing regular expressions. Grok patterns are categorized as either primary Grok patterns or composite Grok patterns that are formed from primary Grok patterns. A Grok pattern is called and executed using the notation Grok syntax %{Grok pattern}.

FIG. 9B shows a table of examples of primary Grok patterns and corresponding regular expressions. Column 932 contains a list of primary Grok patterns. Column 934 contains a list of regular expressions represented by the Grok patterns in column 932. For example, the Grok pattern "USERNAME" 936 represents the regex 938 that matches one or more occurrences of a lower-case letter, an upper-case letter, a number between 0 and 9, a period, an underscore, and a hyphen in a character string. Grok pattern "HOSTNAME" 940 represents the regex 942 that matches a hostname. A hostname comprises a sequence of labels that are concatenated with periods. Note that the list of primary Grok patterns shown in FIG. 9 is not an exhaustive list of primary Grok patterns.

Grok patterns may be used to map specific character strings into dedicated variable identifiers. Grok syntax for using a Grok pattern to map a character string to a variable identifier is given by:

%{GROK_PATTERN:variable_name} where

GROK_PATTERN represents a primary or a composite Grok pattern; and variable_name is a variable identifier assigned to a character string in text data that matches the GROK_PATTERN.

A Grok expression is a parsing expression that is constructed from Grok patterns that match characters strings in text data and may be used to parse character strings of a log message. Consider, for example, the following simple example segment of a log message:

34.5.243.1 GET index.html 14763 0.064

A Grok expression that may be used to parse the example segment is given by:

^%{IP:ip_address}\s %{WORD:word}\s %{URIPATH-PARAM:request}\s %{INT:bytes}\s %{NUMBER:duration}$ The hat symbol "^" identifies the beginning of a Grok expression. The dollar sign symbol "$" identifies the end of a Grok expression. The symbol "\s" matches spaces between character strings in the example segment. The Grok expression parses the example segment by assigning the character strings of the log message to the variable identifiers of the Grok expression as follows:

ip_address: 34.5.243.1
word: GET
request: index.html
bytes: 14763
duration: 0.064

Different types of regular expressions or Grok expressions are configured to match and extract tokens from the log messages. Numerous log messages may have different parametric tokens but the same set of non-parametric tokens. The non-parametric tokens extracted from a log message describe the type of event, or event type, recorded in the log message. The event type of a log message is denoted by $et_i$, where subscript i is an index that distinguishes the different event types of log messages. Many event types correspond to benign events recorded in log message while event types that describe errors, warning or critical problems are identified by the operation management server 132.

FIG. 9C shows an example of a Grok expression 944 used to extract tokens from a log message 946. Dashed directional arrows represent parsing the log message 946 such that tokens that correspond to Grok patterns of the Grok expression 944 are assigned to corresponding variable identifiers. For example, dashed directional arrow 948 represents assigning the time stamp 2021-07-18T06:32:07+00:00 950 to the variable identifier timestamp_iso8601 952 and dashed directional arrow 954 represents assigning HTTP response code 200 956 to the variable identifier response_code 958. FIG. 9C shows assignments of tokens of the log message 946 to variable identifiers of the Grok expression 944. The combination of non-parametric tokens 960-962 identify the event type 964 of the log message 946. Parametric tokens 966-968 may change for different log messages with the same event type 964.

Unexpected behavior in an object of data center may be categorized as an anomaly or a change. An anomaly is an extreme event that has essentially the same overall characteristics in the present as in the past. On the other hand, a change is an alteration in the characteristics of the process itself and is regarded an event. A change point is a point in time when the change in behavior of an object begins. The operations management server 132 automatically detects changes, or change events, in an object behavior based on changes in the distribution of the event types generated by an object.

Figure 10:
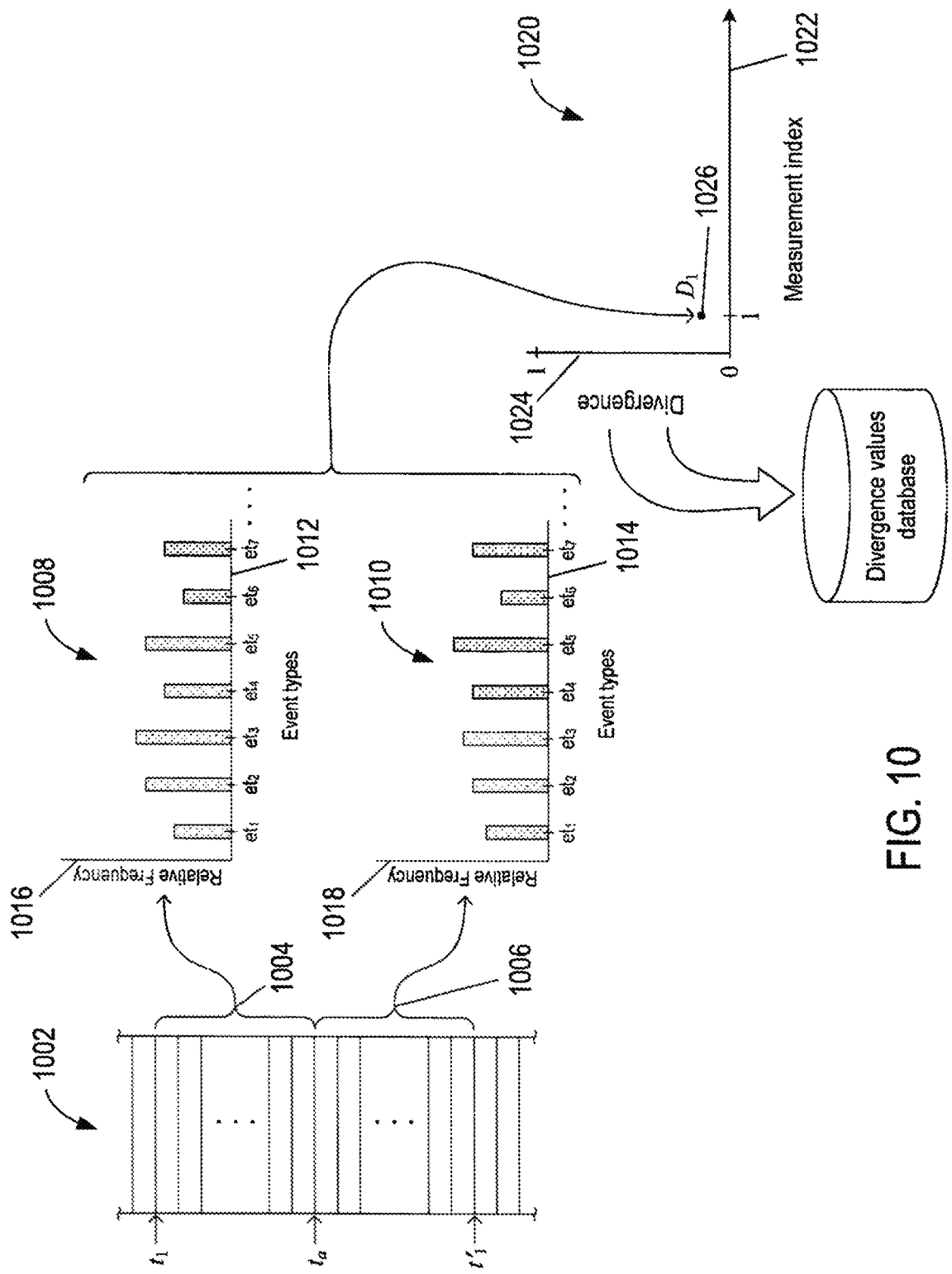
FIG. 10 shows an example of generating a divergence value for a portion of a log file.

FIG. 10 shows a portion of a log file 1002 with rectangles that represent log messages with time stamps that lie in the time interval $[t_1, t'_1]$. The time interval $[t_1, t'_1]$ is divided into two sub-time intervals $[t_1, t_a]$ and $[t_a, t'_1]$, where $t_a$ marks a point in which approximately half of the log messages are in each of the sub-time intervals. A first set of log messages 1004 has time stamps in the first time interval $[t_1, t_a]$. A second set of event messages 1006 has time stamps in the second time interval $[t_a, t'_1]$. The operations management server 132 determines the event types for each of the log messages in the separate time intervals and determines the relative frequency of each event type in the separate time intervals. A relative frequency is computed for each event type of the first set of event messages 1004 as follows:

$$F_l = \frac{n_F(et_l)}{N_F} \quad (2a)$$

where subscript l denotes an event type index;
$n_F(et_l)$ is the number of times the event type $et_l$ appears in the first set of event messages 1004; and
$N_F$ is the total number event messages in the first set of event messages 1004.

A relative frequency is computed for each event type of the second set of event messages 1006:

$$G_l = \frac{n_G(et_l)}{N_G} \quad (2b)$$

where $n_G(et_l)$ is the number of times the event type $et_l$ appears in the second set of event messages 1006; and
$N_G$ is the total number event messages in the second set of event messages 1006

FIG. 10 shows a plot of a first event-type distribution 1008 of the event types of the log messages 1004 and a plot of a second event-type distribution 1010 of the event types of the log messages 1006. Horizontal axes 1012 and 1014 represent the various event types. Vertical axes 1016 and 1018 represent relative frequency ranges. Shaded bars represent the relative frequency of each event type.

The operations management server 132 computes a divergence value between the first and second event-type distributions. The divergence value is a quantitative measure of a change to the object based on changes in the event types in the first and second time intervals. In one implementation, a divergence value is computed between first and second event-type distributions using the Jensen-Shannon divergence:

$$D_i = -\sum_{l=1}^{N_{ET}} M_l \log M_l + \frac{1}{2}\left[\sum_{l=1}^{N_{ET}} F_l \log F_l + \sum_{l=1}^{N_{ET}} G_l \log G_l\right] \quad (3)$$

where the subscript "i" represents a measurement index;

$M_l = (F_l + G_l)/2$; and $N_{ET}$ is the number of event types of the log messages.

In another implementation, the divergence value may be computed using an inverse cosine as follows:

$$D_i = 1 - \frac{2}{\pi} \cos^{-1} \left[ \frac{\sum_{l=1}^{N_{ET}} F_l G_l}{\sqrt{\sum_{l=1}^{N_{ET}} (F_l)^2} \sqrt{\sum_{l=1}^{N_{ET}} (G_l)^2}} \right] \quad (4)$$

The divergence value $D_i$ computed according to Equation (3) or (4) satisfies the following condition $$0 \leq D_i \leq 1 \quad (5)$$

The divergence value is a normalized value that is used to measure how much, or to what degree, the first event-type distribution differs from the second event-type distribution. The closer the divergence is to zero, the closer the first event-type distribution is to matching the second event-type distribution. For example, when $D_i=0$, the first event-type distribution is identical to the second event-type distribution, which is an indication that the state of the object has not change from the first sub-time interval $[t_1, t_a]$ to the second sub-time interval $[t_a, t'_1]$. On the other hand, the closer the divergence is to one, the farther the first event-type distribution is from the second event-type distribution. For example, when $D_i=1$, the first and second event-type distributions have no event types in common.

FIG. 10 shows a plot 1020 of an example divergence computed for the first event-type distribution 1008 and the second event-type distribution 1010. Horizontal axis 1022 represents measurement indices. Vertical axis 1024 represents the divergence. Dot 1026 represents the example divergence computed for the first event-type distribution 1008 and the second event-type distribution 1010. Note that the divergence value is close to zero, which indicates the distributions 1008 and 1010 are similar.

The time window is then moved or slides to a next time interval $[t_2, t'_2]$ by a time step denoted by $\delta$. The time step is less than the length of the time window $\Delta$ (i.e., $\delta < \Delta$). For example, the time step may be 30 seconds, 1 minute, 2 minutes, 5 minutes, or of any suitable duration that is less than the length of the time window. As a result, the time interval $[t_2, t'_2]$ overlaps the previous time interval $[t_1, t'_1]$.

As the time window incrementally advances or slides in time by the time step $\delta$, a divergence value is computed for event messages generated in the time interval covered by the time window as described above with reference to FIG. 10. The divergence values computed over time to form a sequence of divergence values represented by $$DV = (D_i)_{i=1}^{N_I} \quad (6)$$

where $i=1, \ldots, N_I$ are measurement indices; and $N_I$ is the number of measurements.

Figure 11:
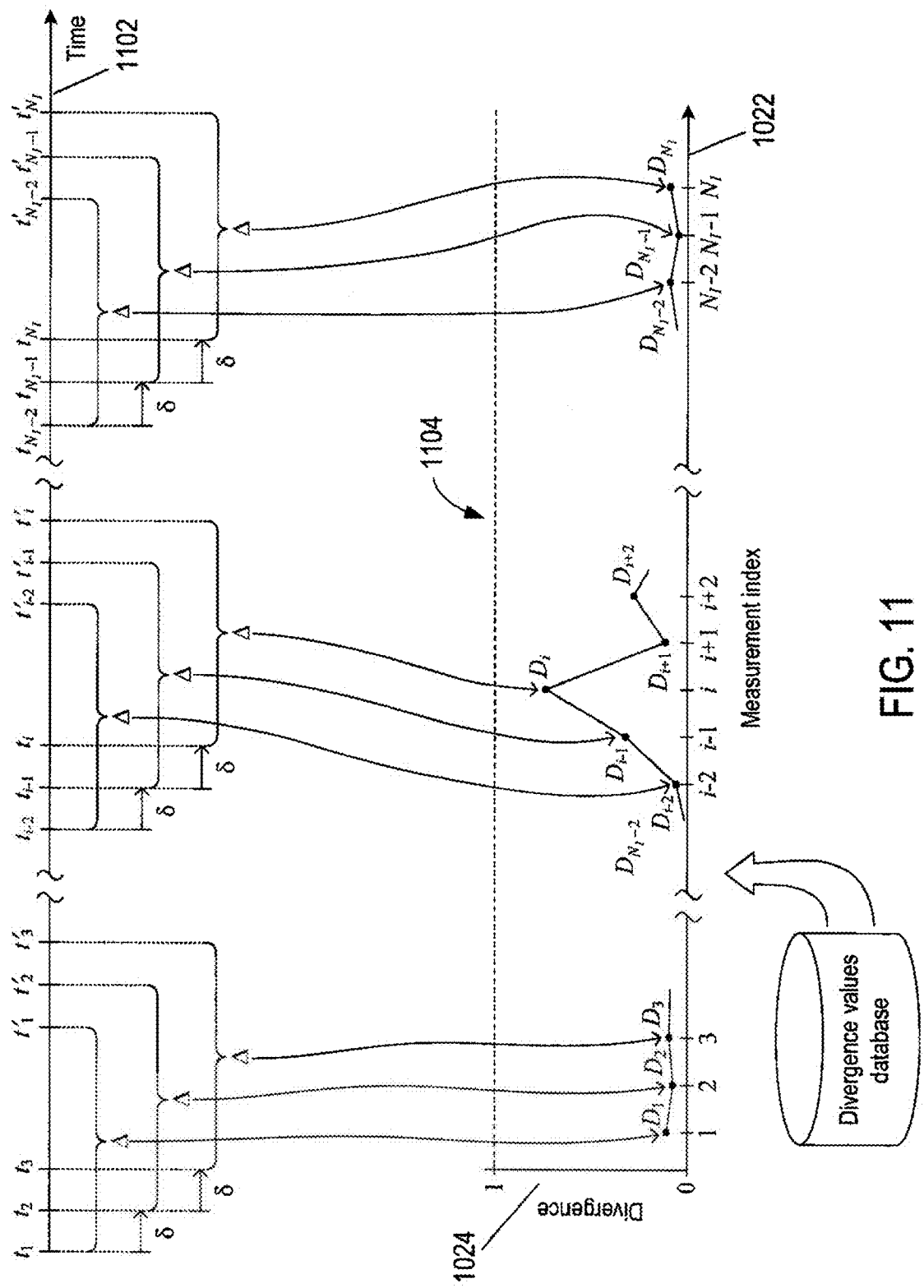
FIG. 11 shows a plot of an example sequence of consecutive divergence values computed for overlapping time windows.

FIG. 11 shows a plot of an example sequence of N consecutive divergence values computed for N overlapping time windows. Overlapping time intervals located on the time axis 1102 correspond to locations of the sliding time window incrementally advanced in time by the time step $\delta$. FIG. 11 includes a plot of divergence values 1104 computed for log messages with time stamps in each time window. Divergence values represented by dots are computed for log messages with time stamps in each of the overlapping time intervals located along the time axis 1102 as described above with reference to FIG. 10. Most of the divergence values are close to zero, which indicates no significant change in the event messages generated by the event source over time. On the other hand, larger divergence value $D_n$ 1106 indicates a change has occurred in the object associated with the log messages. However, it is not clear when the change occurred.

When a divergence value is greater than a divergence value threshold $$D_i > Th_1 \quad (7)$$

the divergence value indicates a change in the event source. The divergence value threshold represents a limit for acceptable divergence value changes. For example, the divergence value threshold may be equal to 0.1, 0.15, or 0.2. In other implementations, when a rate of change in divergence values is greater than a rate of change threshold $$D_i - D_{i-1} > Th_2 \quad (8)$$

the divergence value $D_i$ indicates a change in the object. The rate of change threshold represents a limit for acceptable increases between consecutive divergence values. For example, the rate of change threshold may be equal to 0.1, 0.15, or 0.2. When a change has been determined by either of the threshold violations represented in Equations (7) and (8), change point analysis is applied to the sequence of divergences values in order to quantitatively detect a change point for the object. The change point is then used to determine a potentially earlier start time of change in the object.

Change point analysis includes computing cumulative sums of divergence values as follows:

$$S_i = S_{i-1} + (D_i - \overline{D}) \quad (9)$$

where $S_0 = 0$;

$i = 1, \ldots, N_I$; and $$\overline{D} = \frac{1}{N_I} \sum_{i=1}^{N_I} D_i$$

is the mean value of the divergence values. In other implementations, rather than using the mean value, $\overline{D}$ is the median of the sequence of divergence values.

The measurement index of the largest cumulative sum value in the sequence of cumulative sum values is determined:

$$S_m = \max((S_i)_{i=1}^{N_I}) \quad (10)$$

where m is the measurement index of the maximum cumulative sum value $S_m$.

The measurement index m is called the chance point. The change point index m is the index of the time interval $[t_m, t'_m]$ in which the change is detected by the maximum cumulative sum. The start time of the change is determined by initially partitioning the divergence values into two sequences of divergence values based on the change point index m as follows:

$$DV = (D_i)_{i=1}^{N_I} = (D_i)_{i=1}^{m} \cup (D_i)_{i=m+1}^{N_I} \quad (11)$$

The first and second sequences of divergence values $(D_i)_{i=1}^{m}$ and $(D_i)_{i=m+1}^{N_I}$ are used to compute the mean square error of the sequence of divergences values as follows:

$$MSE(m) = \sum_{i=1}^{m} (D_i - \overline{D}_{1,m})^2 + \sum_{i=m+1}^{N_I} (D_i - \overline{D}_{m+1,N_I})^2 \quad (12)$$

-continued where $$\overline{D}_{1,m} = \frac{1}{m}\sum_{i=1}^{m} D_i$$

$$\overline{D}_{m+1,N} = \frac{1}{N_I - m}\sum_{i=m+1}^{N_I} D_i$$

The quantity $\overline{D}_{1,m}$ is the average of the first sequence of divergence values. The quantity $\overline{D}_{m+1,N_I}$ is the average of the second sequence of divergences values. Starting with a measurement index k equal to the change point index m, and decrementing until k=1, a mean square error MSE(k) is computed according to Equation (12) until a mean square error MSE(k) that is less than or equal to MSE(m) is determined. The largest measurement index k that is less than the change point index m and satisfies the condition MSE(k)≤MSE(m) corresponds to a time interval [$t_k$, $t'_k$], where the time $t_k$ is the approximate start time of change and k is called the start time of change index. If MSE(k)>MSE(m) for k=1, . . . , m, then the start time of change is the change point $t_m$. The following pseudocode represents one of many different ways of determining a start time of change:

```
1     int k = m;
2     for (k = m − 1; k = 0; k—)
3     {
4         compute MSE (k); // using Equation (11)
5         if (MSE (k) ≤ MSE (m))
6         {
7             Start time of change index = k;
8             return (Change index);
9         }
10    }
11    Start time of change index = m;
12    return (Change index):
```

The above procedure minimizes the mean square error by decrementing from the measurement index m until a measurement index k that satisfies the condition MSE(k)≤MSE(m) is determined. The resulting start time of change index k is a "best" partition of the divergence values for which the divergence values in the sequence $(D_i)_{i=1}^{k}$ and the divergence values in the sequence $(D_i)_{i=k+1}^{m}$ are maximum fits to the respective means of these two sequences.

Traces

When the objects are application components of a distributed application, application traces and associated spans are used to identify events associated with performance problems with the objects. Distributed tracing is used to construct application traces and associated spans. A trace represents a workflow executed by an application, such as a distributed application. A trace represents how a request, such as a user request, propagates through components of a distributed application or through services provided by each component of a distributed application. A trace consists of one or more spans, which are the separate segments of work represented in the trace. Each span represents an amount of time spent executing a service of the trace.

Figure 12A:
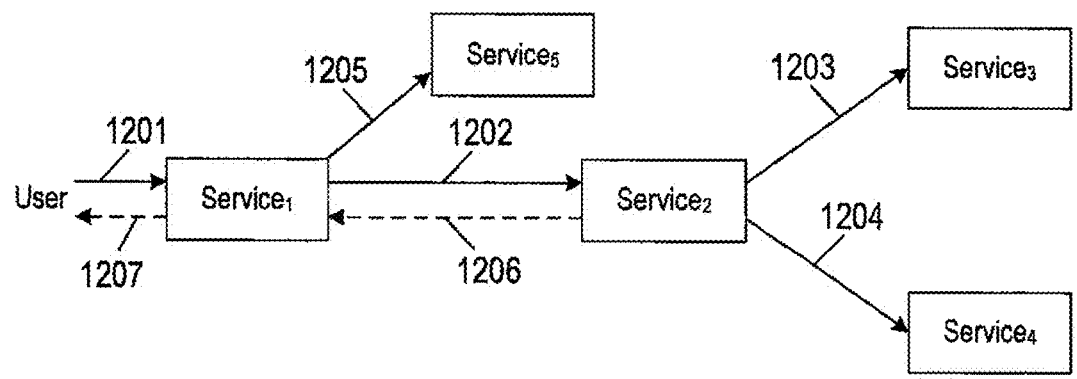
FIGS. 12A-12B show an example distributed application and an example application trace.
Figure 12B:
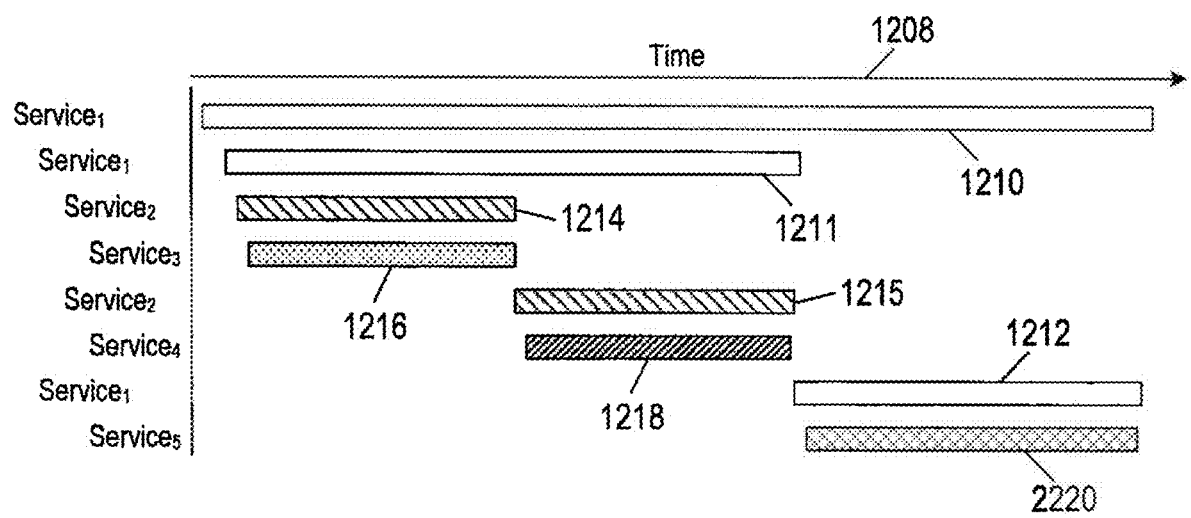

FIGS. 12A-12B show an example of a distributed application and an example application trace. FIG. 12A shows an example of five services provided by a distributed application. The services are represented by blocks identified as $Service_1$, $Service_2$, $Service_3$, $Service_4$, and $Service_5$. The services may be web services provided to customers. For example, $Service_1$ may be a web server that enables a user to purchase items sold by the application owner. The services $Service_2$, $Service_3$, $Service_4$, and $Service_5$ are computational services that execute operations to complete the user's request. The services may be executed in a distributed application in which each component of the distributed application executes a service in a separate VM on different server computers or using shared resources of a resource pool provided by a cluster of server computers. Directional arrows 1201-1205 represent requests for a service provided by the services $Service_1$, $Service_2$, $Service_3$, $Service_4$, and $Service_5$. For example, directional arrow 1201 represents a user's request for a service, such as provided by a web site, offered by $Service_1$. After a request has been issued by the user, directional arrows 1203 and 1204 represent the $Service_I$ request for execution of services from $Service_2$ and $Service_3$. Dashed directional arrows 1206 and 1207 represent responses. For example, $Service_2$ sends a response to $Service_1$ indicating that the services provided by $Service_3$ and $Service_4$ have been executed. The $Service_1$ then requests services provided $Service_5$, as represented by directional arrow 1205, and provides a response to the user, as represented by directional arrow 1207.

FIG. 12B shows an example trace of the services represented in FIG. 12A. Directional arrow 1208 represents a time axis. Each bar represents a span, which is an amount of time (i.e., duration) spent executing a service. Unshaded bars 1210-1212 represent spans of time spent executing the $Service_1$. For example, bar 1210 represents the span of time $Service_1$ spends interacting with the user. Bar 1211 represents the span of time $Service_1$ spends interacting with the services provided by $Service_2$. Hash marked bars 1214-1215 represent spans of time spent executing $Service_2$ with services $Service_3$ and $Service_4$. Shaded bar 1216 represents a span of time spent executing $Service_3$. Dark hash marked bar 1218 represents a span of time spent executing $Service_4$. Cross-hatched bar 1220 represents a span of time spent executing $Service_5$.

The operations management server 132 constructs and monitors RED metrics from the spans of traces in order to detect events in the performance of an application, such as the example distributed application described above with reference to FIG. 12A. The abbreviation "RED" stands for Rate of request, Error, and Duration. RED metrics correspond to rate of request metrics, error metrics, and duration metrics. A rate of request metric is the number of requests served per unit time. An error metric is the number of failed requests per unit time. A duration metric is a per unit time histogram distributions of the amount of time that each request takes. RED metrics are key performance indicators ("KPIs") of the overall health of an application and the health of the individual services performed by application components. RED metrics are used by the operations management server 132 to detect events that are indicators of performance problems with an application and individual application components. An event occurs when any one of the RED metrics violates a corresponding threshold as described above with reference to Equation (1).

Span RED metrics measure performance of individual services provided by application components. For example, a span rate of request metric is the number of times that the specified operation performed by a service is invoked per unit time or the number of spans for a specified service per unit time. A span error metric is the number of operations performed by a service per unit time that have errors. A span duration metric of each invoked service in microseconds may be aggregated in one-minute intervals. Duration of each span, in microseconds, are aggregated in one-minute time intervals.

Trace RED metrics measure traces that start with a given root service. If a trace has multiple root spans, the earliest occurring root span is used. The operations management server 132 derives trace RED metrics from each trace's root span and end span. A trace rate of request metric is the number of traces that start with the specified root service per unit time. A trace error metric is the number of traces that start with the same root service and contain one or more spans with errors. A trace duration metric is measured from the start of the earliest root span to the end of the last span in a trace.

The operations management server 132 stores and maintains records of metrics, log messages, divergence, and RED metrics associated with each object of the data center in an operational status database. In the following discussion, data center objects are denoted by $O_j$, where subscript j distinguishes the different objects, j=1, 2, ..., J, and J is the total number of objects.

Figure 13:
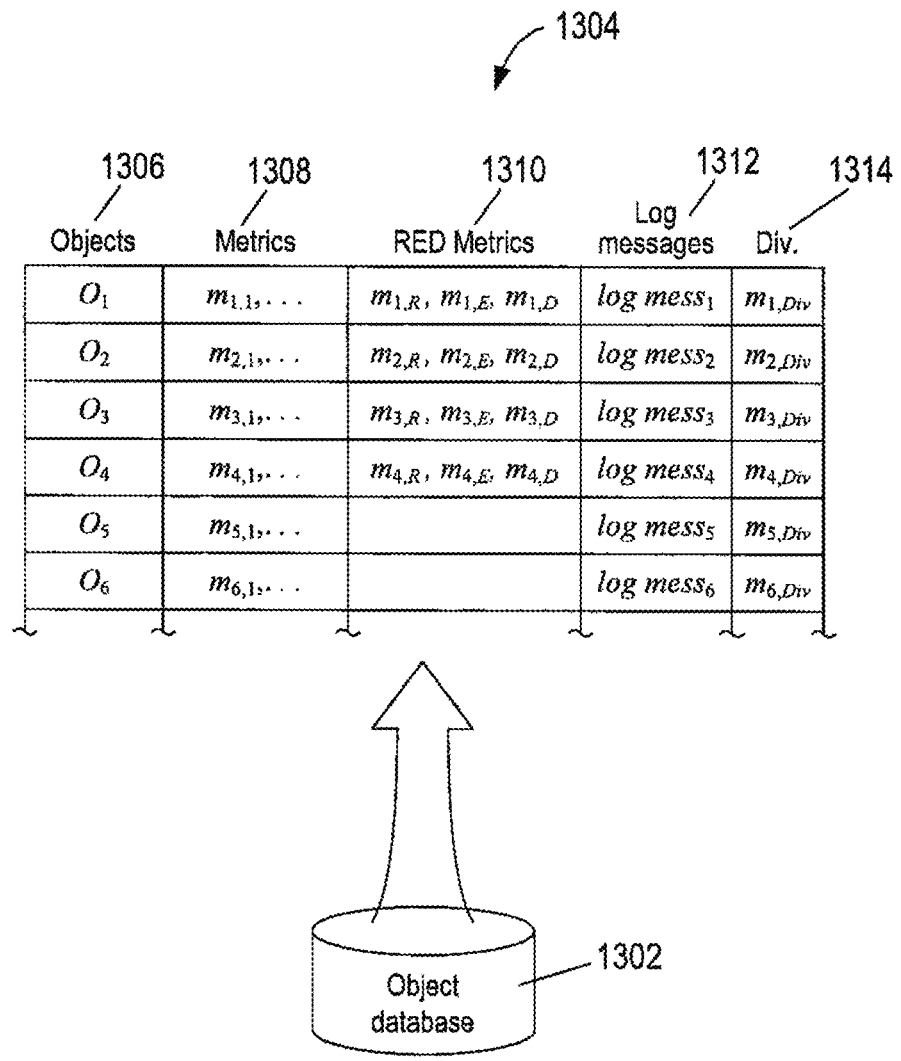
FIG. 13 shows an example of object information stored in an operational status database.

FIG. 13 shows an example of object information stored in an operational status database 1302. The object information stored in the operational status database 1302 is represented by a table 1304. Column 1306 list objects of a data center. The objects include virtual objects, such as VMs, containers, applications, programs, and software, and physical objects, such as server computers, data storage devices, network devices, and other physical components of the data center. For example, $O_1$ may be an application component of a distributed application. $O_5$ may be a server computer that runs numerous VMs, and $O_6$ may be a TOR switch. Column 1308 contains a list of metrics associated with the objects. Column 1310 contains a list of RED metrics associated with a distributed application. For example, objects $O_1$, $O_2$, $O_3$, and $O_4$ may be application components of a distributed application that perform services as described above with reference to FIGS. 12A and 12B. Object $O_5$ and $O_6$, on the other hand, may be physical objects or programs that do not have associated RED metrics. Column 1312 list log messages associated with each of the objects. For example, log mess$_1$ contains the log messages generated by one or more event sources associated with object $O_1$. Column 1314 list divergence values associated with each of the objects listed in column 1306 and computed from the log messages as described above with reference to FIGS. 10 and 11.

Automated Methods and System for Identifying and Resolving Root Causes of Performance Problems in Data Center Objects The operations management server 132 determines a baseline distribution for each of the objects from subsets of events recorded in separate time windows of a historical time period. The time windows have the same duration denoted by $\Delta_{TW}$. Each time window may contain a different set of events, such as metric threshold violations, log message alerts, change points, and erroneous traces identified by RED metric threshold violations. Many of the event distributions in the time windows of the historical time period are associated with normal performance of the object. The operations management server 132 automatically determines a baseline distribution for each of objects based on the event distributions associated with the normal behavior of the objects $O_j$ (i.e., for j=1, 2, ..., J) over the historical time period. In other words, a baseline distribution corresponds to normal behavior of an object. The baseline distribution is used as described below to detect runtime outlier objects (i.e., objects with potential performance problems while the objects are executing or performing operations).

Figure 14:
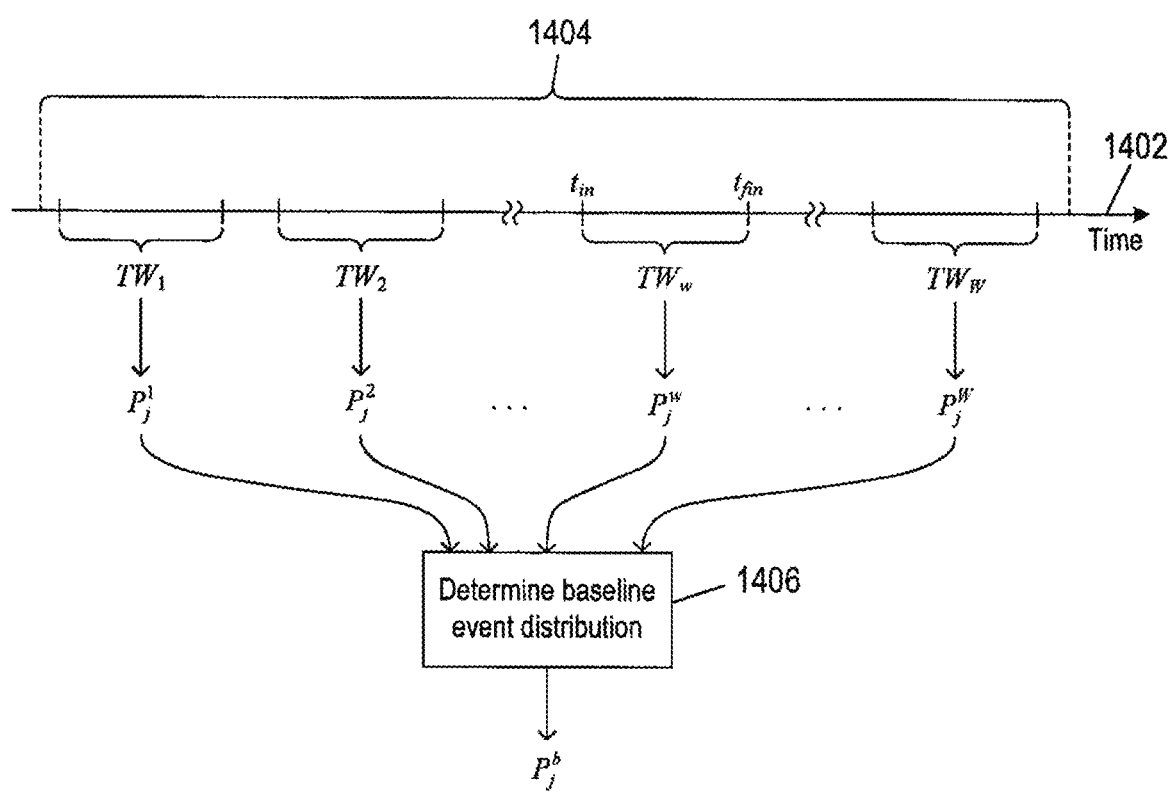
FIG. 14 shows an example of forming a baseline distribution for an object from event distributions of a historical time period.

FIG. 14 shows an example of determining a baseline distribution for an object $O_j$ from event distributions in separate time windows of a historical time period. The time windows are denoted by $TW_w$, where w=1, 2, ..., W, and W is the number of time windows. FIG. 14 shows a time axis 1402 and examples of time windows $TW_1$, $TW_2$, $TW_w$, and $TW_W$ in a historical time period 1404. The operations management server 132 extracts object information for the object $O_j$ from the operational status database 1302 for each of the time windows and computes a historical event distribution denoted by $P_j^w$, where w=1, 2, ..., W, as described below for each of the time windows. In block 1406, the operations management server 132 computes a baseline distribution $P_j^b$ for the object $O_j$ based on the historical event distributions $P_j^w$.

Figure 15A:
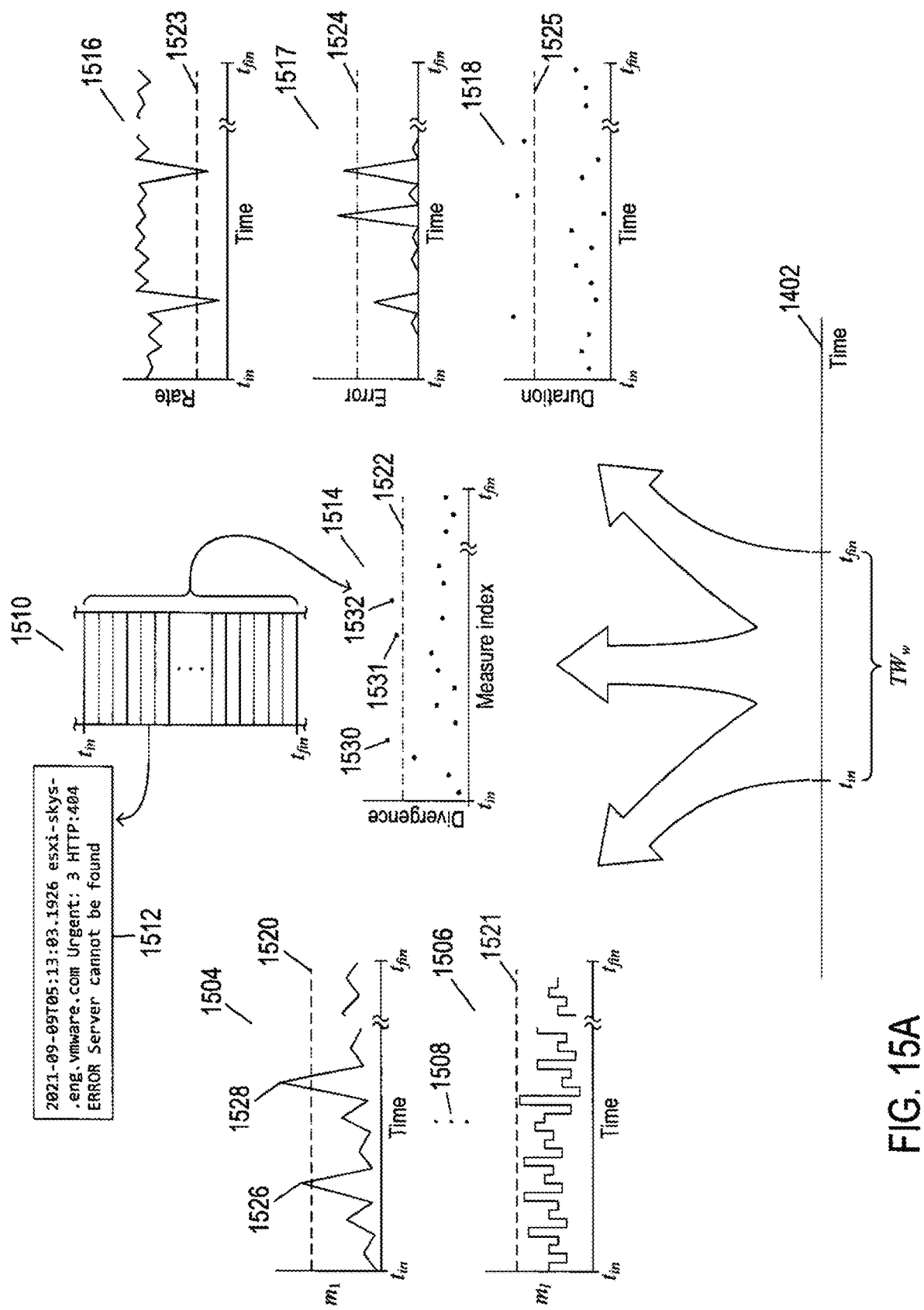
FIG. 15A shows an example of object information associated with an object.

FIG. 15A shows an example of object information associated with the object $O_j$. FIG. 15A includes the time axis 1402 with endpoints of the time window $TW_w$ denoted by $t_{in}$ and $t_{fin}$. FIG. 15A shows example plots of object information retrieved from the object information database 1302 over the time window $TW_w$. Plots 1504 and 1506 represents examples of metrics $m_1$ and $m_l$, respectively, associated with the object $O_j$. Ellipses 1508 represent other metrics associated with the object $O_j$ but are not shown for the sake of convenience. Boxes 1510 represent log messages, such as log message 1512, generated by event sources associated with the object $O_j$ over the time window $TW_w$. Event types of the log messages 1510 are determined as described above with reference to FIGS. 9A-9C and are used to compute divergence values and change points in the time window $TW_w$ as described above with reference to FIGS. 10 and 11. Plot 1514 represents the divergence values determined in the time window $TW_w$. In this example, the object $O_j$ has associated RED metrics represented by plots 1516-1518. The example plots include thresholds 1520-1525. Metric values that violate a corresponding threshold are the same type of event denoted by $E_i$, where subscript i is an index that distinguishes the metric or divergence, i=1, 2, ... k, and k is the number of different possible types of events that can be associated with the object. For example, metric values 1526 and 1528 violate the threshold 1520 and correspond to the same type of event denoted by $E_1$; metric values 1530-1532 violate the threshold 1522 and correspond to the same type of event denoted by $E_d$. Note that certain types of events may not occur in the time window $TW_w$. For example, metric values that violate the threshold 1521 correspond to another type of event denoted by $E_l$. However, none of the metric values associated with the metric $m_l$ violated the threshold 1521 in the time window $TW_w$. As a result, the number of events $E_l$ is zero in the time window $TW_w$.

Figure 15B:
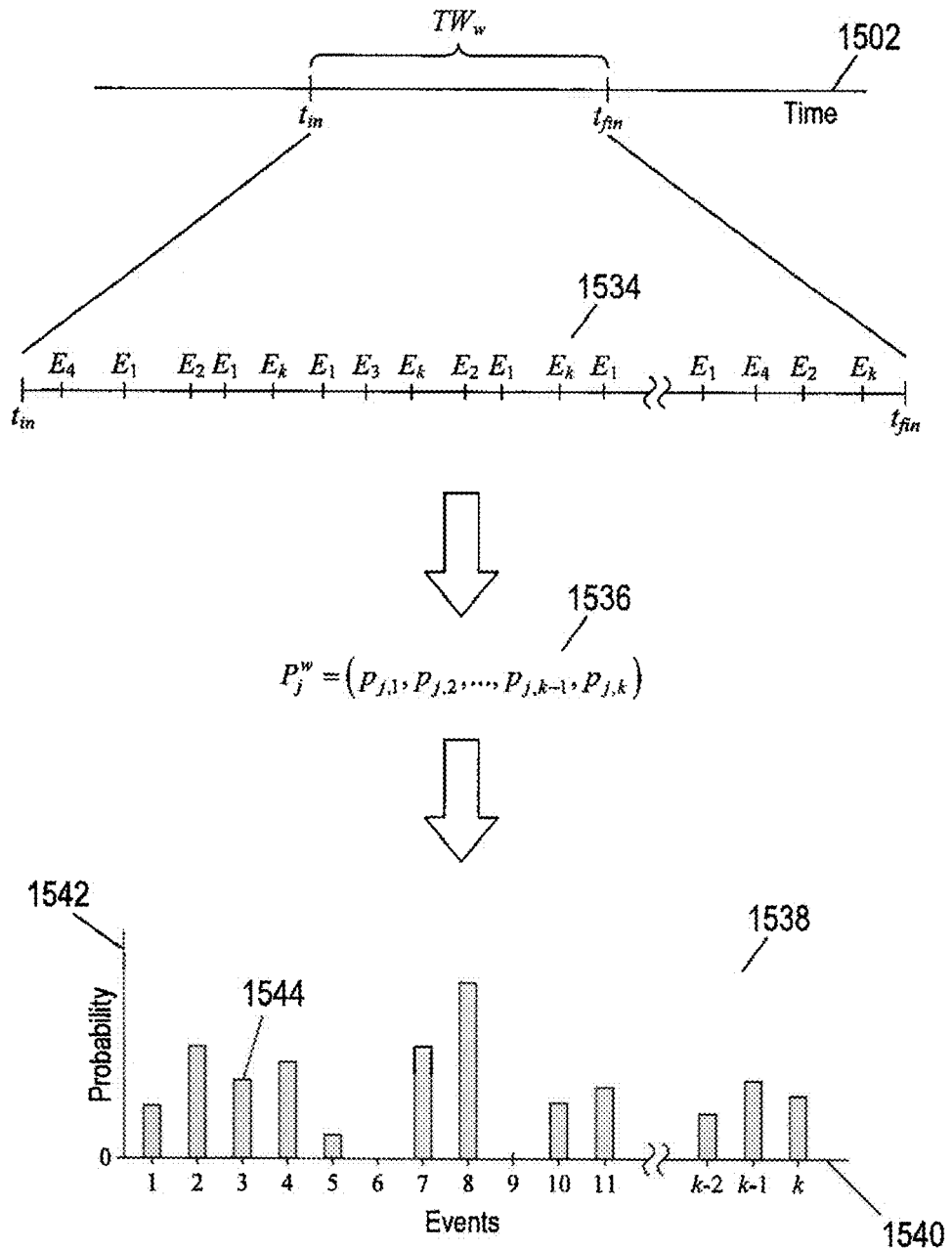
FIG. 15B shows an example of forming an event distribution for an object

FIG. 15B shows an example of forming an event distribution for the object $O_j$. FIG. 15B shows a magnified view 1534 of the time window $TW_w$. Marks located on time axis 1502 represent points in the time window $TW_w$ when events associated with the object described above with reference to FIG. 15A where recorded. For example, marks identified as event $E_1$ correspond to the threshold violation events associated with the metric $m_1$ in the plot 1504 of FIG. 15A.

The operations management server 132 computes a probability for each type of event in the time window $TW_w$ as follows:

$$p_{j,i}^w = \frac{n(E_i)}{N_E} \quad (13)$$

where subscript j is the object index;

$n(E_i)$ is the number of times the i-th event $E_i$ occurred in the time window $TW_w$; and $N_E$ is the total number events across the different types of events that occurred in the time window $TW_w$ (i.e., $N_E = \sum_{i=1}^{k} n(E_i)$).

The operations management server 132 assembles the probabilities of the different types of events in the time window $TW_w$ into a historical event distribution 1536 given by $$P_j^w = (p_{j,1}^w, p_{j,2}^w, p_{j,3}^w, \ldots, p_{j,k-1}^w, p_{j,k}^w) \quad (14)$$

Note that event distributions, in general, may have zero probabilities that correspond to types of events that did not occur in the time window $TW_w$. For example, in FIG. 15A, none of the metric values associated with the metric $m_l$ represented by plot 1506 violated the threshold 1521. As a result, $n(E_l) = 0$ and the associated probability is $p_{j,l}^w = 0$.

Returning to FIG. 15B, FIG. 15B shows an example plot 1538 of the event distribution 1536. Horizontal axis 1540 identifies the indices of the types of events. Vertical axis 1542 is a probability range. Bars represent the values of the probabilities of the events. For example, bar 1544 represents the value of the probability $p_{j,3}^w$. Note that the event distribution 1536 also includes zero probabilities $p_{j,6}^w$ and $p_{j,9}^w$ for the corresponding events $E_6$ and $E_9$, which means the events $E_6$ and $E_9$ did not occur in the time window $TW_w$.

The operations management server 132 determines a baseline distribution for each of the objects $O_j$, $j = 1, 2, \ldots, J$. The operations management server 132 applies random sampling L of event distributions for the W different time windows using the binomial distribution as a confidence control. The binomial distribution gives the probability of randomly selecting L event distributions from the W time windows in which the object is a normal operational state:

$$\text{Prob}(L \text{ successes in } W \text{ trials}) = \frac{W!}{L!(W-L)!} P^L (1-P)^{W-L} \quad (15a)$$

where P is the probability of finding the object $O_j$ in a normal operational state.

The probability of randomly selecting L or more historical event distributions from the W different time windows in which the object $O_j$ is in a normal operational state is computed from the cumulative binomial distribution:

$$P_{cum}(X \geq L) = \sum_{i=L}^{W} \frac{W!}{L!(W-L)!} P^i (1-P)^{W-i} \quad (15b)$$

where $L \leq W$.

The cumulative binomial distribution of Equation (15b) is a confidence level for randomly selecting L historical event distributions for the W different time windows correspond to the object being in a normal operational state.

The following table gives examples of confidence levels that at least L historical event distributions of the W time windows correspond to the object $O_j$ being in a normal operational state for three difference probabilities of finding the object $O_j$ in a normal operational state:

| P of success | W | Minimum L | $P_{cum}(X \geq L) > 0.9995$ |
|---|---|---|---|
| 0.99 | 10 | 8 | 0.9998 |
| 0.95 | 10 | 6 | 0.9999 |
| 0.90 | 10 | 5 | 0.9998 |

The left-hand column list probabilities of finding the object $O_j$ in a normal operational state (i.e., probability of a success). The minimum L column is the number of historical event distributions that can be randomly selected for the ten time windows with a confidence listed in the right-hand column that the L randomly selected historical event distributions correspond to the object $O_j$ in a normal operational state. For example, when the normal state probability is $P = 0.99$, there is a very high confidence level of 0.9998 that at least eight (i.e., $L = 8$) randomly selected historical event distributions will correspond to the object being in a normal operational state.

The set of L randomly selected historical event distributions for the object $O_j$ are called as dominant distributions given by:

$$\text{Dominant} = \{\overline{P}_j^1, \overline{P}_j^2, \ldots, \overline{P}_j^L\} \quad (16)$$

where the overbar denotes a dominant distribution.

The operations management server 132 determines a baseline distribution for the object $O_j$ from the set of dominant distributions according to the maximum entropy principle. The operations management server 132 computes the entropy for each of the L dominant distributions associated with the object $O_j$ as follows:

$$H(\overline{P}_j^l) = -\sum_{i=1}^{k} p_{j,i}^l \log_2 p_{j,i}^l \quad (17)$$

where $l = 1, \ldots, L;$ and $p_{j,i}^l$ is the probability of the event $E_i$ in the dominant distribution $\overline{P}_j^l$.

The maximum entropy is given by $$H_{max} = \max\{H(\overline{P}_j^1), \ldots, H(\overline{P}_j^L)\} \quad (18)$$

Figure 16:
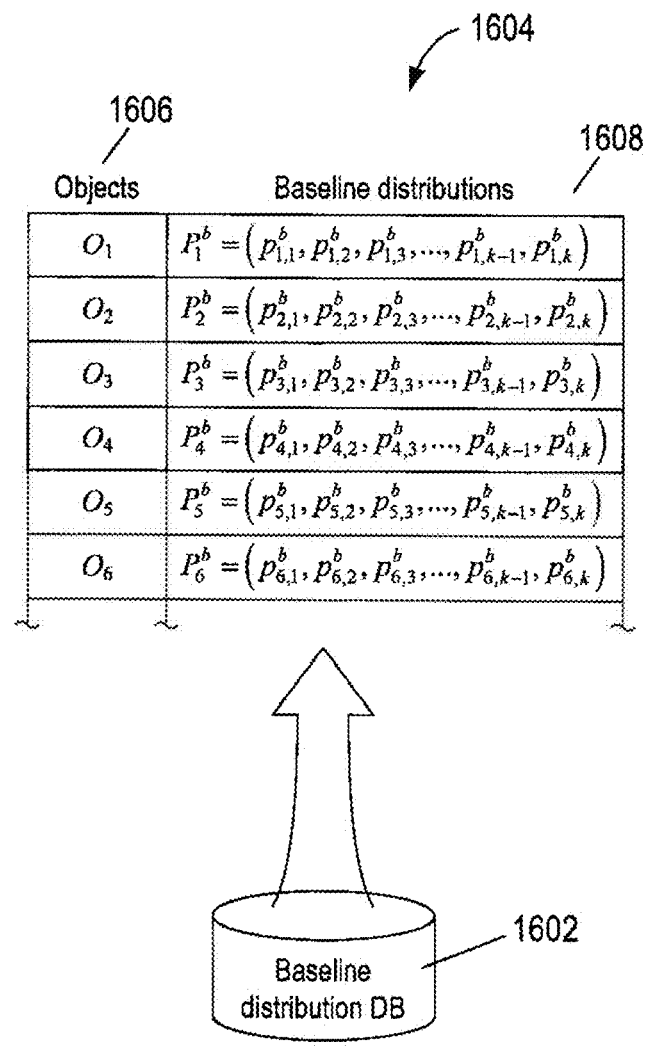
FIG. 16 shows an example of baseline distributions stored in an object distributions database.

The dominant distribution with the largest corresponding entropy, $H_{max}$, is the baseline distribution for the object $O_j$ in the normal operational state and is denoted by $$P_j^b = (p_{j,1}^b, \ldots, p_{j,i}^b, \ldots, p_{j,k}^b) \quad (19)$$

where the superscript "b" denotes a baseline distribution. The operations management server 132 repeats the operations represented by Equations (15a)-(19) for each of the J objects. The baseline distributions computed for the objects $O_j$, $j = 1, 2, \ldots, J$, are stored in a baseline distributions database 1602 as shown in FIG. 16. In the example of FIG. 16, the contents of the baseline distributions database 1602 are represented by a table 1604. Column 1606 list the objects. Column 1608 list the corresponding baseline distributions computed for each of the objects.

The operations management server 132 detects outlier objects of the data center by computing an expected system deviation for each object. The expected system deviation is determined for each object by computing the distance between the baseline distribution and each of the distributions in the dominant distributions of the object. In one implementation, the distance is computed using a cosine distance for l=1, ..., L and $P_j^b \neq \overline{P}_j^l$:

$$Dist_{CS}(P_j^b, \overline{P}_j^l) = \frac{2}{\pi} \cos^{-1}\left[\frac{\sum_{i=1}^{k} p_{j,i}^b p_{j,i}^l}{\sqrt{\sum_{i=1}^{k}(p_{j,i}^b)^2}\sqrt{\sum_{i=1}^{k}(p_{j,i}^l)^2}}\right] \quad (20a)$$

The closer the distance $Dist_{cs}(P_j^b, \overline{P}_j^l)$ is to zero, the closer the event distributions $P_j^b$ and $\overline{P}_j^l$ are to each other. The closer the distance $Dist_{cs}(P_j^b, \overline{P}_j^l)$ is to one, the farther distributions $P_j^b$ and $\overline{P}_j^l$ are from each other. In another implementation, the distance between event distributions is computed using the Jensen-Shannon divergence for l=1, ..., L and $P_j^b \neq \overline{P}_j^l$:

$$Dist_{JS}(P_j^b, \overline{P}_j^l) = -\sum_{i=1}^{k} M_i \log_2 M_i + \frac{1}{2}\left[\sum_{i=1}^{k} p_{j,i}^b \log_2 p_{j,i}^b + \sum_{i=1}^{k} p_{j,i}^l \log_2 p_{j,i}^l\right] \quad (20b)$$

where $M_i = (p_{j,i}^b + p_{j,i}^l)/2$.

The Jensen-Shannon divergence ranges between zero and one and has the properties that the distributions $P_j^b$ and $\overline{P}_j^l$ are similar the closer $Dist_{JS}(P_j^b, \overline{P}_j^l)$ is to zero and are dissimilar (i.e., farther apart) the closer $Dist_{JS}(P_j^b, \overline{P}_j^l)$ is to one. In the following discussion, the distance $Dist(P_j^b, \overline{P}_j^l)$ represents the distance $Dist_{CS}(P_j^b, \overline{P}_j^l)$ or the distance $Dist_{JS}(P_j^b, \overline{P}_j^l)$.

The operations management server 132 computes an expected deviation from the baseline distribution of the object $O_j$ as follows:

$$\text{MaxDist}(j) = \max\{Dist(P_j^b, \overline{P}_j^1), \ldots, Dist(P_j^b, \overline{P}_j^L)\} \quad (21)$$

In other words, the expected deviation MaxDist(j) is an acceptability limit, or threshold, for determining how far a runtime distribution for the object $O_j$ can be from the baseline distribution for the object $O_j$.

The operations management server 132 detects outlier objects by comparing the baseline distribution for each of the objects $O_j$ to an event distribution computed for each of the objects $O_j$ (i.e., for j=1, 2, ..., J) in a time window TW:

$$P_j = (p_{j,1}, p_{j,2}, p_{j,3}, \ldots, p_{j,k-1}, p_{j,k}) \quad (22)$$

where $p_{j,i}$ denotes a probability of the event $E_i$ occurring in the time window.

Probabilities of the events in the event distribution are computed for each type of event associated with the object $O_j$:

$$p_{j,i} = \frac{n(E_i)}{N_{TW}} \quad (23)$$

where $n(E_i)$ is the number of times the event $E_i$ occurs in the time window TW; and $N_{TW}$ is the total number events recorded in the time window TW.

The probabilities are computed when the end of the time window is reached. The time window TW does not overlap with (i.e., is outside of) the historical time period 1404. For example, the time window W may occur after the historical time period 1404, such as during runtime of the object, or the time window TW can be for another historical period of time outside the historical time period 1404 used to construct the baseline distributions.

Figure 17:
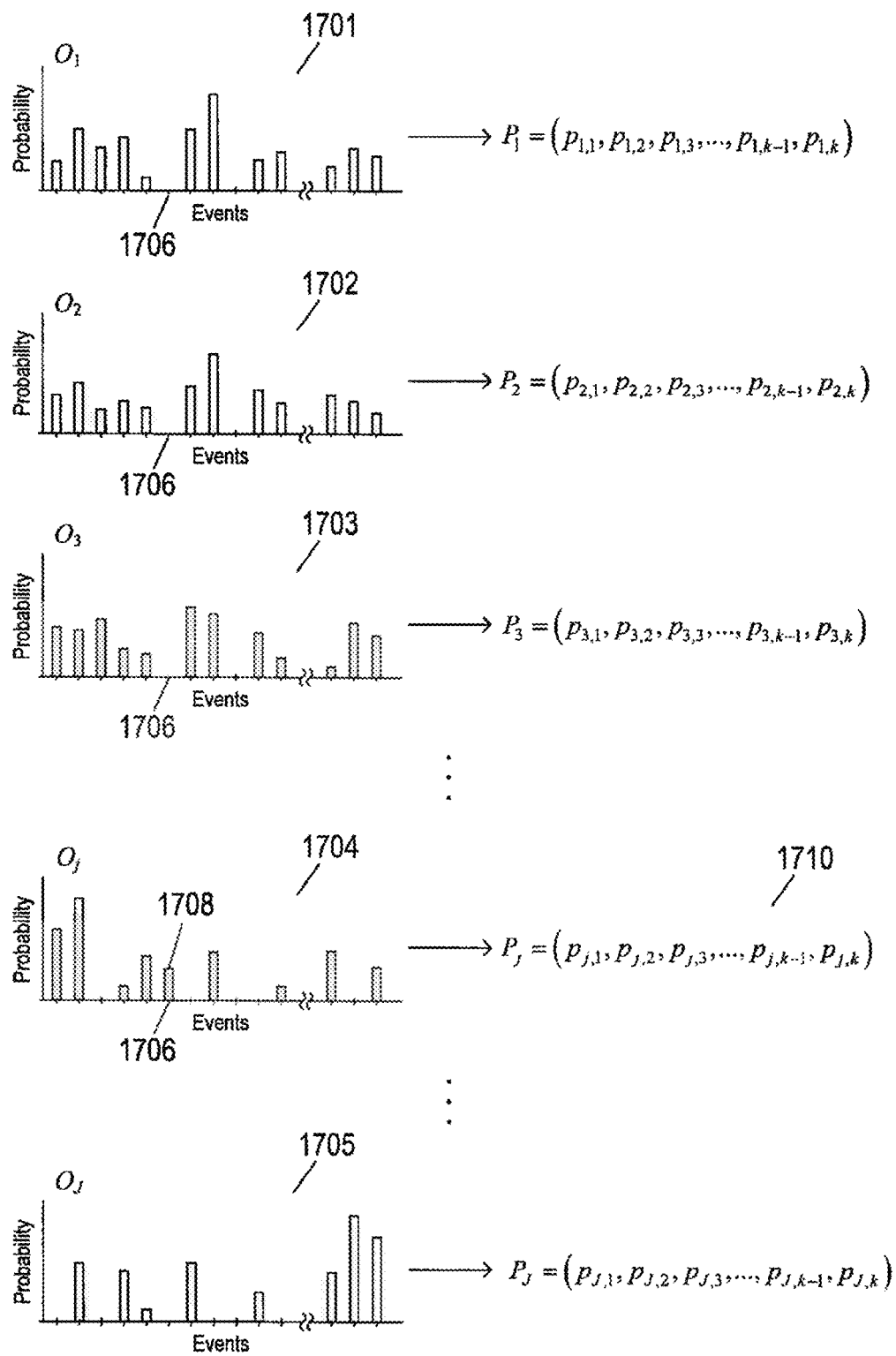
FIG. 17 shows example plots of event distributions computed for each object of a data center in a time window.

FIG. 17 shows example plots 1701-1705 of event distributions computed for each of the J objects of the data center in the time window TW. Note that event distributions may have different probabilities associated with the different types of events. For example, event distributions 1701-1703 have zero probabilities at the event 1706 while event distribution 1704 has a non-zero probability 1708 at the event 1706. In other words, during the time window TW, the event 1706 occurred a number of times for object $O_j$ but did not occur for objects $O_1$, $O_2$, and $O_3$. For example, event 1706 may correspond to a CPU usage violation of a corresponding threshold. In this example, objects $O_1$, $O_2$, and $O_3$ did not have a CPU usage violation while object $O_j$ experienced a CPU usage violation a number of times in the time window TW.

The J event distributions determined for the J objects are k-tuples that represent J points in a k-dimensional space. For example, event distribution 1710 is a k-tuple that represents a point in the k-dimensional space. The operations management server 132 detects outlier objects by computing the distance $Dist(P_j^b, P_j)$ between a baseline distribution $P_j^b$ and the most recently obtained event distribution $P_j$ for each of the objects $O_j$. When the distance satisfies the following condition $$Dist(P_j^b, P_j) > \text{MaxDist}(j) \quad (24a)$$

the object $O_j$ is in a normal operational state. Alternatively, when the distance between the baseline distribution and the event distribution satisfies the following condition:

$$Dist(P_j^b, P_j) > \text{MaxDist}(j) \quad (24b)$$

the object $O_j$ is tagged as an outlier object in the operational status database. Outlier objects are denoted by $O_q^o$ and the corresponding event distributions are denoted by $P_j^o$ and the corresponding outlier event distributions are denoted by $\{P_1^o, P_2^o, \ldots, P_Q^o\}$, where subscript Q denotes the number of outlier objects (i.e., Q≤J).

The operations management server 132 performs machine learning to identify clusters of similar outlier objects based on distances between the event distributions of the outlier objects in the k-dimensional space. The operations management server 132 computes the distance. $Dist(P_q^o, P_v^o)$, between pairs of event distributions associated with outlier objects $O_q^o$ and $O_v^o$, where 1≤q, v≤Q. The distance $Dist(P_q^o, P_v^o)$ can be the cosine distance in Equation (20a) or the Jensen-Shannon divergence in Equation (20b).

Figures 18, 19:
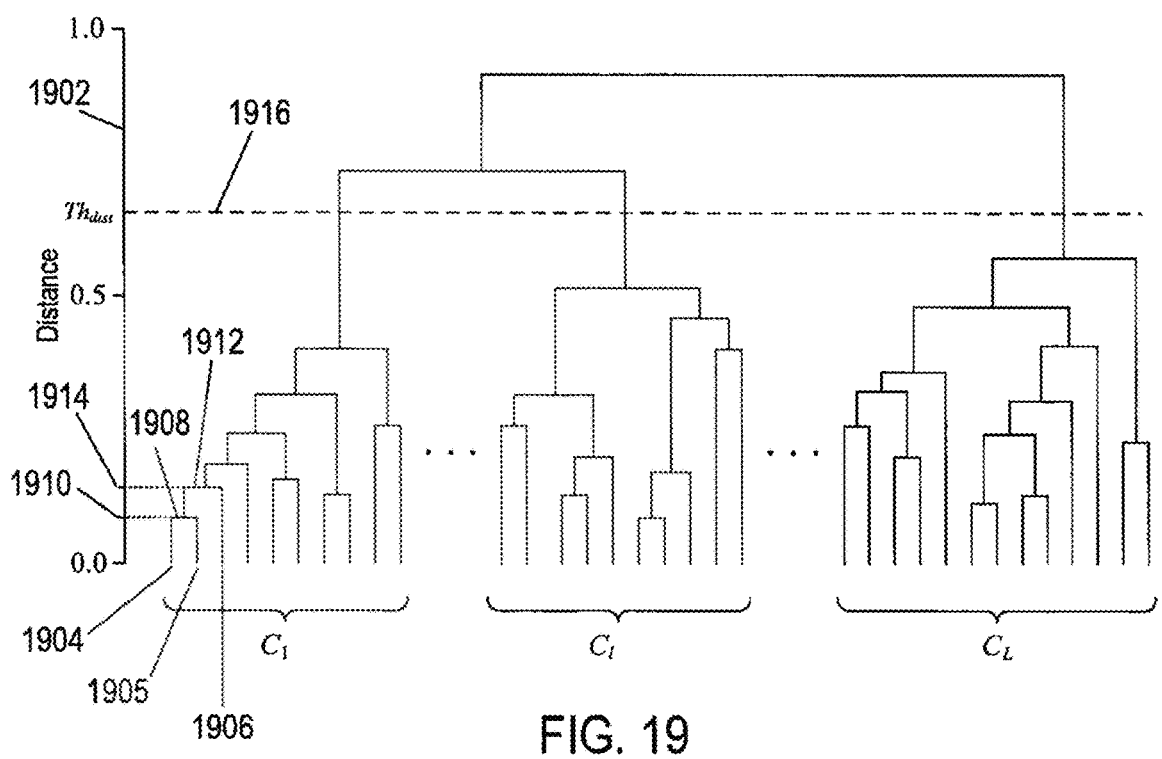
FIG. 18 shows an example matrix of distances calculated for pairs of event distributions.
FIG. 19 shows an example dendrogram constructed from distances between pairs of event distributions.

FIG. 18 shows an example matrix of distances calculated for each pair of event distributions. The matrix elements are denoted by $Dist(P_q^o, P_v^o)$, where 1≤q, v≤Q. For example, distance matrix element $Dist(P_2^o, P_3^o)$ 1802 represents the distance between event distributions $P_2^{ro}$ and $P_3^{ro}$. Note that because $Dist(P_q^o, P_v^o) = Dist(P_v^o, P_q^o)$, the distance matrix is a symmetric matrix with only the upper diagonal matrix elements represented. The diagonal elements are equal to zero (i.e., $Dist(P_q^o, P_q^o) = 0$).

After distances have been calculated for each pair of event distributions, the operations management server 132 performs hierarchical clustering to identify clusters of objects. Hierarchical clustering is an unsupervised learning technique for identifying clusters of similar outlier objects. An outlier object is an object whose behavior deviates from past normal behavior for the object. An outlier object may have entered into an abnormal operational state or may still be in a normal operational state in spite of deviating from past normal behavior. Hierarchical clustering is applied to the distances in the distance matrix using an agglomerative approach to create a dendrogram of clusters of event distributions. A dendrogram is a branching tree diagram that represents a hierarchy of relationships between event distributions. The resulting dendrogram may then be used to identify clusters of objects.

FIG. 19 shows an example dendrogram constructed from distances between pairs of event distributions associated with outlier objects. Vertical axis 1904 represents a range of distances between 0 and 1. The dendrogram is a branching tree diagram in which the ends of the dendrogram, called "leaves," represent the event distributions. For example, leaves 1904-1906 represent three different event distributions. The branch points represent the distances between the event distributions. For example, branch point 1908 corresponds to the distance 1910 between the event distributions 1904 and 1905. Branch point 1912 corresponds to the distance 1914 between the event distributions 1905 and 1906. The height of a branch point represents the distance, or degree of similarity, between two event distributions. In the example of FIG. 19, the smaller the value of a branch point, the closer the event distributions are to each other in the k-dimensional space. For example, because the branch point 1908 is closer to zero than the branch point 1912, the event distributions 1904 and 1905 are more similarity to one another than the distributions 1905 and 1906.

A distance threshold, $Th_{dist}$, is used to separate or cut event distributions into clusters. The distance threshold may be selected to obtain a desired clustering of event distributions. Event distributions connected by branch points (i.e., distances) that are greater than the distance threshold are separated or cut into clusters. For example, in FIG. 19, dashed line 1916 represents a distance threshold. Event distributions connected by branch points (i.e., distances) that are greater than the threshold $Th_{dist}$ are separated into clusters. In other words, event distributions with distances that are less than the threshold 1916 form clusters. For example, $C_1$ is a cluster of event distributions connected by branch points that are less than the threshold $Th_{dist}$, $C_I$ is a cluster of event distributions connected by branch points that are less than the threshold $Th_{dist}$, and $C_L$ is a cluster of event distributions connected by branch points that are less than the threshold $Th_{dist}$.

Figures 20A, 20B:
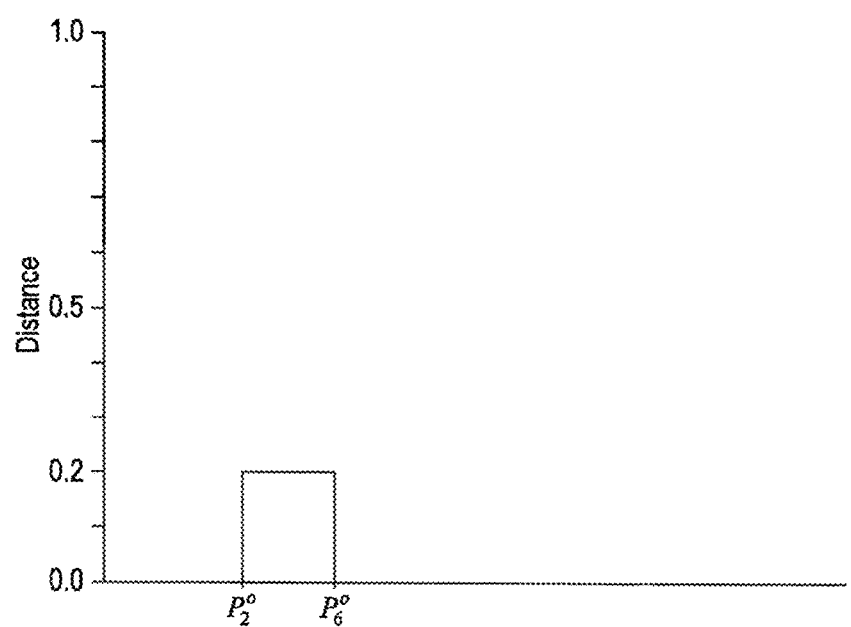
FIGS. 20A-20L show an example of hierarchical clustering applied to event distributions.
Figures 20C, 20D:
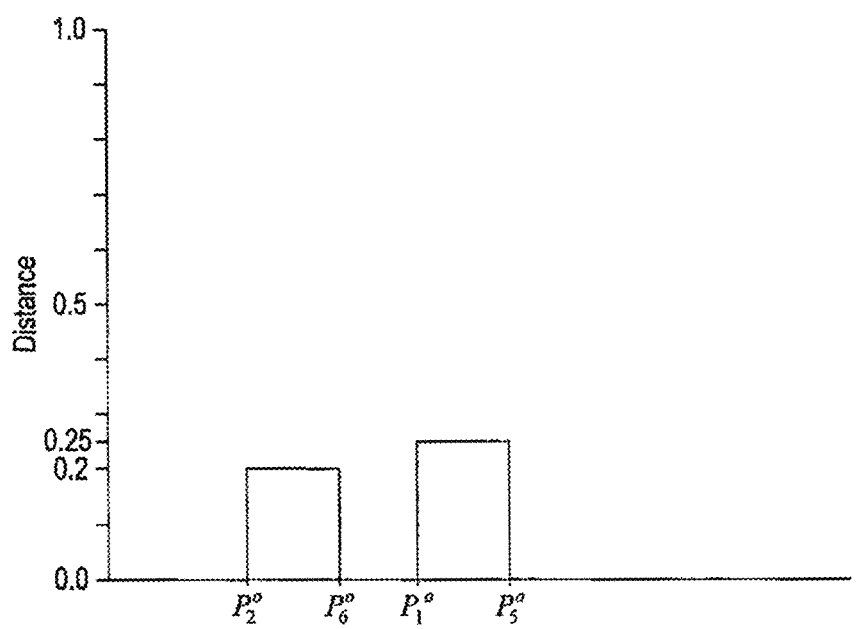
Figures 20E, 20F:
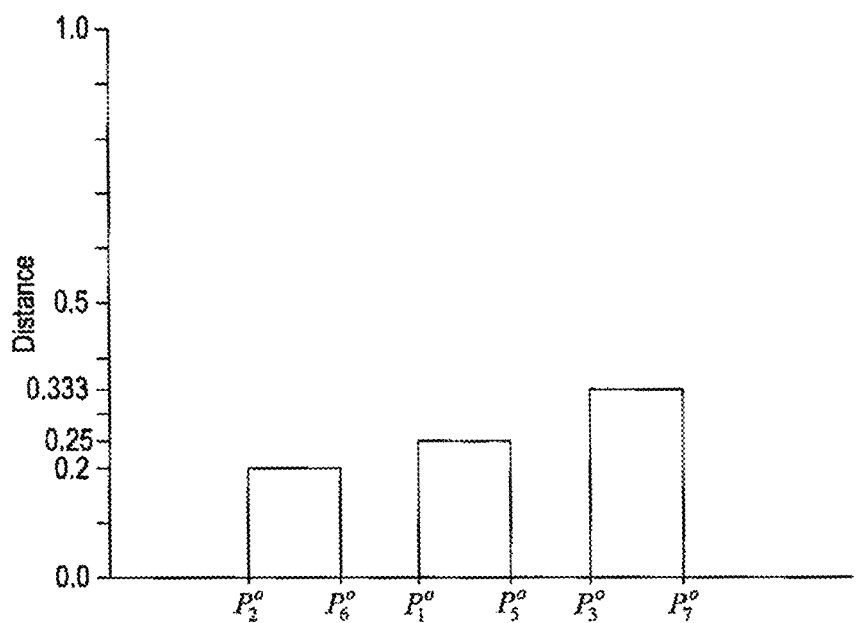
Figures 20G, 20H:
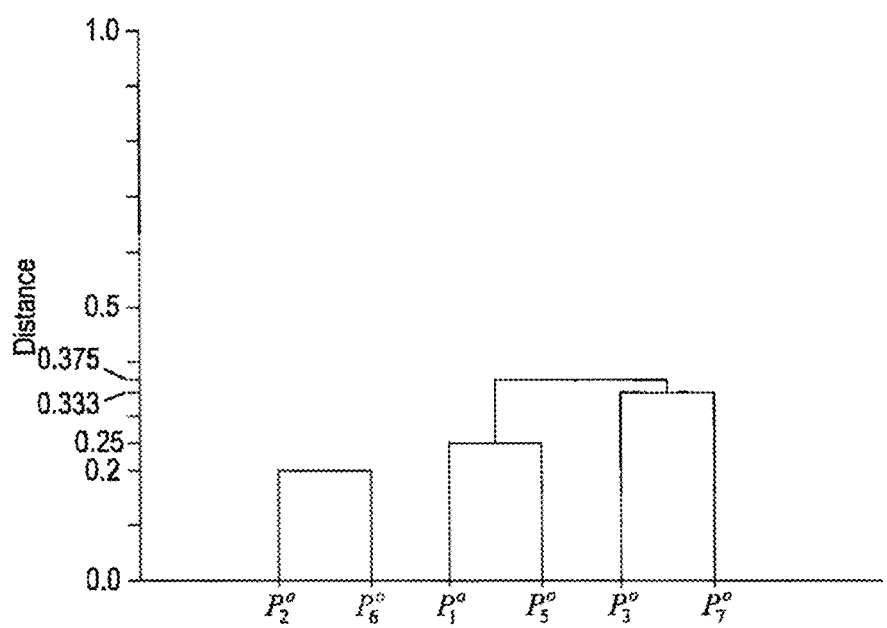
Figures 20I, 20J:
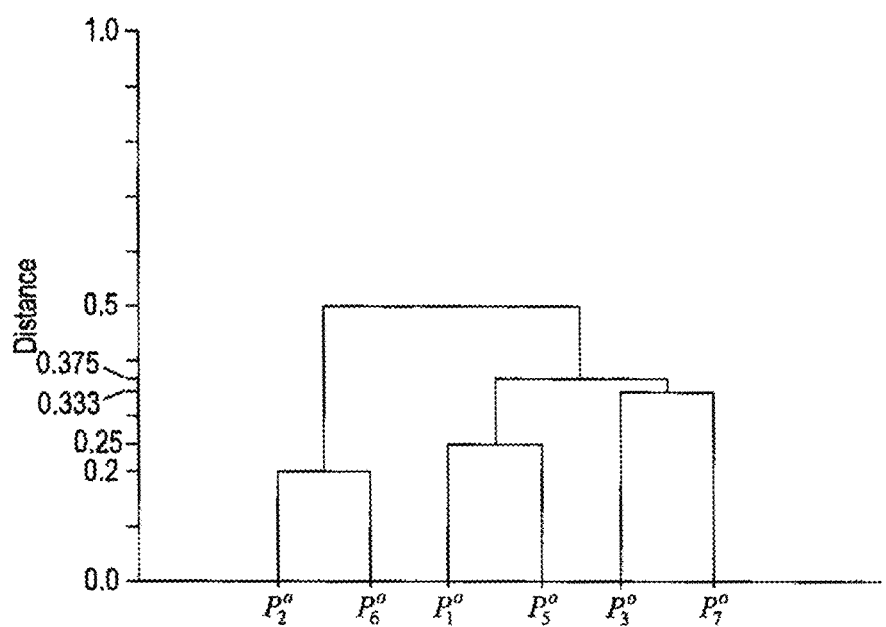
Figures 20K, 20L:
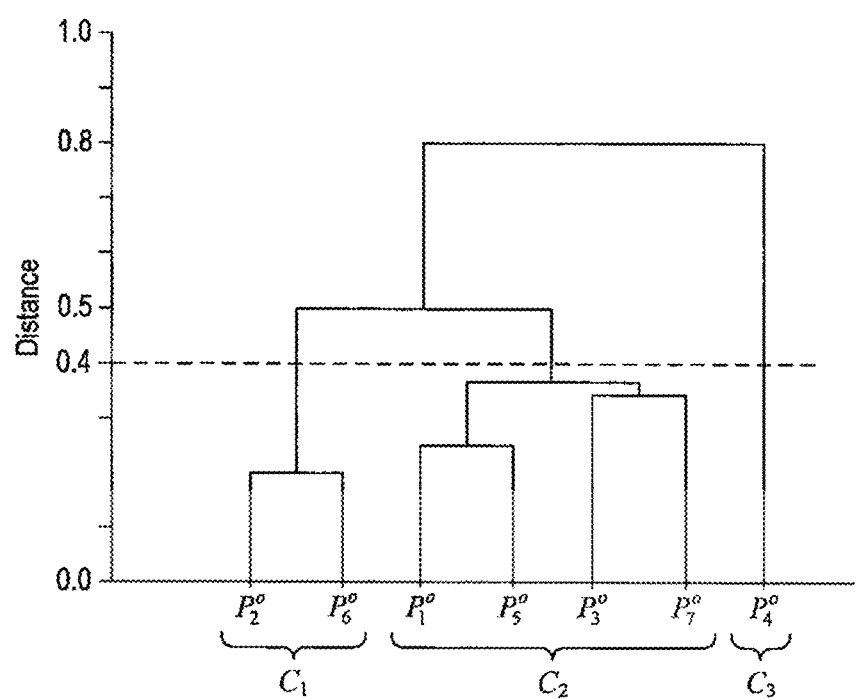

FIGS. 20A-20L show an example of hierarchical clustering applied to seven event distributions using a minimum linkage (i.e., minimum distance) criterion. The event distributions are denoted by $P_1^o$, $P_2^o$, $P_3^o$, $P_4^o$, $P_5^o$, $P_6^o$, and $P_7^o$. FIG. 20A shows an example distance matrix calculated for each pair of the seven event distributions. An initial step in hierarchical clustering is identifying a pair of event distributions with the shortest distance. In the example of FIG. 20A, event distributions $P_2^o$ and $P_6^o$ have the smallest distance of 0.2. In FIG. 20B, event distributions $P_2^o$ and $P_6^o$ are the first two leaves added to the dendrogram and are linked at the distance 0.2. After the pair of event distributions have been linked, a reduced distance matrix is formed in FIG. 20C. The event distributions $P_2^o$ and $P_6^o$ are removed from the distance matrix in FIG. 20C and linked event distributions $(P_2^o, P_6^o)$ is introduced. The minimum linkage criterion is used to determine the distances between the linked event distributions $(P_2^o, P_6^o)$ and the other event distributions in the row 2002. The distance at each element of the row 2002 is the minimum of the distance of the linked event distributions $(P_2^o, P_6^o)$ with each of the remaining event distributions. For example, Dist($P_2^o$, $P_3^o$) is 0.704 and Dist($P_6^o$, $P_3^o$) is 0.667 obtained from corresponding matrix elements in FIG. 20A. The min(Dist($P_2^o$, $P_3^o$),Dist($P_6^o$, $P_3^o$)) is 0.667. Therefore, the distance between the linked event distribution $(P_2^o, P_6^o)$ and the event distribution $P_3^o$ is 0.667 as represented by matrix element 2004. The remaining elements in the row 2002 in FIG. 20C are determined in the same manner. The smallest distance in the distance matrix of FIG. 20C is 0.25 2006 for event distributions $P_1^o$ and $P_5^o$. In FIG. 20D, the event distributions $P_1^o$ and $P_5^o$ are two more leaves added to the dendrogram linked at the distance 0.25. The rows associated with the event distributions $P_1^o$ and $P_5^o$ are removed from the distance matrix shown in FIG. 20E and the minimum linkage criterion is repeated for the linked event distributions $(P_1^o, P_5^o)$ in order to obtain the distances in the row 2008 in FIG. 20E. For example, in FIG. 20C, the distance between $(P_2^o, P_6^o)$ and $P_1^o$ is 0.5 and the distance between $(P_2^o, P_6^o)$ and $P_5^o$ is 0.667. The minimum of the two distances is 0.5 as represented by the matrix element 2008 in FIG. 20E. The remaining elements in the row 2010 in FIG. 20E are determined in the same manner. The smallest distance in the distance matrix of FIG. 20E is 0.333 2012. In FIG. 20F, the event distributions $P_3^o$ and $P_7^o$ are two more leaves added to the dendrogram and are linked at the distance 0.333. FIGS. 20G-20L show distance matrices and corresponding dendrograms constructed using the minimum linkage criterion at each step. FIG. 20L shows the final dendrogram.

In FIG. 20L, dashed line 2014 represents a distance threshold of 0.40. In other words, the distance threshold of 0.40 is a maximum distance. Event distributions with distances smaller than the distance threshold form clusters. For example, event distributions $P_2^o$ and $P_6^o$ have a distance of 0.2 and the event distributions $P_1^o$, $P_5^o$, $P_3^o$, and $P_7^o$ have distances that are less than 0.4. But the event distributions $P_2^o$ and $P_6^o$ have a minimum linked distance of 0.5 with the event distributions $P_1^o$, $P_5^o$, $P_3^o$, and $P_7^o$, which is greater than the threshold of 0.40. Therefore, the event distributions $P_2^o$ and $P_6^o$ form a cluster $C_1$ and the event distributions $P_1^o$, $P_5^o$, $P_3^o$, and $P_7^o$ form another cluster $C_2$. Because the event distribution $P_4^o$ has a distance of 0.8 with the event distributions in the clusters $C_1$ and $C_2$, event distribution $P_4^o$ is the element of the cluster $C_3$.

Figure 21:
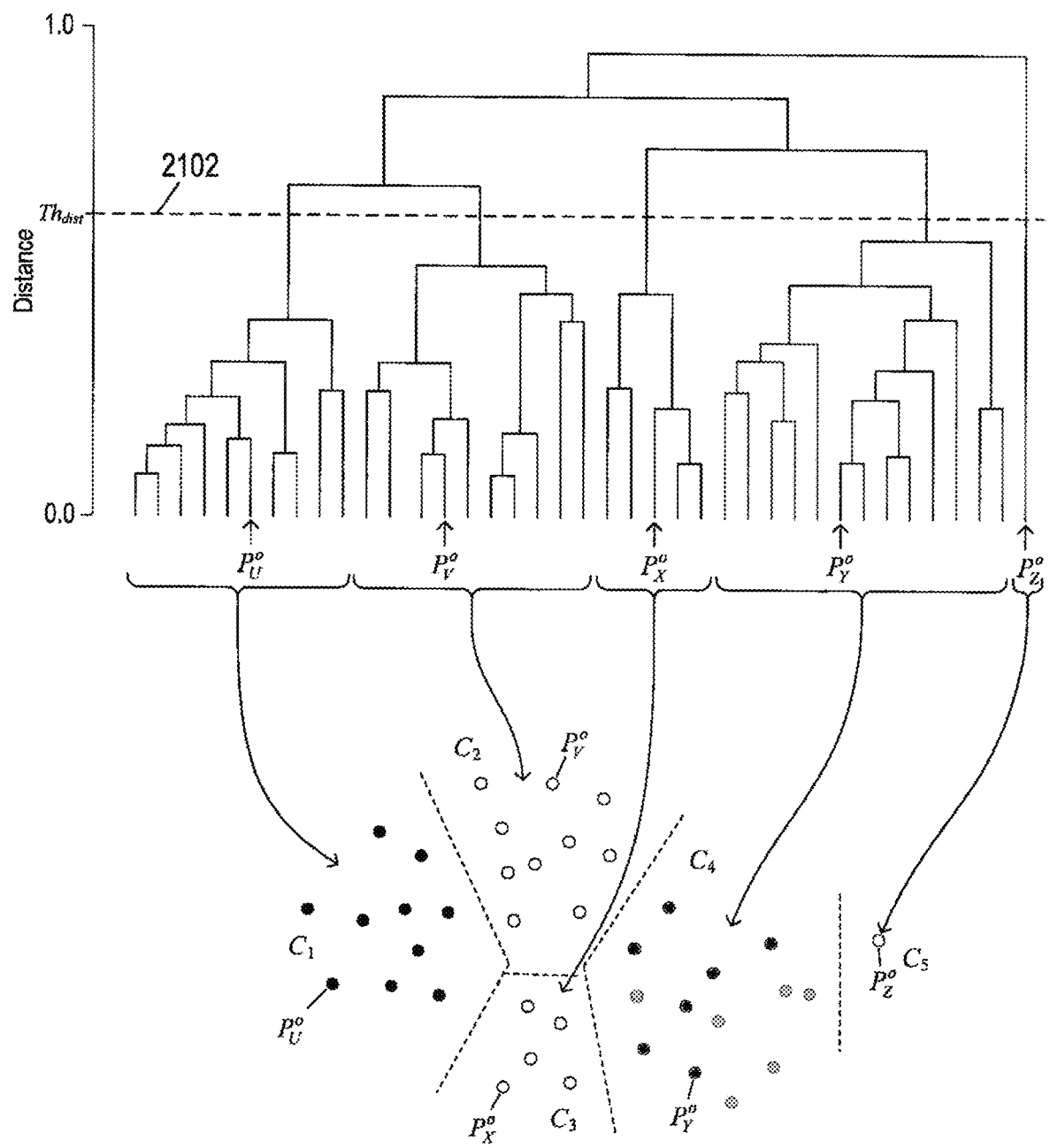
FIG. 21 shows an example dendrogram with clusters of event distributions.

FIG. 21 shows an example dendrogram with clusters of event distributions of outlier objects. Dashed line 2102 represents a distance threshold $Th_{dist}$ that creates fives clusters of event distributions denoted by $C_1$, $C_2$, $C_3$, $C_4$, and $C_5$. For example, cluster $C_1$ includes event distribution $P_V^o$, cluster $C_2$ includes event distribution $P_U^o$, cluster $C_3$ includes event distribution $P_X^o$, cluster $C_4$ includes event distribution $P_Y^o$, and cluster $C_5$ comprises only one event distribution $P_Z^o$. The event distributions correspond to points in a k-dimensional space. FIG. 21 shows an example of a k-dimensional space represented in two-dimensions with differently shaded points that correspond to event distributions in the clusters $C_1$, $C_2$, $C_3$, $C_4$, and $C_5$. For example, unshaded points represent event distributions in the cluster $C_2$, such as unshaded point 2104 representing event distribution $P_V^o$.

Note that each cluster comprises a set of similar event distributions that correspond to outlier objects in the data center. For example, dark shaded points in the cluster $C_1$ represent similar even distributions that each correspond to similar outlier objects in the data center. Outlier objects with similar event distributions in the same cluster are called "peer objects." Note that although an object has been identified as an outlier object (i.e., deviates from a baseline distribution), the object may still be in a normal operational state. In other words, not all outlier objects correspond to objects experiencing a performance problem.

In one implementation, the operations management server 132 displays a GUI that enables a user, such as a systems administrator, data center tenant, or software engineer, to view the clusters of event distributions and events associated with the outlier objects and verify, or confirm, via the GUI whether the outlier objects of each cluster are in an abnormal operational state (i.e., performance problem) or the outlier objects are not actually in an abnormal state and apply an appropriate status label. In one implementation, a user utilizes the GUI to tag, or assign, each cluster of outlier objects with a "normal" or "abnormal" state label based on the user's determination that the events of the corresponding event distributions correspond to a normal or an abnormal operational state (i.e., performance problem). An outlier object with a performance problem is in an abnormal operational state.

Figure 22:
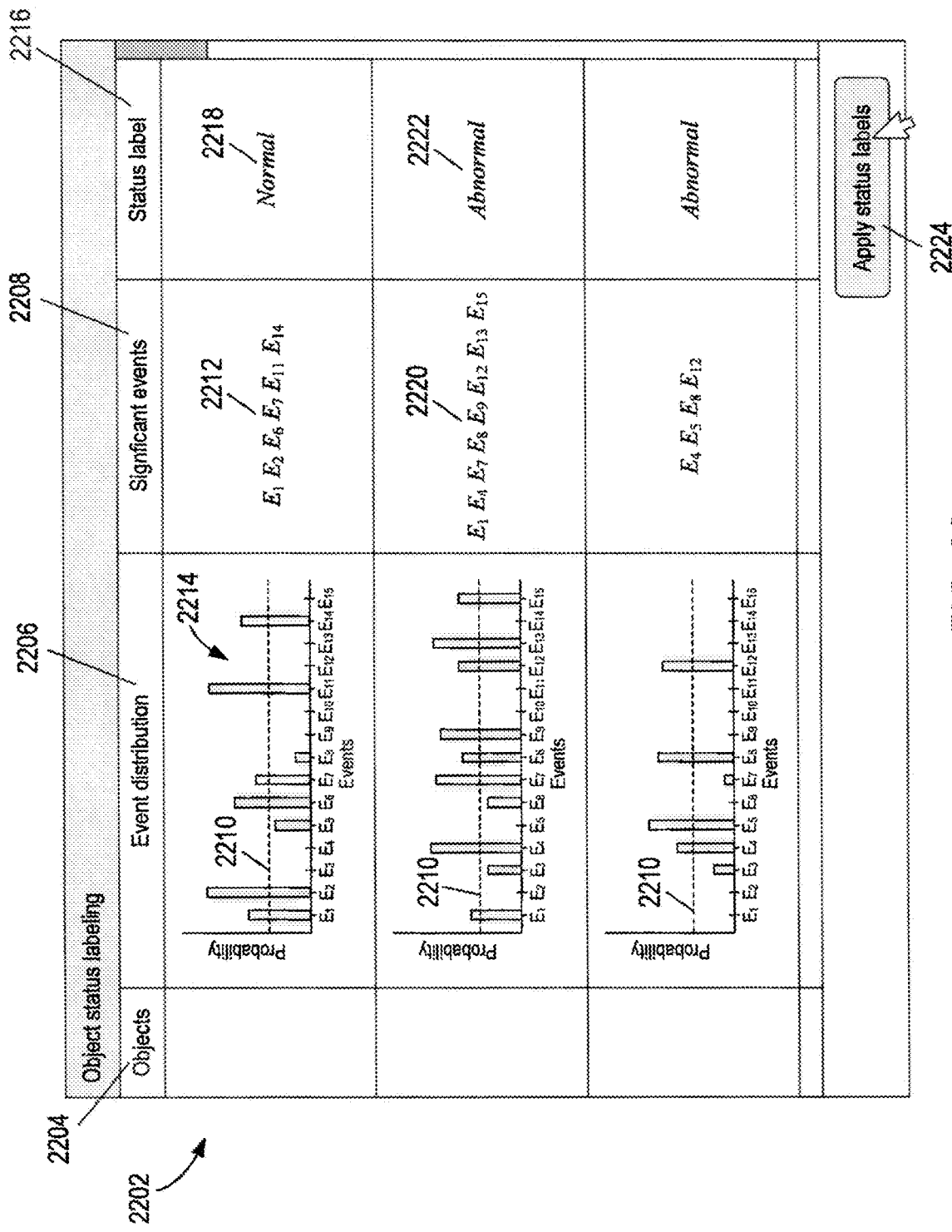
FIG. 22 shows an example graphical user interface ("GUI") that list outlier objects, event distributions, and events.

FIG. 22 shows an example GUI 2202 that list outlier objects in column 2204, associated event distributions are listed in column 2206, and events are listed in column 2208. In this implementation, not all events with non-zero probabilities are list in column 2208 because the number of occurrences of an event may be so infrequent that the event can be considered inconsequential. By contrast, an event that occurs with a higher frequency is significant. In the example, a significance threshold 2210 is used to separate significant events from insignificant events. Column 2208 contains only the events with corresponding probabilities that are greater than the threshold 2210. For example, events 2212 correspond to probabilities in an event distribution 2214 that are greater than the significance threshold 2210. In one implementation, each row of event distribution and significant events corresponds to an object. A user considers the list of significant events associated with an object and enters a status label in column 2216. For example, a user has identified the events 2212 as corresponding to a normal operation state for an object and assigns "Normal" 2218 as the status label for the combination of significant events 2214. On the other hand, the user has identified the events 2220 as corresponding to an abnormal operational state for an object and assigns "Abnormal" 2222 as the status label for the combination of events 2220.

In another implementation, rather than inputting a binary choice for each outlier object, the user can identify the particular type of problem indicated by the event distribution or the significant events as the status label. For example, significant events 2220 may be an indication of a network failure and the user enter a status that states "Abnormal (network failure)" or enter a more descriptive status label. When the user clicks on the button 2224, the objects, event distributions, and/or corresponding significant events are tagged with the user selected status labels and are stored in an operational status database.

In another implementation, the rows of event distributions and events in the GUI 2202 may be representative event distributions and events taken from the different clusters of objects obtained from hierarchical cluster as described above. A user can use the GUI 2202 to label each cluster of objects with the same status label. When the user clicks on the button 2224, the clusters are tagged with the user selected status labels and are stored in an operational status database.

Figure 23A:
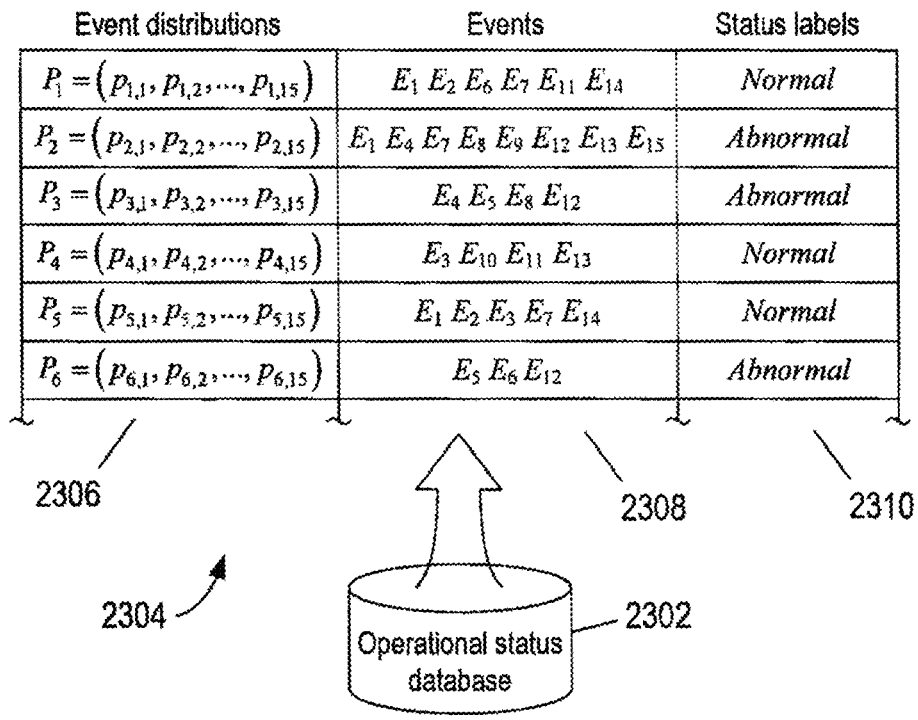
FIGS. 23A-23B show examples contents of operational status databases represented as tables.

FIG. 23A shows example contents of an operational status database 2302 the contents represented as a table 2304. Column 2306 list the runtime distributions. Column 2308 list the significant events. Column 2310 list the status labels assigned to the event distributions and/or the significant events.

In another implementation, a user utilizes the GUI to tag the outlier objects with greater precision to describe the severity of the abnormal states of the outlier objects based on the user's determination that the significant events correspond to particular operational states of the objects. For example, one combination of significant events may correspond to a normal operational state for an object and are tagged with a "Normal" status label. Another combination of events may correspond to an increased concern for the object and are tagged with a "Warning" status label. Another combination of events may correspond to an even greater concern for the object and are tagged with a "Attention required" status label. Another combination of events may correspond to a greatest concern for the object and are tagged with a "Critical" status label. When the user clicks on the apply status labels button of the GUI, the outlier objects, runtime distributions, and corresponding significant events are tagged with the user selected status labels and are stored in the operational status database.

Figure 23B:
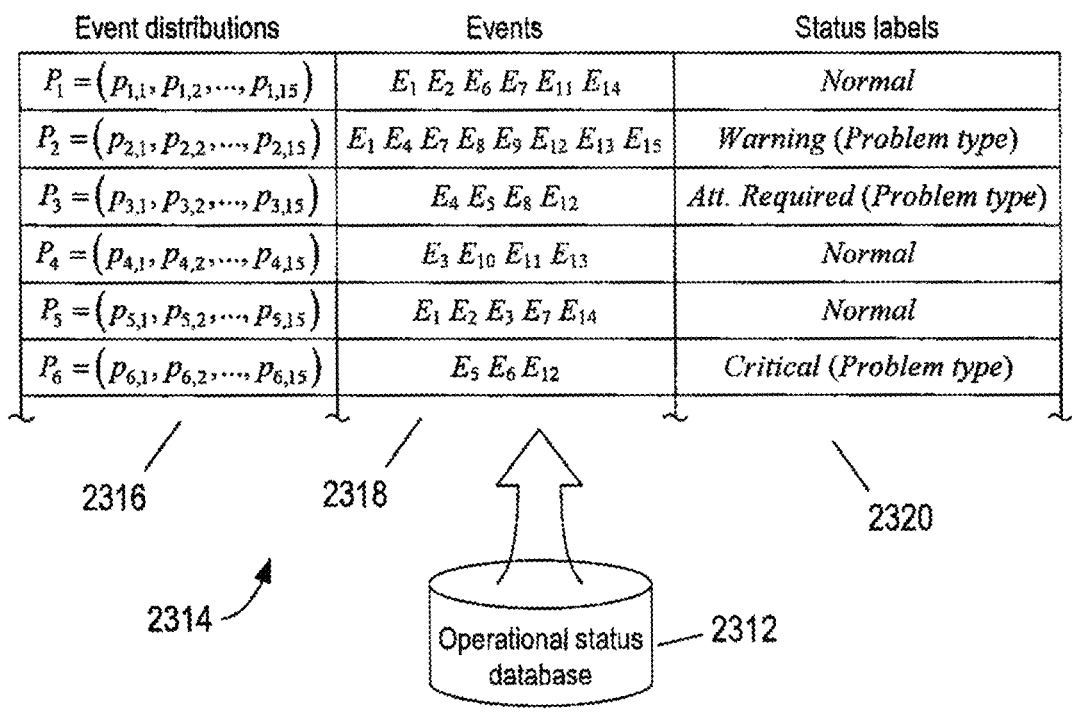

FIG. 23B shows example contents of an operational status database 2314 the contents of which are represented as a table 2316. Column 2318 list the runtime distributions. Column 2320 list the significant events. Column 2322 list the status labels assigned to the runtime distributions and/or significant events.

Note that in FIGS. 23A-23B the operational status database includes the event distributions, the significant events thresholds, and the corresponding status labels. In other implementations, the operational status databases 2302 and 2312 contain only the event distributions and the corresponding status labels or the operational status databases contain only the significant events and the corresponding status labels.

In another implementations, a user can use numbers as status labels for outlier objects. For example, a "0" corresponds to a normal operational state for an outlier object and a "1" corresponds to an abnormal operational state of an outlier object. In another implementation, a user can use numbers to identify different status levels. For example, a "0" corresponds to a normal operational state for an outlier object, a "1" corresponds to a low-level abnormal operational state of an outlier object, a "2" corresponds to a mid-level abnormal operational state of an outlier object, and a "3" corresponds to high-level abnormal operational state of an outlier object.

In an alternative implementation, state labeling is automated and performed using key performance indicator ("KPI") metrics that correspond to the outlier objects. The operations management server 132 automatically monitors in real time KPIs of data center objects for corresponding threshold violations. A KPI is a metric constructed from other metrics and is used as a real time indicator of the health of an object within the data center. For example, a distributed resource scheduling ("DRS") score is a KPI that is constructed from other metrics and is used to measure the performance level of a hardware device, VM, or performance of a distributed application. The DRS score is a measure of efficient use of resources (e.g., CPU, memory, and network) by an object and is computed as a product of efficiencies as follows:

$$DRS\_score(t) = EFFCY_{CPU}(t) \times EFFCY_{Mem}(t) \times EFFCY_{Net}(t)$$

-continued where $$EFFCY_{CPU}(t) = \frac{CPU \text{ usage }(t)}{\text{Ideal } CPU \text{ usage}};$$

$$EFFCY_{Mem}(t) = \frac{\text{Memory usage }(t)}{\text{Ideal Memory usage}}; \text{ and}$$

$$EFFCY_{Net}(t) = \frac{\text{Network throughput }(t)}{\text{Ideal Network throughput}}$$

The metrics CPU usage(t), Memory usage(t), and Network throughput(t) of an object are measured at points in time as described above with reference to Equation (1). Ideal CPU usage, Ideal Memory usage, and Ideal Network throughput are preset. For example, Ideal CPU usage may be preset to 30% of the CPU available to the object and Ideal Memory usage may be preset to 40% of the memory available to the object. DRS scores can be used for, example, as a KPI that measures the overall health of a distributed application by aggregating, or averaging, the DRS scores of each VM in the distributed application. Other examples of KPIs for an application, a VM, or a server computer include average response times, error rates, contention time, or a peak response time. Other types of KPIs that are used to measure the performance level of a distributed application. For example, a KPI for an online shopping distributed application could be the number of shopping carts successfully closed per hour. A KPI for a website may be response times to customer requests. If the object is a network device, such as a switch, router, or a network interface controller. KPIs include latency, throughput, number of packets dropped per unit time, or number of packets transmitted per unit time.

A KPI that violates a corresponding threshold is an indication that the corresponding object has entered an abnormal operational state (i.e., performance problem). The operations management server 132 monitors the KPIs associated with objects and uses the threshold violations to tag outlier objects as being in abnormal or normal operational states, thereby automating the process of tagging outlier objects with status labels and eliminating reliance on a user to tag the outlier objects.

In one implementation, the operations management server 132 tags the outlier objects with an abnormal or normal status label, depending on whether an associated KPI of an outlier object has violated a corresponding KPI threshold in the time window TW. For example, when a KPI of an outlier object violates a corresponding threshold in the time window TW, the operations management server 132 tags the outlier object and corresponding significant events with an abnormal status label. Otherwise, when a KPI of an outlier object does not violate a corresponding threshold in the time window TW, the operations management server 132 tags the object and corresponding significant events with a normal status label.

Figure 24:
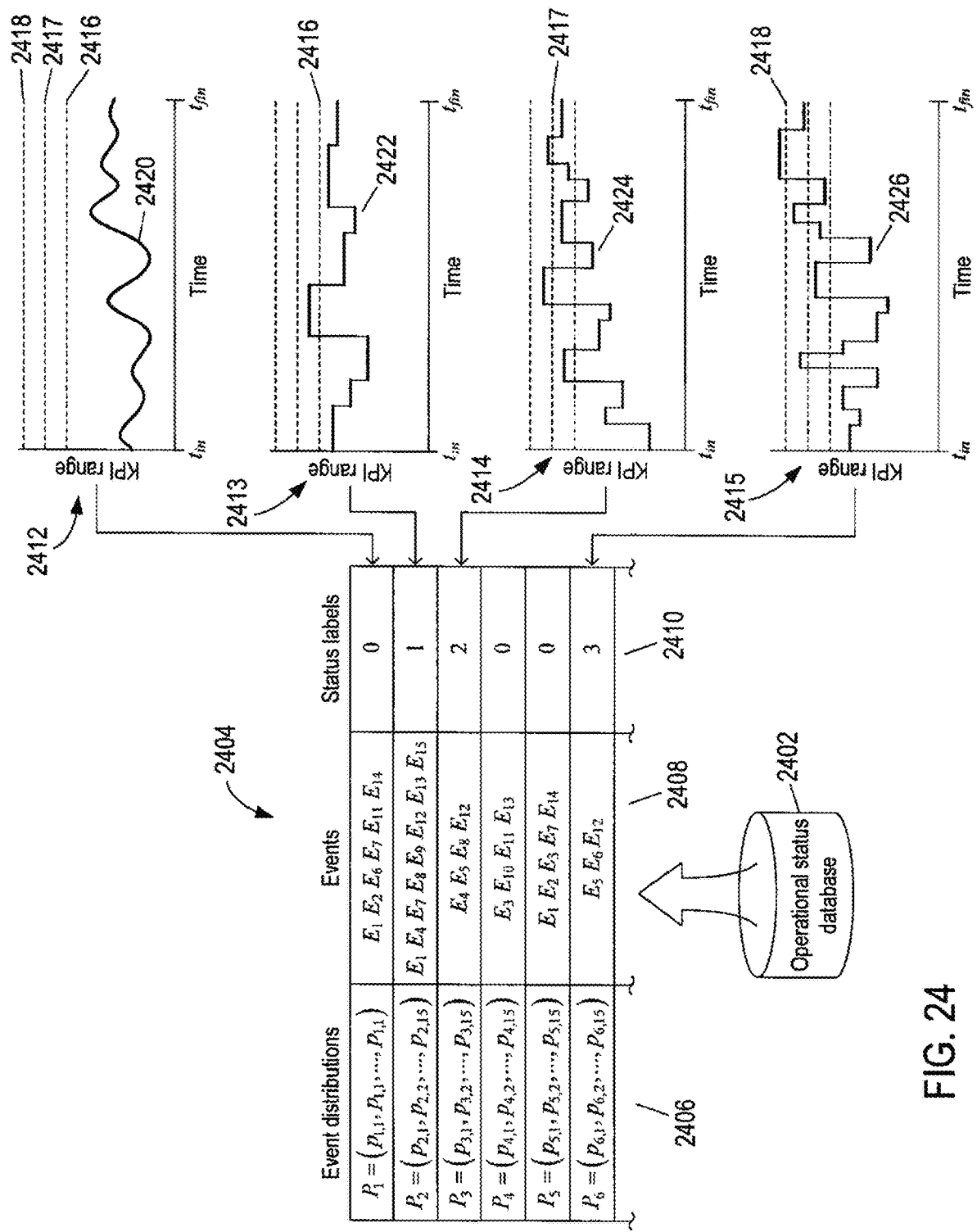
FIG. 24 shows example contents of an operational status database represented in a table.

In another implementation, the KPIs have two or more thresholds that are used to apply status labels to the outlier objects. FIG. 24 shows example contents of an operational status database 2402 for the outlier objects $O_q^o$, q=1, 2, . . . , Q, the contents of which are represented in a table 2404. Column 2406 list the event distributions. Column 2408 list the significant events. Column 2410 list the status labels assigned to the event distributions and/or significant event that have been determined based on KPIs of the outlier objects. In this example status labels are represented by numerical values where "0" is a normal status label, "1" a warning status label, "2" is an attention required status label, and "3" is a critical status label. FIG. 24 shows plots of example KPIs 2412-2415 that correspond to the event distributions and/or significant evets listed in columns 2406 and 2408, respectively. Horizontal axes correspond to the time window TW. In this example, dashed lines 2416-2418 represent three thresholds that are used to distinguish the severity of different performance problems. For example, threshold 2416 is a low-level threshold that distinguishes a normal status label from a "warning" status. Threshold 2417 is a mid-level threshold that distinguishes a "warning" status from an "attention required" status. Threshold 2420 is a high-level threshold that distinguishes an "attention required" status from a "critical" status. For example, in plot 2412 the KPI represented by curved 2420 does not violate the low-level threshold 2416. As a result, the event distributions and significant events are assigned a "0" status label in column 2410 that corresponds to a normal operational state. In plot 2413, the KPI represented by curve 2422 violates the low-level threshold 2416. As a result, the event distributions and significant events are assigned a "1" status label in 2410 that corresponds to a "warning" performance problem level. In plot 2414, the KPI represented by curve 2424 violates the mid-level threshold 2417. As a result, the event distributions and significant events are assigned a "2" in column 2410 that corresponds to an "attention required" performance problem level. In plot 2415, the KPI represented by curve 2426 violates the high-level threshold 2418. As a result, the event distributions and significant events is assigned a "3" in column 2410 that corresponds to a "critical" performance problem level.

Note that in FIG. 24 the operational status database 2402 includes the event distributions, the significant events, and the corresponding status labels. In other implementations, the operational status database 2402 contains only the event distributions and the corresponding status labels or the operational status database 2402 contains only the significant events and the corresponding status labels.

The operations management server 132 uses machine learning and the operational status database, such as databases 2302, 2312, and 2402, to construct a model that is used to identify the operational state (i.e., normal or abnormal operations state) of the objects $O_j$ (i.e., for j=1, 2, . . . , J) in a runtime window denoted by $TW_r$. In other words, the model is used to determination whether object is experiencing a performance problem. The term "runtime" refers to while the object is running or being used to performing an operation. The operations management server 132 computes a runtime distribution for each of the objects $O_j$ (i.e., for J=1, 2, . . . , J) based on the object information generated in a runtime window $TW_r$:

$$P_j^r = (p_{j,1}^r, p_{j,2}^r, p_{j,3}^r, \ldots, p_{j,k-1}^r, p_{j,k}^r) \quad (25)$$

where superscript "r" denotes runtime; and $p_{j,i}^r$ denotes a probability of the event $E_i$ occurring in the time window.

Probabilities of the events in the runtime distribution are computed for each type of event associated with the object $O_j$:

$$p_{j,i}^r = \frac{n(E_i)}{N_r} \quad (26)$$

where $n(E_i)$ is the number of times the event $E_i$ occurs in the runtime window $TW_r$; and $N_r$ is the total number of events that have occurred in the runtime window $TW_r$.

The probabilities are computed when the end of the runtime window is reached. The runtime window is a sliding time window.

In one implementation, the operations management server 132 constructs the model using machine learning techniques, such as the ID3, C4.5, and C5.0 tree-generation algorithms, and the operational status database described above to train a decision-tree model that is used to determine whether an object is in a normal or abnormal operational state. The runtime attributes can be the runtime distribution of the object or the significant events of the runtime distribution. Each path of the decision-tree model that leads from the root node to a leaf node defines a different rule for evaluating runtime attributes of an object and assigning an appropriate status label to the object.

Figure 25A:
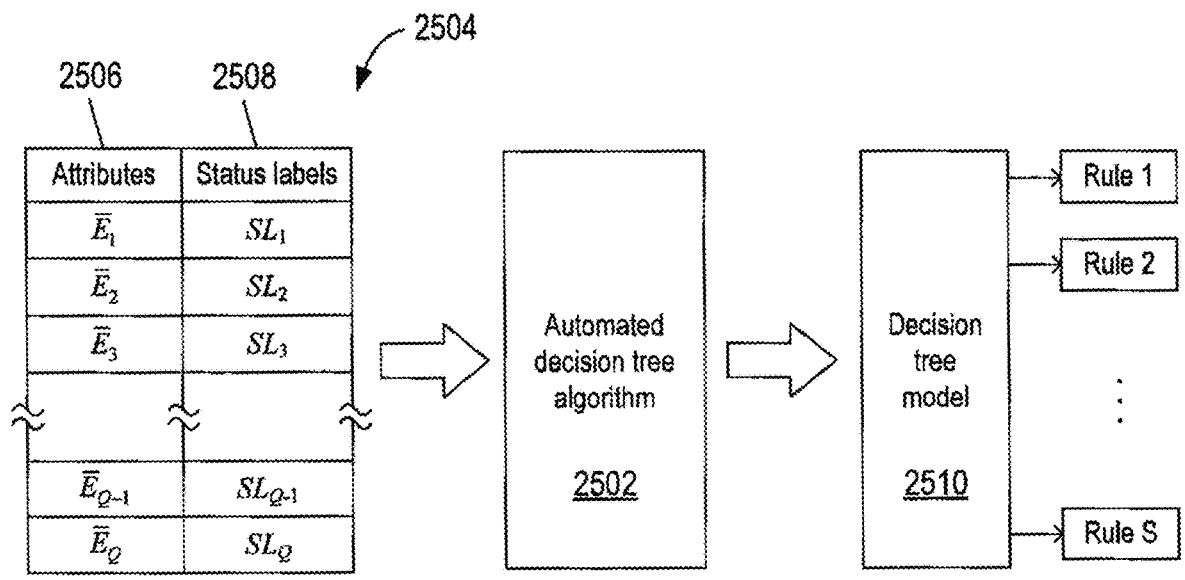
FIGS. 25A-25B show example processes for generating decision-tree models based on operational status databases.

FIG. 25A shows an example process for generating a decision-tree model based on an operational status database. Block 2502 represents an automated tree-generation algorithm, such as any one of the ID3, C4.5, and C5.0 tree-generation algorithms. In this example, table 2504 represents the contents of an operational status database that comprises significant events listed in column 2506. The significant events are denoted by $\overline{E}_q$, where q=1, 2, ..., Q. For example, $\overline{E}_i$ may represent the significant events $E_1$, $E_2$, $E_6$, $E_7$, $E_{11}$, and $E_{14}$ in the operational status database 2402 of FIG. 24. The events are attributes that are assigned status labels listed in column 2508. The status labels are denoted by $SL_q$, where q=1, 2, ..., Q. For example, $SL_1$ may represent the status label "normal" in the operational status database 2302 in FIG. 23A or represent the status label "0" in the operational status database 2402 in FIG. 24. The automated decision-tree algorithm 2502 uses the operational status database 2504 to train a decision-tree model 2510. Paths of the decision-tree model 2510 define rules that can be used to classify an object as normal or abnormal (i.e., performance problem) and generate a corresponding alert.

Figure 25B:
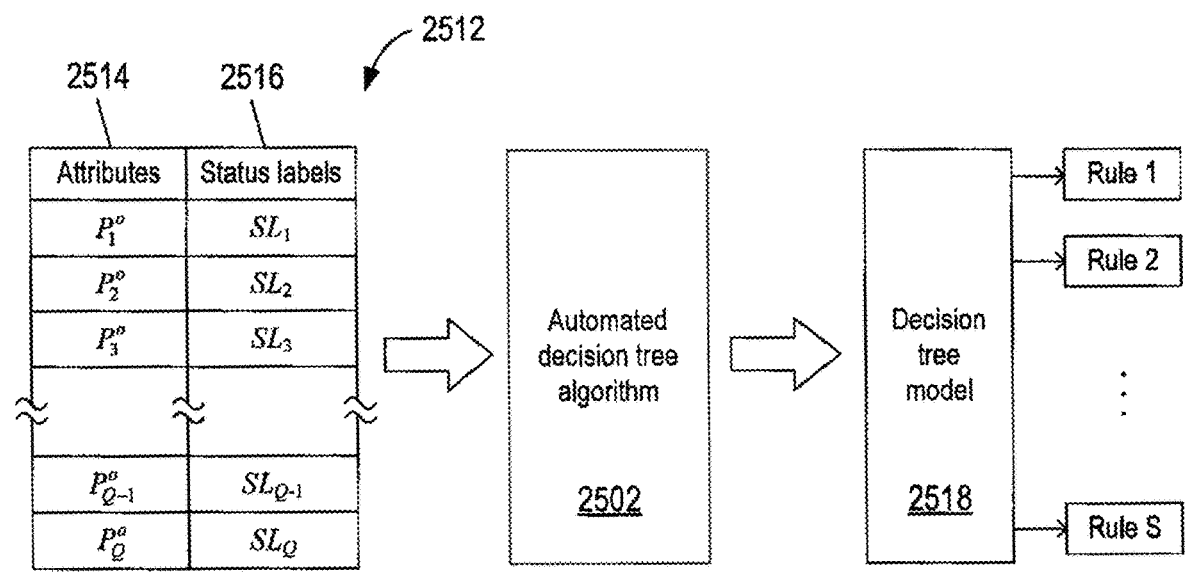

FIG. 25B shows an example process for generating a decision-tree model based on an operational status database. In this example, table 2512 represents the contents of an operational status database that comprises runtime distributions listed in column 2514. The event distributions are denoted by $P_q^o$, where q=1, 2, ..., Q. For example, $P_q^o$ may represent the event distribution in the operational status database 2402 of FIG. 24. The runtime distributions are attributes that are assigned status labels listed in column 2516. The automated decision-tree algorithm 2502 uses the operational status database 2512 to train a decision-tree model 2518 that can be used to classify the state of an object based on the runtime events associated with the object. Paths of the decision-tree model 2518 define rules that can be used to classify the state of an object and generate a corresponding alert.

Figure 26:
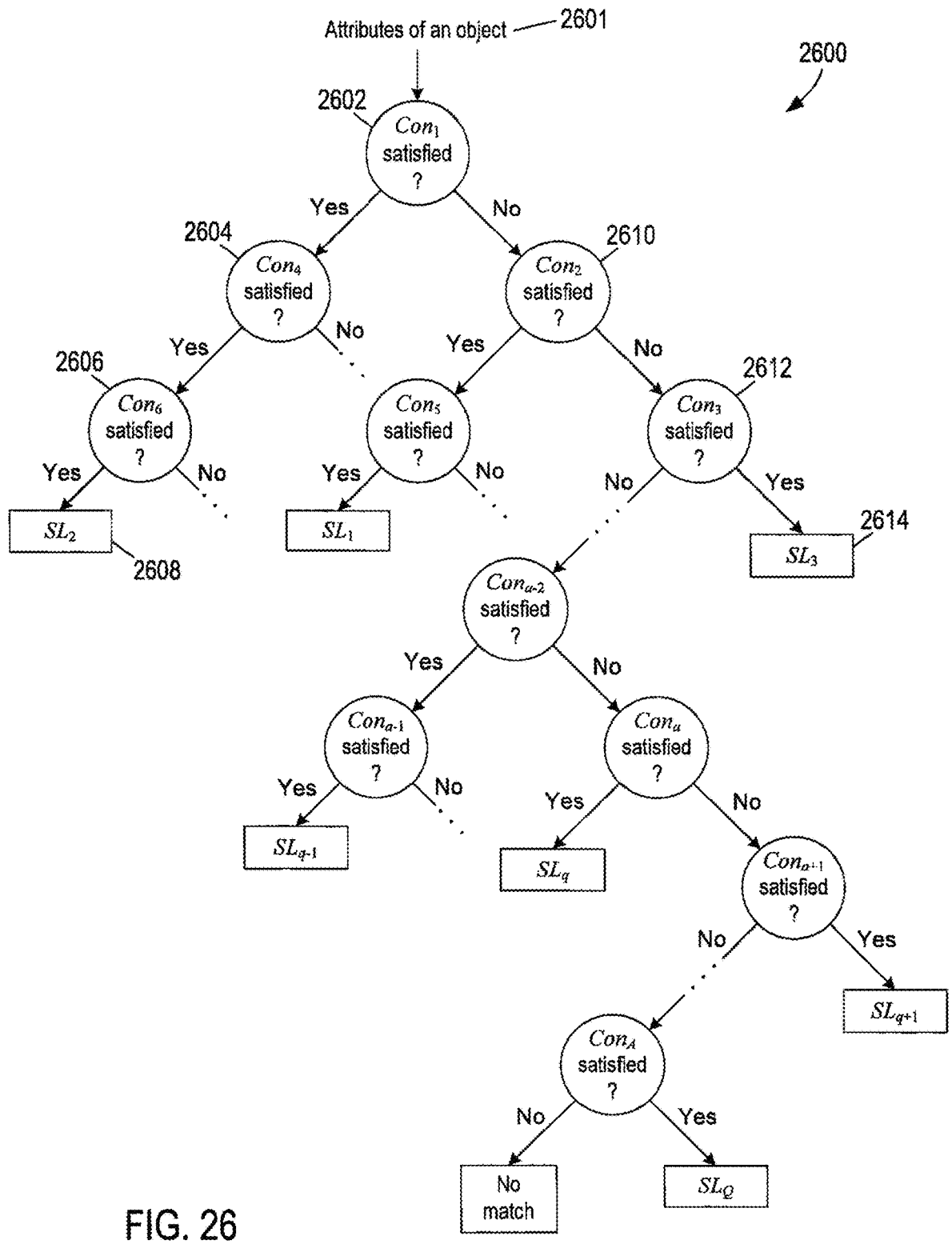
FIG. 26 shows an example of a decision-tree model.

FIG. 26 shows a general example of a decision-tree model 2600 output from a decision-tree algorithm represented by block 2502. Internal nodes are identified by circles and correspond to conditions denoted by $Con_a$, where a=1, 2, ..., A and A is number of conditions. Leaf nodes correspond to a status label applied to the object and are identified by rectangles. Paths of nodes correspond to rules for applying a status label to runtime attributes of an object 1601 determined in a runtime window $TW_r$. The runtime attributes could be significant events or a runtime distribution of the object. For example, nodes 2602, 2604, and 2606 correspond to conditions denoted by $Con_1$, $Con_4$, and $Con_6$ and leaf node 2608 corresponds to a status label $SL_2$. The conditions $Con_1$, $Con_4$, and $Con_6$ define a rule. When all three of the conditions $Con_1$, $Con_4$, and $Con_6$ are satisfied the rule is satisfied and the status label $SL_2$ is applied to the object 1601. Nodes 2602, 2610, and 2612 correspond to conditions denoted by $Con_1$, $Con_2$, and $Con_3$ and leaf node 2614 corresponds to a status label $SL_3$. The conditions $Con_3$ define a different rule. When the condition $Con_3$ is satisfied the rule is satisfied and the status label $SL_3$ is applied to the object 1601. When the status label identifies abnormal behavior (i.e., the object has a performance problem), an alert is triggered and displayed in a data center dashboard of a GUI the data center, such as the dashboard of a systems administrator or a data center tenant and identifies the object as an abnormally behaving object.

Figure 27:
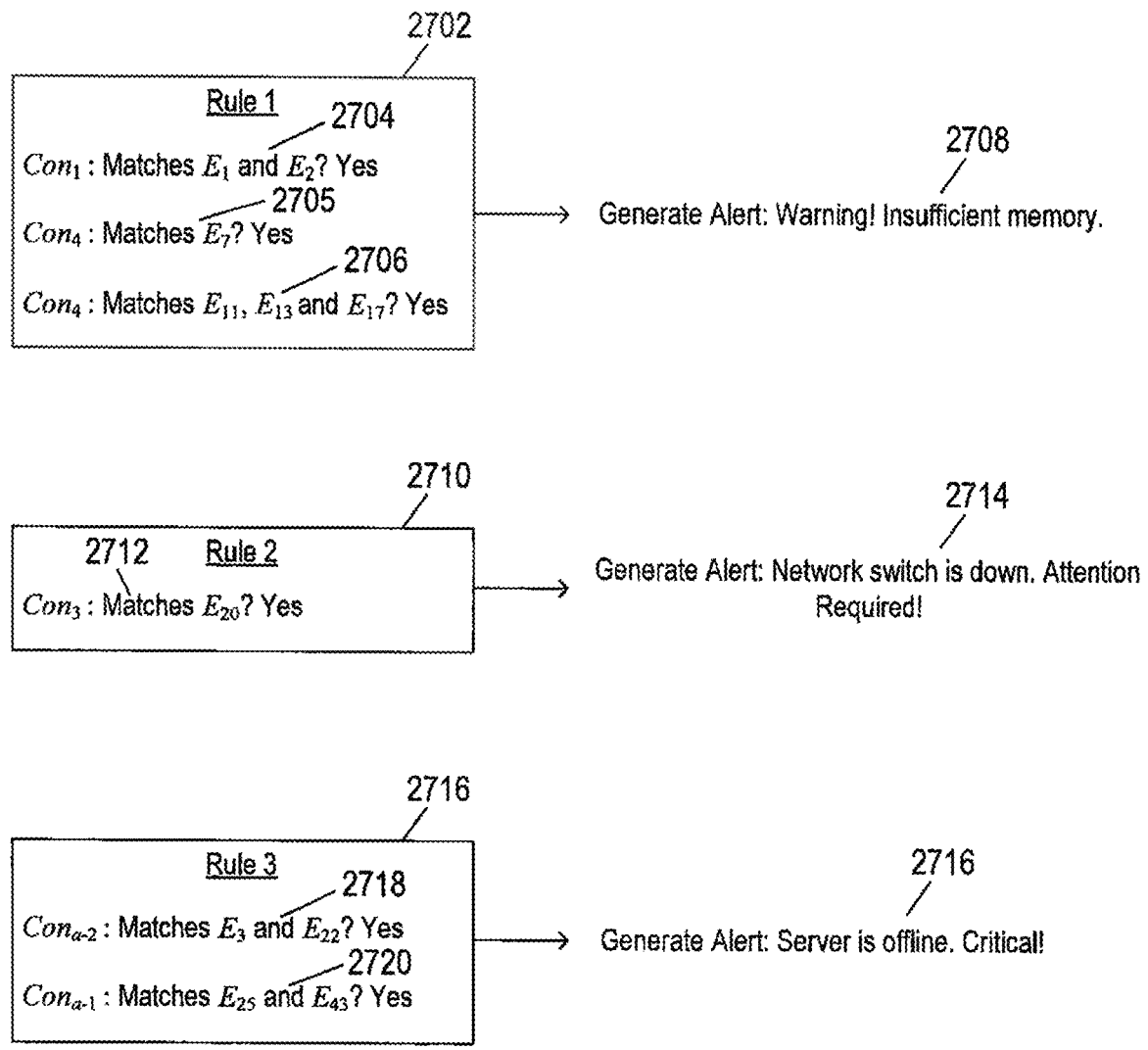
FIG. 27 shows examples of rules obtained from a decision-tree model.

FIG. 27 shows three example rules obtained from the decision-tree model in FIG. 26. Rule 1 2702 comprises conditions 2704-2706. In this example, when all three of the conditions 2704-2706 are satisfied, an alert is triggered identifying the type of problem 2708 associated with an object. Rule 2 2710 comprises one condition 2712. In this example, when the condition 2712 is satisfied, an alert is triggered identifying the type of problem 2714 associated with an object. Rule 3 2716 comprises two conditions 2718 and 2720. In this example, when the conditions 2718 and 2720 are satisfied, an alert is triggered identifying the type of problem 2716 associated with an object. When anyone of the rules Rule 1, Rule 2 and Rule 3 is satisfied, the operations management server 132 displays the corresponding alert in a data center dashboard of a GUI of the data center and identifies the object as an outlier object.

In another implementation, the operations management server 132 computes the distance between the runtime distribution $P_j^r$ and each of the event distributions in the set of outlier event distributions $\{P_1^o, P_2^o, \ldots, P_Q^o\}$. A distance is computed between the runtime distribution $P_j^r$ and each of the outlier event distributions as described above with reference to Equations (20a) and (20b). The operations management server 132 determines a minimum distance between the runtime distribution and each of the outlier event distributions. The object with the runtime performance problem is label with the same status label associated with the outlier event distribution that corresponds to $$\min_{q=1,\ldots,Q}\{Dist(P_q^o, P_j^r)\}.$$

Figure 28:
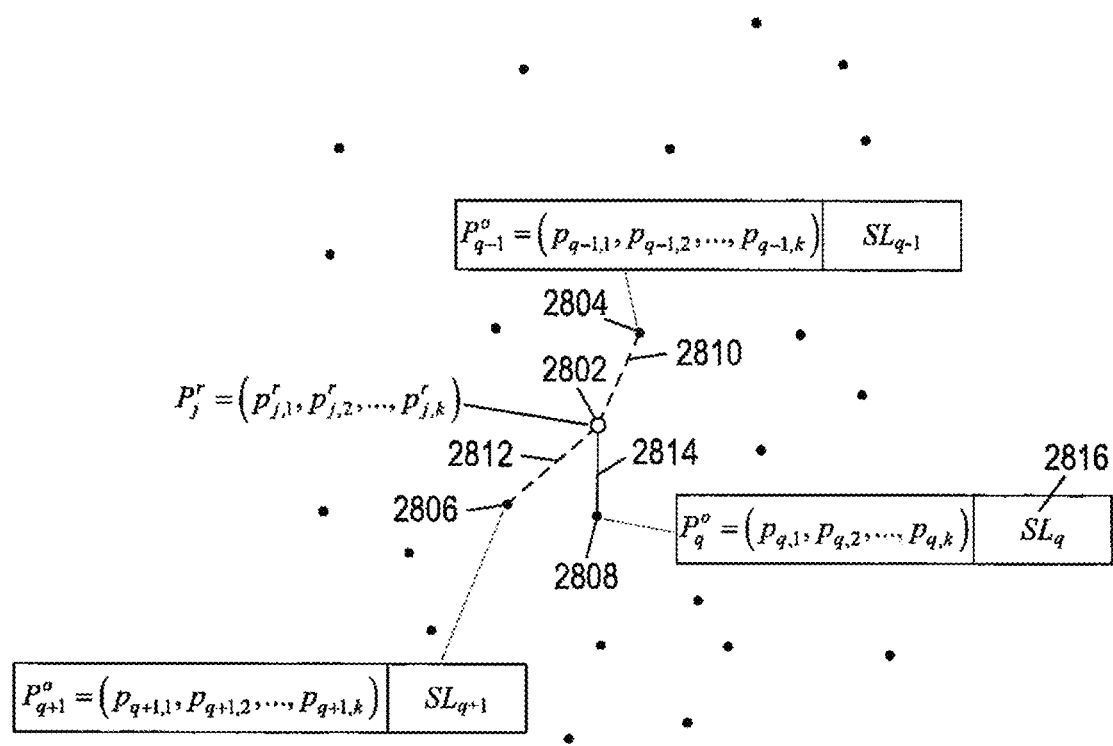
FIG. 28 shows an example of determining a nearest neighbor runtime distribution to a runtime distribution.

FIG. 28 shows an example of determining a nearest neighbor runtime distribution to a runtime distribution. In the example of FIG. 28, the k-dimensional space of the event distributions are represented by points in two dimensions. Open point 2802 represents runtime distribution $P_j^r$. Black points represent outlier event distributions in the set of outlier event distributions. Dashed lines 2810 and 2812 represent the second and third closest outlier event distributions to the runtime distribution $P_j^r$. Solid line 2814 represents the distance between the closest outlier event distribution $P_q^o$ to the runtime distribution $P_j^r$. The operations management server 132 assigns the status label $SL_i$ 2816 to the object.

In another implementation, the operations management server 132 constructs a model that uses K-nearest neighbor machine learning to determine whether an object is in a normal operational state or an abnormal operational state based on the clusters of status labeled event distributions obtained from hierarchical clustering described above with reference to FIGS. 18-21. The operations management server 132 determines the K-nearest neighbor event distributions to the runtime distribution $P_j^r$ of the object $O_j$. The object $O_j$ is classified as belonging to the same abnormal or normal operational state of the cluster with the largest number of nearest neighbor event distributions to the runtime distribution $P^r$.

Figure 29:
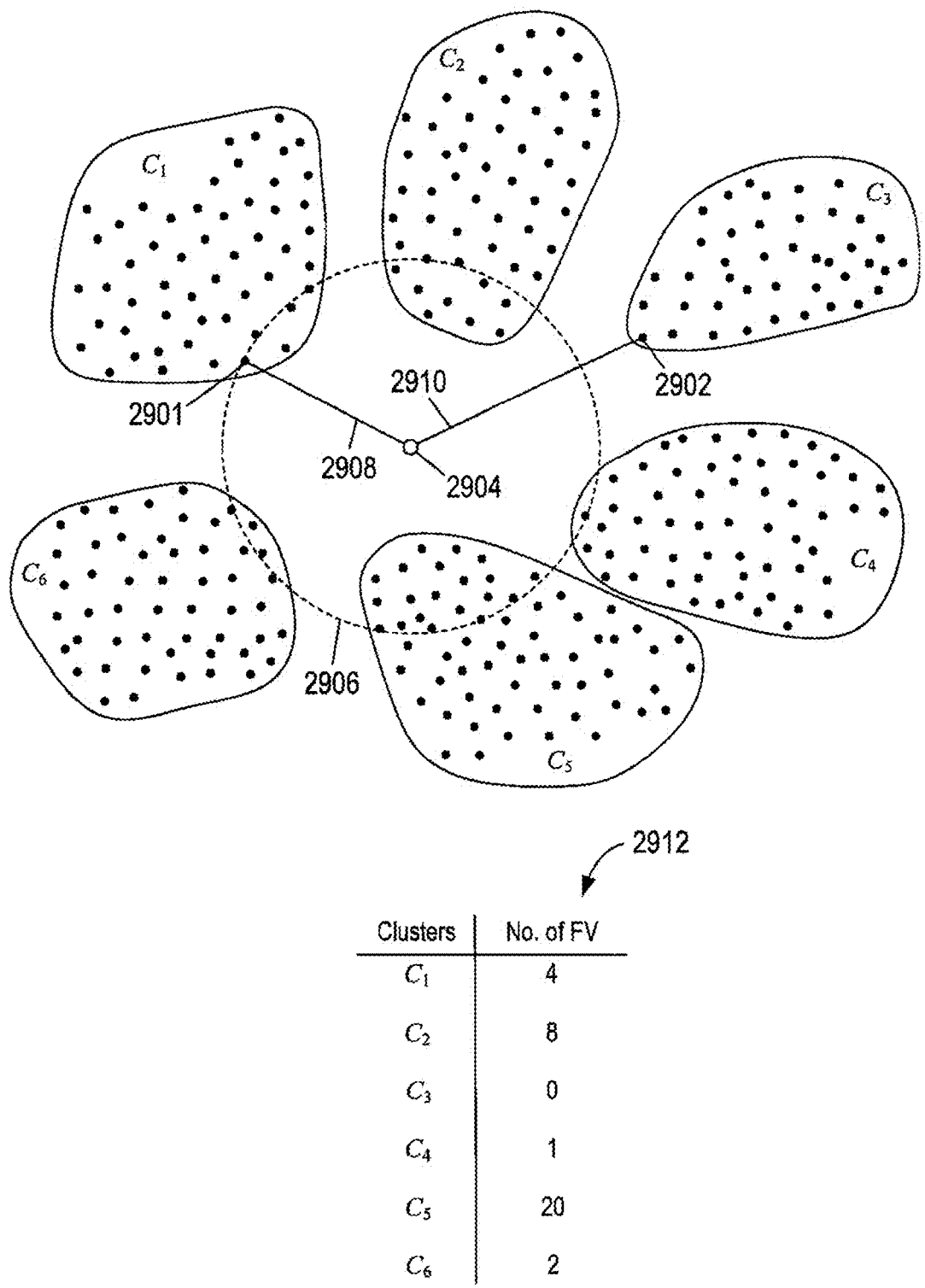
FIG. 29 shows an example of classifying a runtime distribution based on clusters of outlier event distributions.

FIG. 29 shows an example of classifying a runtime distribution of an object based on six clusters of outlier distributions denoted by $\{C_1, C_2, C_3, C_4, C_5, C_6\}$. The clusters have been classified as abnormal or normal status label as described above with reference to FIG. 22. The event distributions lie in a k-dimensional space but are illustrated in a two-dimensional space for the sake of illustration. Black points represent event distributions of the clusters. For example, black point 2901 represents an event distribution in the cluster $C_1$ and black point 2902 represents an event distribution in the cluster $C_3$. Open point 2904 represents the runtime distribution $P_j^r$ of an object $O_j$. A distance as described above with reference to Equations (20a) and (20b) is computed between the runtime distribution $P_j^r$ and each of the event distributions. In this example, K is set equal to 35. Dashed circle 2906 is centered on the runtime distributions $P_j^r$ and encloses the 35 nearest event distributions of the clusters to the runtime distribution $P_j^r$. For example, line 2908 represents the distance between the runtime distribution 2904 and the event distribution 2901, and line 2910 represents the distance between the runtime distribution 2904 and the event distribution 2902. The operations management server 132 counts the number of nearest neighbor runtime distributions of each cluster. Table 2912 shows a list of the number of nearest neighbor runtime distributions for each cluster. Cluster $C_5$ has 20 of the 35 nearest neighbor event distributions to the runtime distribution. As a result, the operations management server 132 labels the object $O_j$ with the status label associated with the cluster $C_5$.

The operations management server 132 builds and maintains a database of ranked event for automated root cause analysis and for recommending remedial measures to resolve performance problems with the objects $O_j$, where j=1, 2, . . . , J. For each runtime distribution associated with an abnormal object as described above with reference to FIGS. 27-29, the operations management server 132 computes a mismatch distribution between events of the baseline distribution for an abnormal object and corresponding events of the runtime distribution $P_j^r$ for the abnormal object. A mismatch distribution is computed as a component wise absolute difference between probabilities of the baseline distribution $P_j^b$ and probabilities of the runtime distribution $P_j^r$ as follows:

$$P_j^M = (|p_1^r - p_1^b|, \ldots, |p_i^r - p_i^b|, \ldots, |p_k^r - p_k^b|) \quad (27)$$

Figures 30, 31:
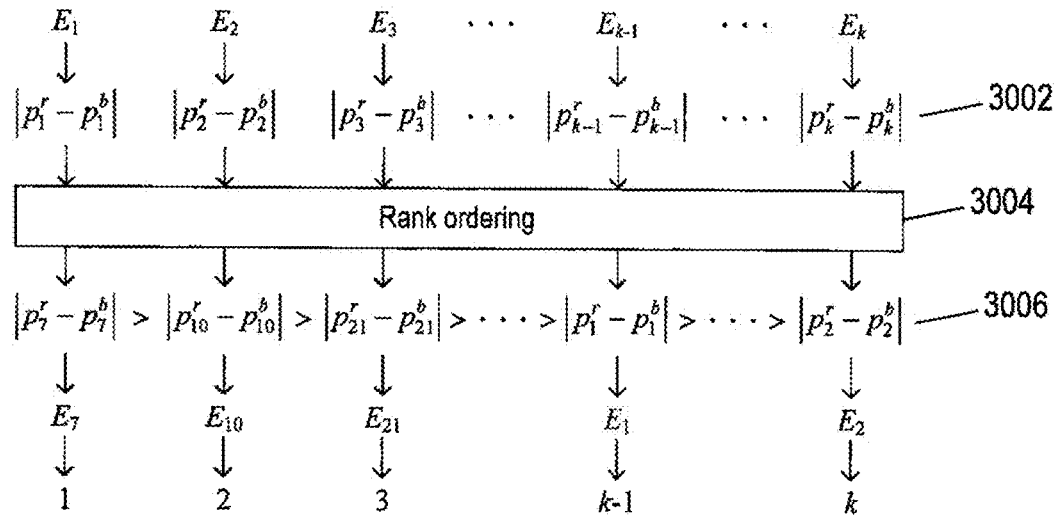
FIG. 30 shows an example of rank ordering events based on corresponding absolute differences of a mismatch distribution.
FIG. 31 shows an example of a record of rank list of events, root causes, and recommendations for an object.

Each absolute difference $|p_i^r - p_i^b|$, where i=1, 2, . . . , k, corresponds to an event $E_i$. The operations management server 132 rank orders the absolute differences from largest to smallest and assigns a event rank denoted by $r(E_i)$ to each event $E_i$, where, for example, $r(E_i)=1$ for the largest absolute difference and $r(E_i)=k$ for the smallest absolute difference. In other implementations, the event rank ordering is reversed with $r(E_i)=1$ for the smallest absolute difference and $r(E_i)=k$ for the largest absolute difference FIG. 30 shows an example of rank ordering events based on corresponding absolute differences of a mismatch distribution. As shown in FIG. 30, the events $E_i$, where i=1, 2, . . . , k, correspond to absolute differences 3002 of a mismatch distribution. In this example implementation, block 3004 represents the operation of rank ordering the absolute differences from largest to smallest based on the magnitudes of the absolute differences. FIG. 30 shows an example rank ordering 3006 of the absolute differences 3002. The events associated with the rank ordered absolute differences are assigned an event rank based on the order of the associated absolute differences. For example, event $E_7$ has the largest magnitude absolute difference $|p_7^r - p_7^b|$ and is assigned an event rank of 1 (i.e., $r(E_7)=1$): event $E_{10}$ has the second largest magnitude absolute difference $|p_{10}^r - p_{10}^b|$ and is assigned an event rank of 2 (i.e., $r(E_{10})=2$) and event $E_2$ has the smallest magnitude absolute difference $|p_2^r - p_2^b|$ and is assigned an event rank of k (i.e., $r(E_2)=k$). In another implementation, block 3004 performs the operation of rank ordering the absolute differences from smallest to largest based on the magnitudes of the absolute differences with the largest magnitude absolute difference assigned the value k and the smallest magnitude absolute difference assigned the value.

Each rank ordering of the absolute differences of a mismatch distribution corresponds to a particular root cause of a performance problem with an object in an abnormal state and a remedial measure that has been used to resolve, or correct, the performance problem in the past. For each object $O_j$ (i.e., j=1, 2, . . . , J), the operations management server 132 maintains a record of the rank ordering of events, the associated root causes of performance problems, and a recommendation of the remedial measures previously used to resolve the performance problems and stores the record in a root causes and recommendations database.

FIG. 31 shows an example of a record with lists of event ranks, root causes, and recommendations for an object $O_j$ is a table 3102. The object $O_j$ could be a VM, a container, an application, a distributed application, an application component, a server computer, or a network device. Each column corresponds to a different Rank list h, where h=1, 2, . . . , H and H is the number of previous time windows. Each list of event ranks includes a previously identified root cause of a performance problem associated with the list of event ranks denoted by $RC_h$, and a recommendation of a remedial measure previously used to correct the performance problem denoted by $Rec_h$. Each list of event ranks serves as a fingerprint for a particular kind of performance problem, root cause of the problem, and a recommendation for resolving the problem. For example, suppose the object $O_j$ is a distributed application and the table 3102 contains lists of event ranks, root causes of previously identified performance problems, and recommendations for resolving the performance problems The list of event ranks in column 3104 correspond to a particular problem with execution of the application which is identified by the root cause $RC_1$. For example, if the performance problem is a long delay in response time to client requests, the root cause $RC_1$ may be that a particular VM used to run an application component is not responding, and a previously used remedial measure to correct the problem is restarting the server computer that host the VM is denoted by the recommendation $Rec_1$.

The operations management server 132 uses the root causes and recommendations database to identify root causes of performance problems with objects based on a corresponding runtime distribution and quickly provides a recommendation for resolving the performance problem. The operations management server 132 determines a root cause and recommendation for resolving a performance problem with an object by determining a closest list of event ranks in the root causes and recommendations database to the runtime list of event ranks of the object. The root cause and recommendation for resolving the performance problem corresponds to the list of event ranks that is closest to the list of event ranks obtained from the runtime distribution of the object.

Figure 32A:
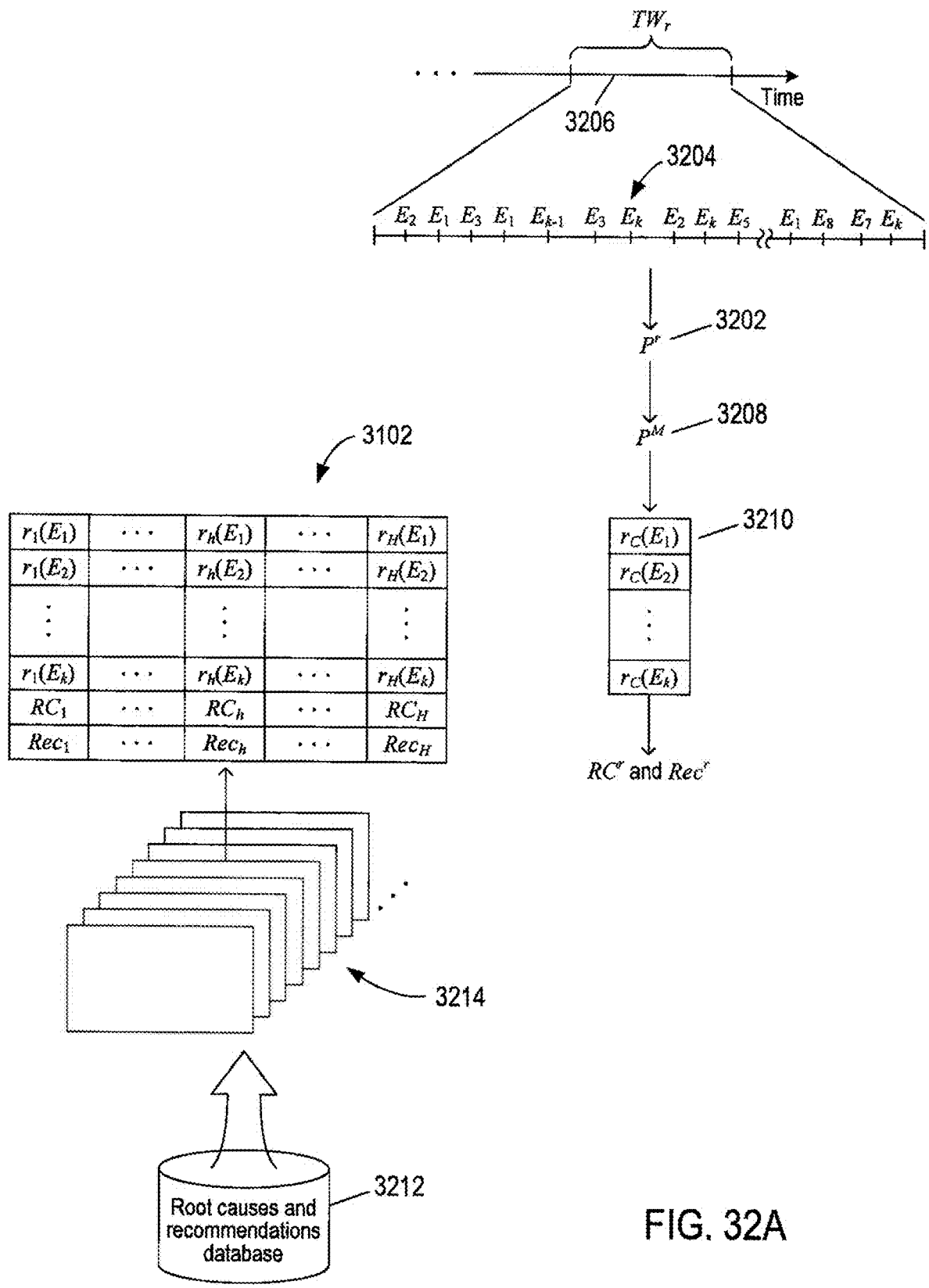
FIGS. 32A-32C show an example of using a root causes and recommendations database to identify a root cause of a performance problem with an object and provide a recommendation for resolving the problem.
Figure 32B:
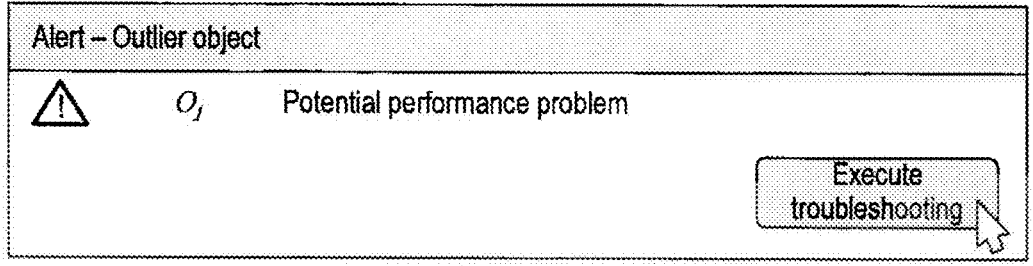
Figure 32C:
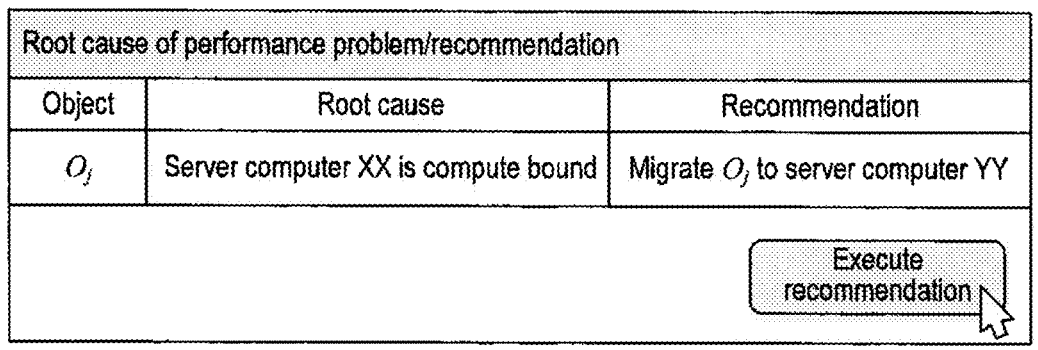

FIGS. 32A-32C show an example of using the root causes and recommendations database to identify a root cause of a performance problem with the object $O_j$ and provide a recommendation for resolving the problem. In FIG. 32A, a runtime distribution 3202 is computed from events 3204 recorded in a runtime window 3206 as described above with reference to Equation (25). Suppose the runtime distribution 3202 corresponds to an abnormal status label detected based on the rules in a decision-tree model described above with reference to FIGS. 26 and 27 or based on K-nearest neighbors to previously discovered abnormally behaving objects as described above with reference to FIGS. 28 and 29. The operations management server 132 displays an alert in a GUI. FIG. 32B shows an example GUI that displays an alert associated with the object $O_j$. The alert identifies the object $O_j$ as having a performance problem. The GUI includes a button that enables a user to execute the operation of determining the root cause and the recommendation for resolving the performance problem. Returning to FIG. 32A, when the user selects executes troubleshooting, a mismatch distribution 3208 is computed between the runtime distribution 3202 and a previously determined baseline distribution as described above with reference to Equation (27). The events recorded in the time window 3206 are rank ordered based on the absolute differences of the mismatch distribution as described above with reference FIG. 30 to obtain a runtime list of event ranks 3210. FIG. 32 shows a root causes and recommendations database 3212 that comprises records 3214 of list of event ranks, root causes, and recommendations for the objects $O_j$ of the data center, where J=1, 2, . . . , J. The operations management server 132 computes a rank list distance ("RLD") between the runtime list of event ranks 3210 and each of the list of event ranks in the record 3202 for the object $O_j$ (i.e., for h=1, 2, . . . , H) as follows:

$$RLD(h) = \frac{TotalRankVariance(h)}{MaxRankVariance} \quad (28)$$

where $$TotalRankVariance(h) = \sum_{i=1}^{k} |r_r(E_i) - r_h(E_i)|$$

The maximum rank variance in the denominator of Equation (27) is given by $$MaxRankVariance = \frac{k^2}{2}$$

when k is even, and is given by $$MaxRankVariance = \frac{(k-1)(k+1)}{2}$$

when k is odd. The operations management server 132 detects the minimum RLD:

$$RLD^* = \min\{RLD(1), \ldots, RLD(H)\} \quad (29)$$

If the minimum RLD satisfies the following condition:

$$RLD^* \leq Th_{RLD} \quad (30)$$

for an RLD threshold, then the root cause and recommendation associated with the list of event ranks that corresponds to the minimum RLD are identified as the root cause and the recommendation for resolving the performance problem with the object $O_j$. The root cause and the recommendation are displayed in a GUI of a systems administrator or a data center tenant. FIG. 32C shows an example GUI that describes an example root cause and recommendation for resolving the performance problem with the object $O_j$. In this example, the GUI includes a button that enables the execute remedial measures in accordance with recommendation. For example, the operations management server 132 may execute a script program that performs the operation of migrating the object $O_j$ to the server computer YY. The model and the root causes and recommendations database enable identification of abnormally behaving objects and a determination of a root cause of performance problems with the objects and provide a recommendation for revolving the problems in near real-time. Near real-time refers to the delay introduced by the automated processes described above for identifying an object as having a performance problem and determining a root cause of the performance problem and a recommendation for resolving the performance problem.

When the minimum RLD fails to satisfy the condition in Equation (30), an alert is displayed in a GUI indicating that the performance problem is unknown. When a root cause of the problem is determined and remedial measures have been determined for successfully resolving the performance problem, the record 3102 is updated by adding the list of event ranks 3210, the identified root cause of the performance problem, and the recommendation for resolving the problem to the record 3102. The record 3102 can be used to identify the root cause and display a recommendation for resolving the problem when the same problem is detecting in the future.

The methods described below with reference to FIGS. 33-39 are stored in one or more data-storage devices as machine-readable instructions that when executed by one or more processors of a computer system, such as the computer system shown in FIG. 40, determine the state of a data center object and, if the object exhibits abnormal behavior, identifies the root cause of the problem and provides a recommendation of resolving the problem. The computer-implemented method described below eliminates human errors in detecting a performance of an object in a data center and significantly reduces the amount time spent detecting problems from days and weeks to minutes and seconds, thereby providing immediate notification of a performance problem, providing a recommendation for correcting the problem, and enabling rapid execution of remedial measures that correct the problem.

Figure 33:
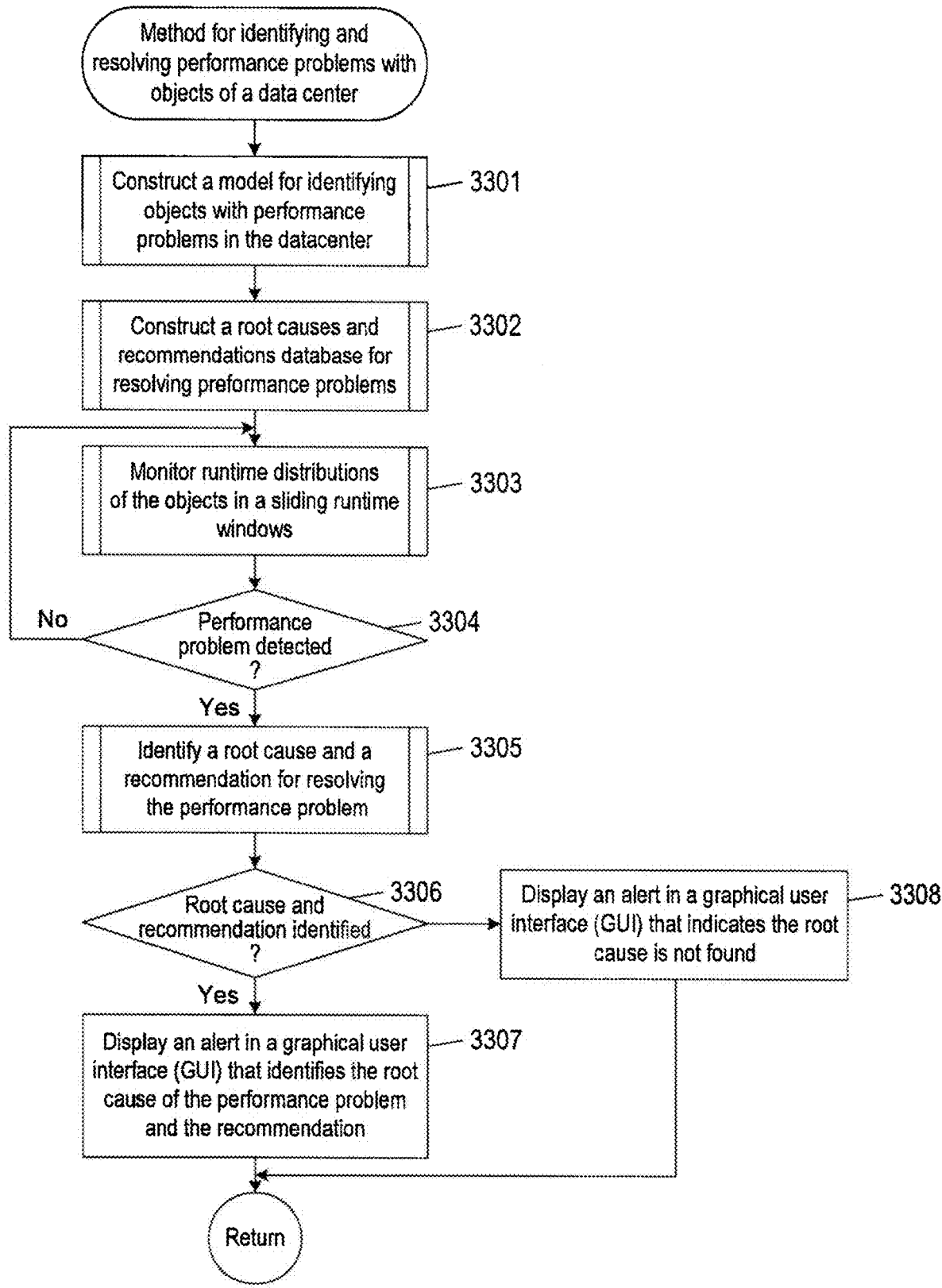
FIG. 33 is a flow diagram illustrating an example implementation of a method for identifying and resolving performance problems of objects of a data center.

FIG. 33 is a flow diagram illustrating an example implementation of a method for identifying and resolving performance problems of objects of a data center. In block 3301, a "construct a model for identifying outlier objects in the objects of the data center" procedure is performed. An example implementation of the "construct a model for identifying outlier objects in the objects of the data center" is described below with reference to FIG. 34 and FIG. 35. In block 3302, a "construct a root causes and recommendations database for resolving performance problems" procedure is performed. An example implementation of the "construct a root causes and recommendations database for resolving performance problems" is described below with reference to FIG. 36. In block 3303, a "monitor runtime distributions of the objects in a sliding time window" procedure is performed. An example implementation of the "monitor runtime distributions of the objects in a sliding time window" is described below with reference to FIG. 37 and FIG. 38. In decision block 3304, when a performance problem is detected with an object in block 3303 control flows to block 3305. Otherwise, control returns to block 3303. In block 3303, a "identify a root cause and a recommendation for resolving the performance problem" procedure is performed. An example implementation of the "identify a root cause and a recommendation for resolving the performance problem" are described below with reference to FIG. 39. In decision block 3306, when a root cause and recommendation for resolving the performance problem has been identified in the root causes and recommendations database, control block 3307. Otherwise, control flows to block 3308. In block 3307, an alert is displayed in a GUI, the alert identifying the object, the root cause of the performance problem, and the recommendation for resolving the performance problem as described above with reference to FIG. 32C. In block 3308, an alert is displayed in a GUI that indicates the root cause is not determined.

Figure 34:
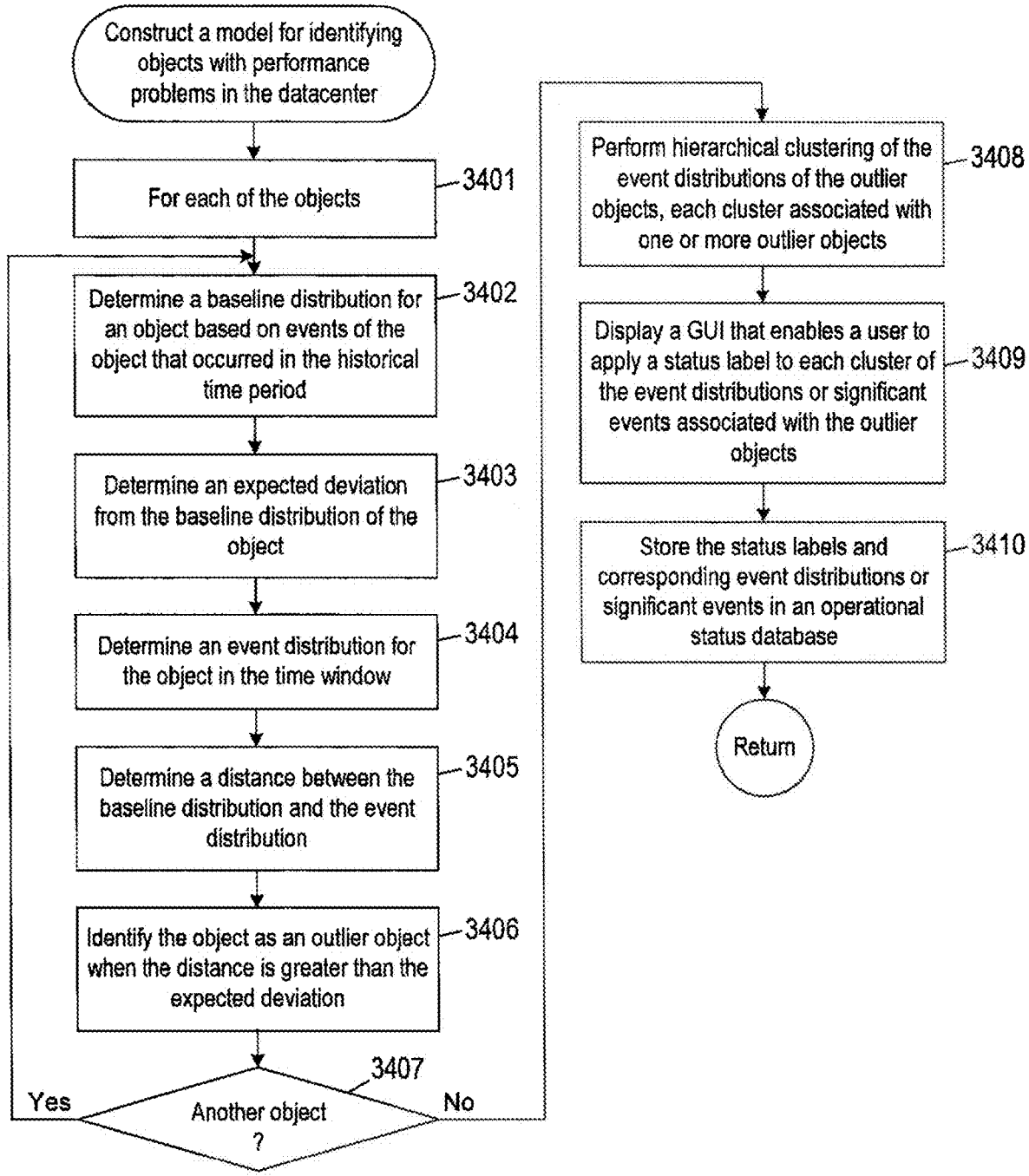
FIG. 34 is a flow diagram illustrating an example implementation of the "construct a model for identifying outlier objects in the objects of the data center" procedure performed in FIG. 33.

FIG. 34 is a flow diagram illustrating an example implementation of the "construct a model for identifying outlier objects in the objects of the data center" procedure performed in block 3301 of FIG. 33. A loop beginning with block 3401 repeats the operations represented by blocks 3402-3406 for each of the objects. In block 3402, a baseline distribution is determined for an object based on events of the object that occurred in the historical time period as described above with reference to FIGS. 14-15B. In block 3403, an expected deviation is determined from the baseline distribution of the object as described above with reference to Equation (21). In block 3404, an event distribution is determined for the object in the time window as described above with Equations (22)-(23). In block 3405, a distance is computed between the baseline distribution and the event distribution. In block 3406, the object is identified as an outlier object when the distance is greater than the expected deviation as described above with reference to Equation (24b). In decision block 3407, the operations represented by blocks 3401-3406 are repeated for another object. In block 3408, hierarchical clustering of the event distributions of the outlier objects, each cluster associated with one or more outlier objects is performed as described above with reference to FIGS. 18-21. In block 3409, a GUI that enables a user to apply a status label to each cluster of the event distributions or significant events associated with the outlier objects is displayed as described above with reference to FIG. 22. Each status label identifying a cluster as corresponding to a normal operational state or as corresponding to an abnormal operational state. In block 3410, the status labels and corresponding clusters of event distributions or significant events are stored in an operational status database.

Figure 35:
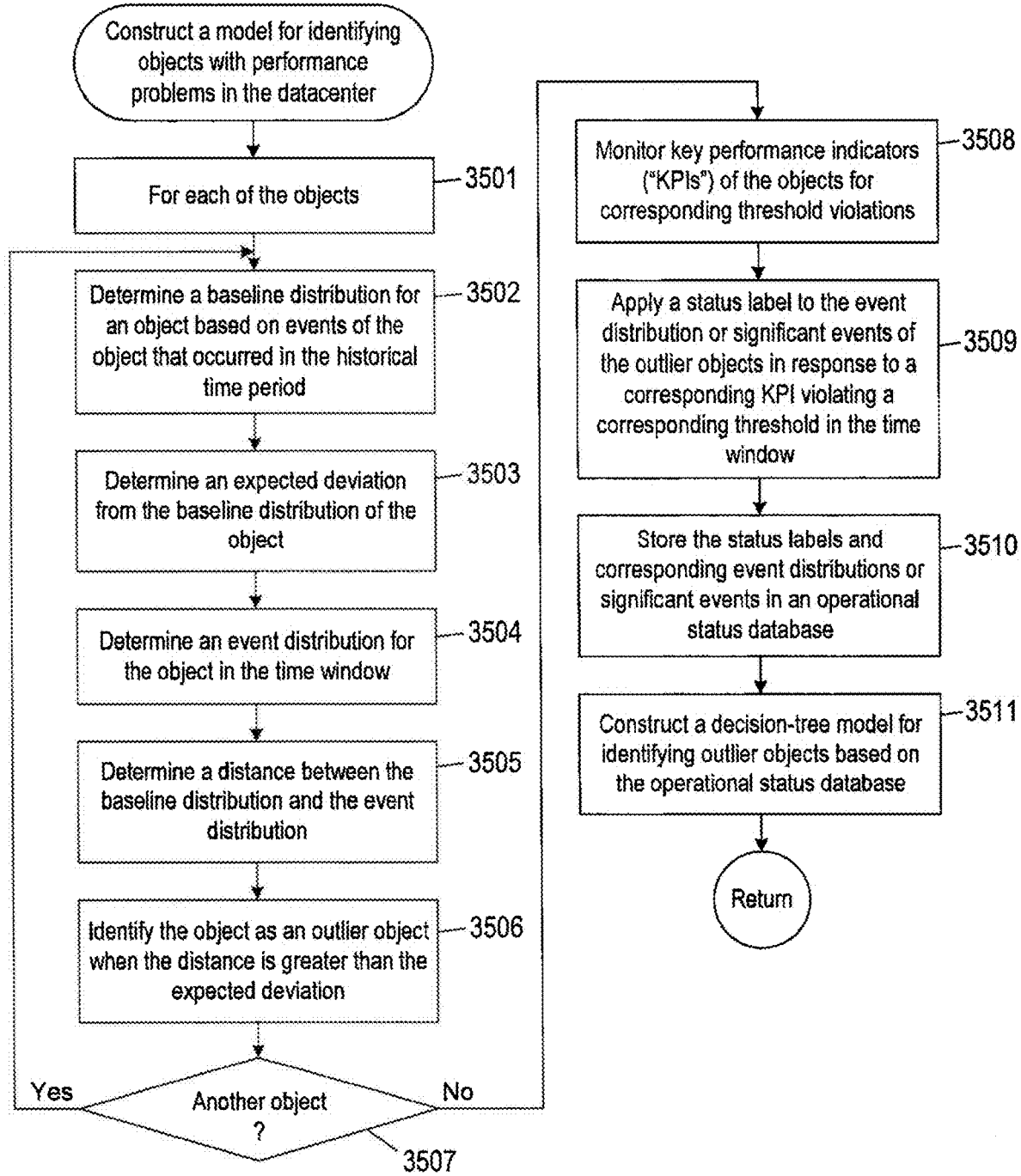
FIG. 35 is a flow diagram illustrating an example implementation of the "construct a model for identifying outlier objects in the objects of the data center" procedure performed in FIG. 33.

FIG. 35 is a flow diagram illustrating an example implementation of the "construct a model for identifying outlier objects in the objects of the data center" procedure performed in block 3301 of FIG. 33. A loop beginning with block 3501 repeats the operations represented by blocks 3502-3506 for each of the objects. In block 3502, a baseline distribution is determined for an object based on events of the object that occurred in the historical time period as described above with reference to FIGS. 14-15B. In block 3503, an expected deviation is determined from the baseline distribution of the object as described above with reference to Equation (21). In block 3504, an event distribution is determined for the object in the time window as described above with Equations (22)-(23). In block 3505, a distance is computed between the baseline distribution and the event distribution. In block 3506, the object is identified as an outlier object when the distance is greater than the expected deviation as described above with reference to Equation (24b). In decision block 3507, the operations represented by blocks 3501-3506 are repeated for another object. In block 3508, key performance indicators ("KPIs") of the objects are monitored for corresponding threshold violations as described above with reference to FIG. 24. In block 3509, a status label is applied to the event distribution or significant events of the outlier objects in response to a corresponding KPI violating a corresponding threshold in the time window as described above with reference to FIG. 24. In block 3510, the status labels and corresponding clusters of event distributions or significant events are stored in an operational status database. In block 3511, a decision-tree model for identifying outlier objects based on the operational status database is constructed as described above with reference to FIGS. 25A-253.

Figure 36:
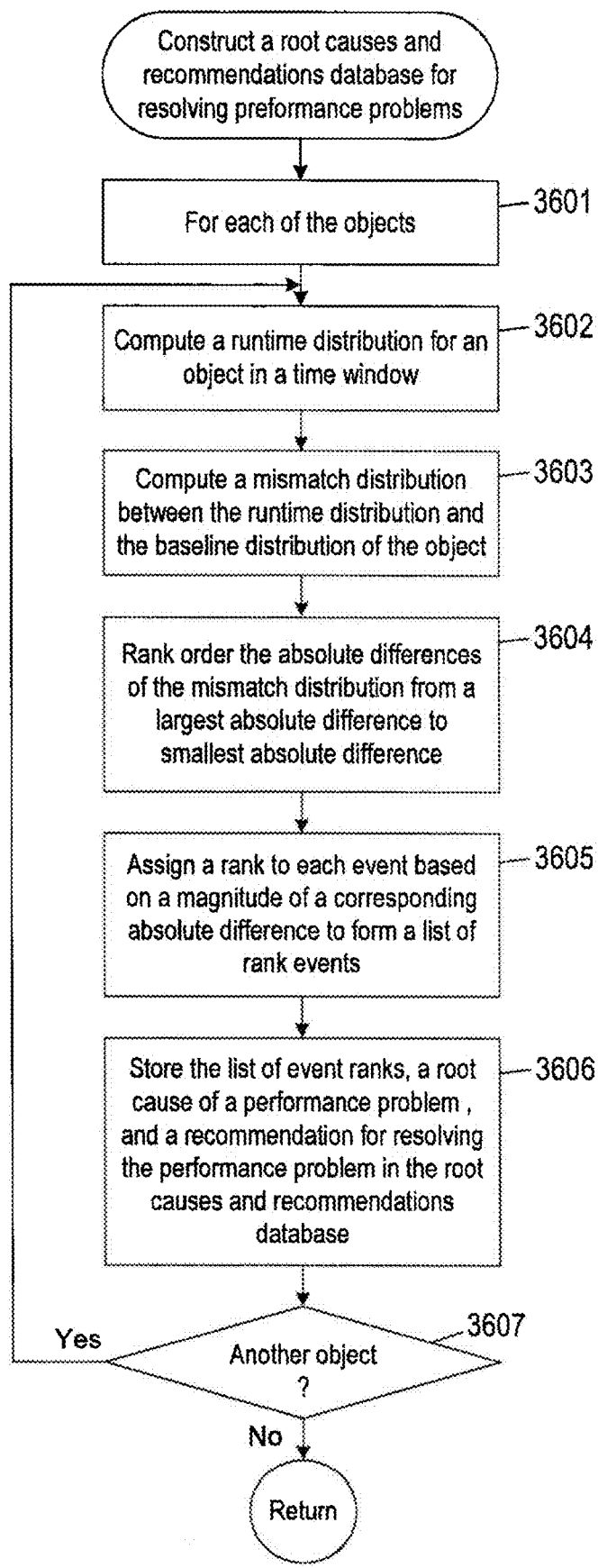
FIG. 36 is a flow diagram illustrating an example implementation of the "monitor runtime distributions of the objects in a sliding time window" procedure performed in FIG. 33.

FIG. 36 is a flow diagram illustrating an example implementation of the "monitor runtime distributions of the objects in a sliding time window" procedure performed in block 3303 of FIG. 33. A loop beginning with block 3601 repeats the operations represented by blocks 3602-3606 for each of the objects. In block 3602, a runtime distribution is computed from events associated with an object. In block 3603, a mismatch distribution is computed between the runtime distribution and the baseline distribution of the object as described above with reference to Equation (27). In block 3604, the absolute differences of the mismatch distribution are rank ordered as described above with reference to FIG. 30. In block 3605, a rank is assigned to each event based on a magnitude of a corresponding absolute difference to form a list of rank events. In block 3606, the list of event ranks, a root cause of a performance problem associated with the list of event ranks, and a recommendation for resolving the performance problem are stored in the root causes and recommendations database to FIG. 31. In decision block 3607, the operations represented by blocks 3602-3606 are repeated for another object.

Figure 37:
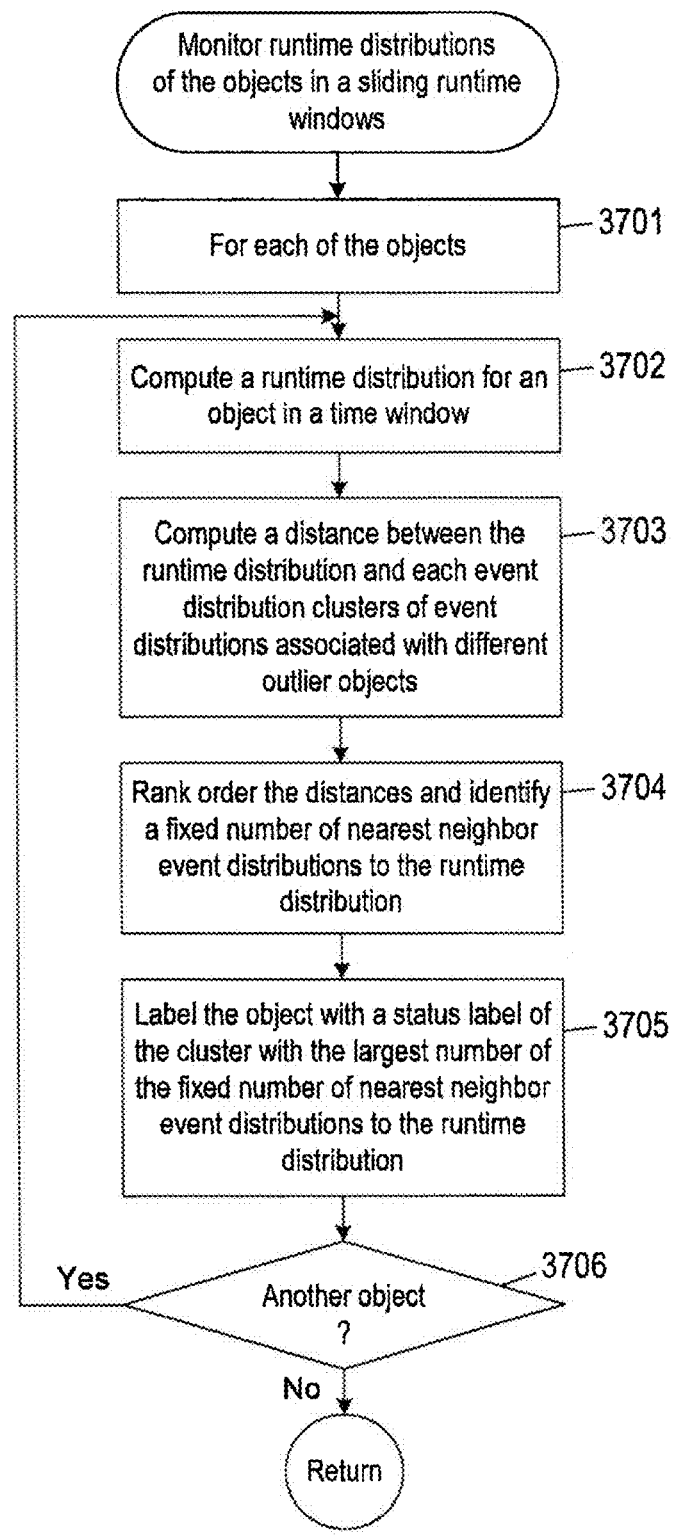
FIG. 37 is a flow diagram illustrating an example implementation of the "monitor runtime distributions of the objects in a sliding time window" procedure performed in FIG. 33.

FIG. 37 is a flow diagram illustrating an example implementation of the "monitor runtime distributions of the objects in a sliding time window" procedure performed in block 3303 of FIG. 33. A loop beginning with block 3701 repeats the operations represented by blocks 3702-3705 for each of the objects. In block 3702, a runtime distribution of events associated with an object in a runtime window is computed. In block 3703, a distance is computed between the runtime distribution and each of the event distributions of clusters of event distributions. Each cluster has a status label that identifies the event distributions of the cluster as corresponding to an abnormal operational state as described above with reference to FIG. 22. In block 3704, the distances are rank ordered and a fixed number of nearest neighbor event distributions to the runtime distribution are determined as describe above with reference FIG. 29. In block 3705, the object is label with a status label of the cluster with a largest number of the fixed number of nearest neighbor event distributions to the runtime distribution as described above with reference to FIG. 29. In decision block 3706, the operations represented by blocks 3702-3705 are repeated for another object.

Figure 38:
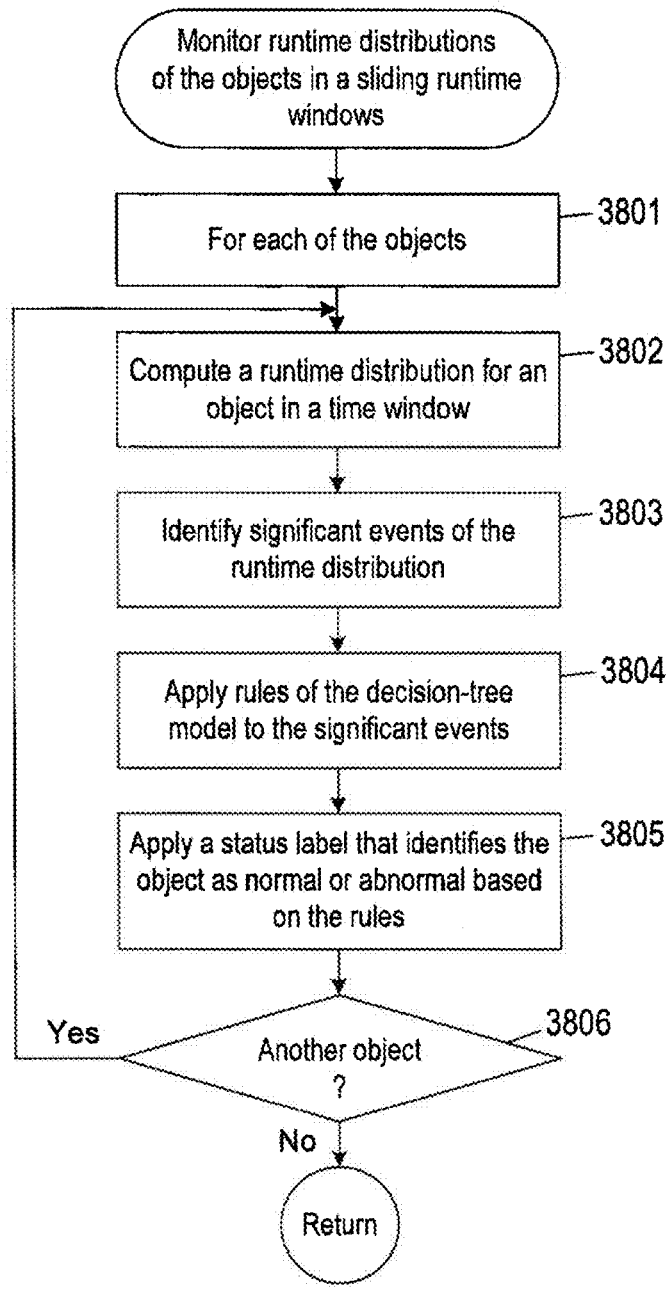
FIG. 38 is a flow diagram illustrating an example implementation of the "monitor runtime distributions of the objects in a sliding time window" procedure performed in FIG. 33.

FIG. 38 is a flow diagram illustrating an example implementation of the "monitor runtime distributions of the objects in a sliding time window" procedure performed in block 3303 of FIG. 33. A loop beginning with block 3801 repeats the operations represented by blocks 3802-3805 for each of the objects. In block 3802, a runtime distribution of events associated with an object in a runtime window is computed. In block 3803, significant events of the runtime distribution are identified as described above with reference to FIG. 22. In block 3804, rules of a decision-tree model are applied to the significant events of the object to identify to status label the object as described above with reference to FIGS. 26 and 27. In block 3805, the status label that identifies the object as being in a normal operational state or in an abnormal operational state based on the rules is applied to the object. In decision block 3806, the operations represented by blocks 3802-3805 are repeated for another object.

Figure 39:
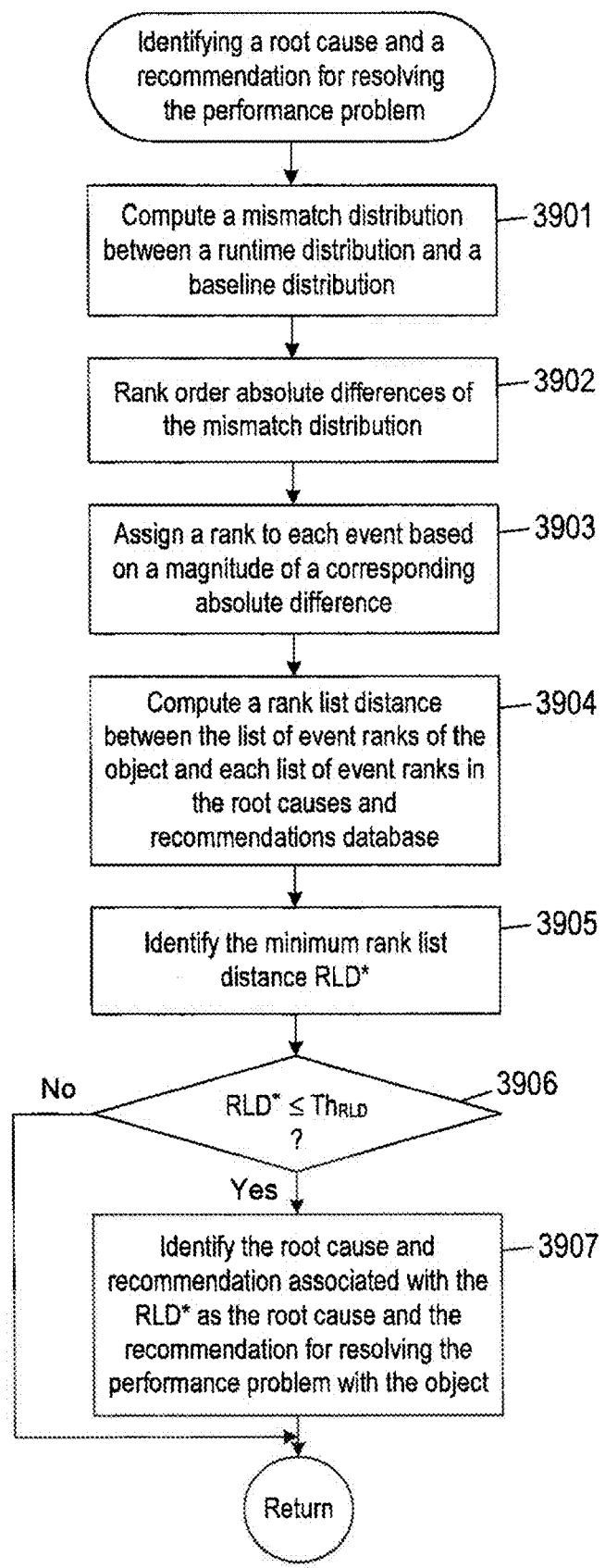
FIG. 39 is a flow diagram illustrating an example implementation of the "identify a root cause and a recommendation for resolving the performance problem" procedure performed in FIG. 33.

FIG. 39 is a flow diagram illustrating an example implementation of the "identify a root cause and a recommendation for resolving the performance problem" procedure performed in block 3305 of FIG. 33. In block 3901, a mismatch distribution is computed between a runtime distribution of events associated with the object and baseline distribution of the object as described above with reference to Equation (27). In block 3902, absolute differences of the mismatch distribution are rank ordered as described above with reference to FIG. 32A. In block 3903, a rank is assigned to each event based on a magnitude of a corresponding absolute difference to form a list of event ranks as described above with reference to FIG. 32A. In block 3904, a rank list distance between the list of event ranks of the object and each list of event ranks in the root causes and recommendations database as described above with reference to Equation (28). In block 3905, a minimum rank list distance is determined as described above with reference to Equation (30). In decision block 3906, when the rank list distance is less than a rank list distance threshold control flows to block 3907. Otherwise control flows to block 3308 in FIG. 33. In block 3907, the root cause and recommendation associated with the minimum rank list distance is identified as the root cause and the recommendation for resolving the performance problem with the object as described above with reference to Equation (30).

Figure 40:
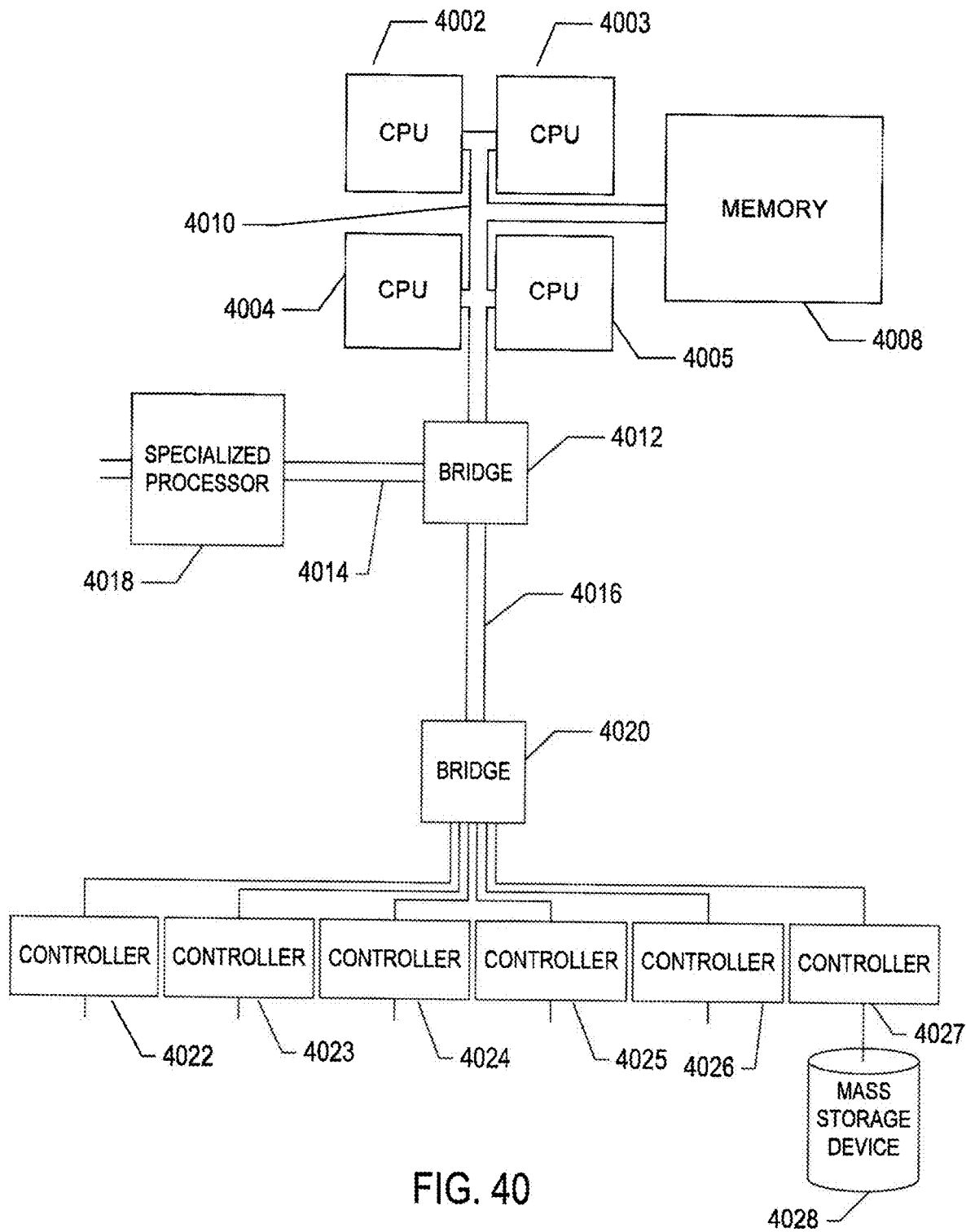
FIG. 40 shows an example architecture of a computer system used to perform automated methods and system for identifying and resolving root causes of performance problems in objects of a data center.

FIG. 40 shows an example architecture of a computer system that may be used to host the operations management server 132 and perform automated methods and system for identifying and resolving root causes of performance problems in objects of a data center. The computer system contains one or multiple central processing units ("CPUs") 4002-4005, one or more electronic memories 4008 interconnected with the CPUs by a CPU/memory-subsystem bus 4010 or multiple busses, a first bridge 4012 that interconnects the CPU/memory-subsystem bus 4010 with additional busses 4014 and 4016, or other types of high-speed interconnection media, including multiple, high-speed serial interconnects. The busses or serial interconnections, in turn, connect the CPUs and memory with specialized processors, such as a graphics processor 4018, and with one or more additional bridges 4020, which are interconnected with high-speed serial links or with multiple controllers 4022-4027, such as controller 4027, that provide access to various different types of computer-readable media, such as computer-readable medium 4028, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 4028 is a data-storage device, which may include, for example, electronic memory, optical or magnetic disk drive, a magnetic tape drive, USB drive, flash memory and any other such data-storage device or devices. The computer-readable medium 4028 is used to store machine-readable instructions that encode the computational methods described herein.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method stored in one or more data-storage devices and executed using one or more processors of a computer system for identifying and resolving performance problems of objects of a data center, the method comprising:
using machine learning to construct a model for identifying performance problems with the objects based on baseline distributions of events of the objects in a historical time period and event distributions of events of the objects in a time window located outside the historical time period;
constructing a root causes and recommendations database for resolving performance problems based on remedial measures previously performed for resolving performance problems;
using the model to monitor the objects for performance problems in a sliding runtime window;
in response to detecting an object with a performance problem, using the root causes and recommendations database to identify a root cause of the performance problem and generate a recommendation for resolving the performance problem; and
displaying an alert in a graphical user interface, the alert identifying the object, the root cause of the performance problem, and the recommendation for resolving the performance problem.

2. The method of claim 1 wherein using machine learning to construct the model comprises:
for each of the objects
determining a baseline distribution for an object based on events of the object that occurred in the historical time period,
determining an expected deviation from the baseline distribution of the object,
determining an event distribution for the object in the time window,
determining a distance between the baseline distribution and the event distribution, and
identifying the object as an outlier object when the distance is greater than the expected deviation;
performing hierarchical clustering of the event distributions of the outlier objects, each cluster associated with one or more outlier objects;
displaying a GUI that enables a user to apply a status label to each cluster of the event distributions or significant events associated with the outlier objects, each status label identifying a cluster as corresponding to a normal operational state or as corresponding to an abnormal operational state; and storing the status labels and corresponding clusters of event distributions or significant events in an operational status database.

3. The method of claim 1 wherein using machine learning to construct the model comprises:

for each of the objects determining a baseline distribution for an object based on events of the object that occurred in the historical time period, determining an expected deviation from the baseline distribution of the object, determining an event distribution for the object in the time window, determining a distance between the baseline distribution and the event distribution, and identifying the object as an outlier object when the distance is greater than the expected deviation;

monitoring key performance indicators ("KPIs") of the objects for corresponding threshold violations;

applying a status label to the event distribution or significant events of the outlier objects in response to a corresponding KPI violating a corresponding threshold in the time window;

storing the status labels and corresponding event distributions or significant events in an operational status database; and constructing a decision-tree model for identifying outlier objects based on the operational status database.

4. The method of claim 1 wherein constructing the root causes and recommendations database comprises:

for each of the objects for each location of a sliding runtime window computing a runtime distribution of events associated with an object;

computing a mismatch distribution between the runtime distribution and the baseline distribution of the object, the mismatch distribution comprising absolute differences between probabilities of the baseline distribution and probabilities of the runtime distribution and each absolute difference corresponding to an event;

rank ordering the absolute differences of the mismatch distribution from a largest absolute difference to smallest absolute difference;

assigning a rank to each event based on a magnitude of a corresponding absolute difference to form a list of rank events; and storing the list of event ranks, a root cause of a performance problem associated with the list of event ranks, and a recommendation for resolving the performance problem in the root causes and recommendations database.

5. The method of claim 1 wherein using the model to monitor the objects for performance problems in the sliding runtime window comprises:

for each of the objects computing a runtime distribution of events associated with an object in a runtime window, computing a distance between the runtime distribution and each of the event distributions of clusters of event distributions, each cluster having a status label that identifies the event distributions of the cluster as corresponding to an abnormal operational state, rank ordering the distances and identifying a fixed number of nearest neighbor event distributions to the runtime distribution, and labeling the object with a status label of the cluster with a largest number of the fixed number of nearest neighbor event distributions to the runtime distribution, the status label identifying the object as being in a normal operational state or in an abnormal operational state.

6. The method of claim 1 wherein using the model to monitor the objects for performance problems in the sliding runtime window comprises:

for each of the objects computing a runtime distribution of events associated with an object in a runtime window, identifying significant events of the runtime distribution, applying rules of a decision-tree model to the significant events of the object to identify to status label the object, and applying the status label that identifies the object as being in a normal operational state or in an abnormal operational state based on the rules.

7. The method of claim 1 wherein using the root causes and recommendations database to identify the root cause of the performance problem and generate the recommendation for resolving the performance problem comprises:

computing a mismatch distribution between a runtime distribution of events associated with the object and baseline distribution of the object, the mismatch distribution comprising absolute differences between probabilities of the baseline distribution and probabilities of the runtime distribution and each absolute difference corresponding to an event;

rank ordering the absolute differences of the mismatch distribution from a largest absolute difference to a smallest absolute difference;

assigning a rank to each event based on a magnitude of a corresponding absolute difference to form a list of event ranks;

computing a rank list distance between the list of event ranks of the object and each list of event ranks in the root causes and recommendations database;

if the rank list distance is less than a rank list distance threshold, identifying the root cause and recommendation associated with the minimum rank list distance as the root cause and the recommendation for resolving the performance problem with the object; and if the rank list distance is greater than the rank list distance threshold, generating an alert in a GUI indicating that the root cause and the recommendation for resolving the performance problem with the object is undetermined.

8. A computer system for identifying runtime problems with objects of a data center, the computer system comprising:

one or more processors;

one or more data-storage devices; and machine-readable instructions stored in the one or more data-storage devices that when executed using the one or more processors control the system to performance operations comprising:

using machine learning to construct a model for identifying performance problems with the objects based on baseline distributions of events of the objects in a historical time period and event distributions of events of the objects in a time window located outside the historical time period;

constructing a root causes and recommendations database for resolving performance problems based on remedial measures previously performed for resolving performance problems;

using the model to monitor the objects for performance problems in a sliding runtime window;

in response to detecting an object with a performance problem, using the root causes and recommendations database to identify a root cause of the performance problem and generate a recommendation for resolving the performance problem; and displaying an alert in a graphical user interface, the alert identifying the object, the root cause of the performance problem, and the recommendation for resolving the performance problem.

9. The system of claim 8 wherein using machine learning to construct the model comprises:

for each of the objects
determining a baseline distribution for an object based on events of the object that occurred in the historical time period,
determining an expected deviation from the baseline distribution of the object,
determining an event distribution for the object in the time window,
determining a distance between the baseline distribution and the event distribution, and
identifying the object as an outlier object when the distance is greater than the expected deviation;

performing hierarchical clustering of the event distributions of the outlier objects, each cluster associated with one or more outlier objects;

displaying a GUI that enables a user to apply a status label to each cluster of the event distributions or significant events associated with the outlier objects, each status label identifying a cluster as corresponding to a normal operational state or as corresponding to an abnormal operational state; and storing the status labels and corresponding clusters of event distributions or significant events in an operational status database.

10. The system of claim 8 wherein using machine learning to construct the model comprises:

for each of the objects
determining a baseline distribution for an object based on events of the object that occurred in the historical time period,
determining an expected deviation from the baseline distribution of the object,
determining an event distribution for the object in the time window,
determining a distance between the baseline distribution and the event distribution, and
identifying the object as an outlier object when the distance is greater than the expected deviation;

monitoring key performance indicators ("KPIs") of the objects for corresponding threshold violations;

applying a status label to the event distribution or significant events of the outlier objects in response to a corresponding KPI violating a corresponding threshold in the time window;

storing the status labels and corresponding event distributions or significant events in an operational status database; and constructing a decision-tree model for identifying outlier objects based on the operational status database.

11. The system of claim 8 wherein constructing the root causes and recommendations database comprises:

for each of the objects
for each location of a sliding runtime window
computing a runtime distribution of events associated with an object;
computing a mismatch distribution between the runtime distribution and the baseline distribution of the object, the mismatch distribution comprising absolute differences between probabilities of the baseline distribution and probabilities of the runtime distribution and each absolute difference corresponding to an event;
rank ordering the absolute differences of the mismatch distribution from a largest absolute difference to smallest absolute difference;
assigning a rank to each event based on a magnitude of a corresponding absolute difference to form a list of rank events; and
storing the list of event ranks, a root cause of a performance problem associated with the list of event ranks, and a recommendation for resolving the performance problem in the root causes and recommendations database.

12. The system of claim 8 wherein using the model to monitor the objects for performance problems in the sliding runtime window comprises:

for each of the objects
computing a runtime distribution of events associated with an object in a runtime window,
computing a distance between the runtime distribution and each of the event distributions of clusters of event distributions, each cluster having a status label that identifies the event distributions of the cluster as corresponding to an abnormal operational state,
rank ordering the distances and identifying a fixed number of nearest neighbor event distributions to the runtime distribution, and
labeling the object with a status label of the cluster with a largest number of the fixed number of nearest neighbor event distributions to the runtime distribution, the status label identifying the object as being in a normal operational state or in an abnormal operational state.

13. The system of claim 8 wherein using the model to monitor the objects for performance problems in the sliding runtime window comprises:

for each of the objects
computing a runtime distribution of events associated with an object in a runtime window,
identifying significant events of the runtime distribution,
applying rules of a decision-tree model to the significant events of the object to identify to status label the object, and
applying the status label that identifies the object as being in a normal operational state or in an abnormal operational state based on the rules.

14. The system of claim 8 wherein using the root causes and recommendations database to identify the root cause of the performance problem and generate the recommendation for resolving the performance problem comprises:

computing a mismatch distribution between a runtime distribution of events associated with the object and baseline distribution of the object, the mismatch distribution comprising absolute differences between probabilities of the baseline distribution and probabilities of the runtime distribution and each absolute difference corresponding to an event;
rank ordering the absolute differences of the mismatch distribution from a largest absolute difference to a smallest absolute difference;
assigning a rank to each event based on a magnitude of a corresponding absolute difference to form a list of event ranks;
computing a rank list distance between the list of event ranks of the object and each list of event ranks in the root causes and recommendations database;
if the rank list distance is less than a rank list distance threshold, identifying the root cause and recommendation associated with the minimum rank list distance as the root cause and the recommendation for resolving the performance problem with the object; and
if the rank list distance is greater than the rank list distance threshold, generating an alert in a GUI indicating that the root cause and the recommendation for resolving the performance problem with the object is undetermined.

15. A non-transitory computer-readable medium having instructions encoded thereon for enabling one or more processors of a computer system to perform operations comprising:
using machine learning to construct a model for identifying objects of a data center with performance problems based on baseline distributions of events of objects in a historical time period and event distributions of events of the objects in a time window located outside the historical time period;
constructing a root causes and recommendations database for resolving performance problems based on remedial measures previously performed for resolving performance problems;
using the model to monitor the objects for performance problems in a sliding runtime window;
in response to detecting an object with a performance problem, using the root causes and recommendations database to identify a root cause of the performance problem and generate a recommendation for resolving the performance problem; and
displaying an alert in a graphical user interface, the alert identifying the object, the root cause of the performance problem, and the recommendation for resolving the performance problem.

16. The medium of claim 15 wherein using machine learning to construct the model comprises:
for each of the objects
determining a baseline distribution for an object based on events of the object that occurred in the historical time period,
determining an expected deviation from the baseline distribution of the object,
determining an event distribution for the object in the time window,
determining a distance between the baseline distribution and the event distribution, and
identifying the object as an outlier object when the distance is greater than the expected deviation;
performing hierarchical clustering of the event distributions of the outlier objects, each cluster associated with one or more outlier objects;
displaying a GUI that enables a user to apply a status label to each cluster of the event distributions or significant events associated with the outlier objects, each status label identifying a cluster as corresponding to a normal operational state or as corresponding to an abnormal operational state; and
storing the status labels and corresponding clusters of event distributions or significant events in an operational status database.

17. The medium of claim 15 wherein using machine learning to construct the model comprises:
for each of the objects
determining a baseline distribution for an object based on events of the object that occurred in the historical time period,
determining an expected deviation from the baseline distribution of the object,
determining an event distribution for the object in the time window,
determining a distance between the baseline distribution and the event distribution, and
identifying the object as an outlier object when the distance is greater than the expected deviation;
monitoring key performance indicators ("KPIs") of the objects for corresponding threshold violations;
applying a status label to the event distribution or significant events of the outlier objects in response to a corresponding KPI violating a corresponding threshold in the time window;
storing the status labels and corresponding event distributions or significant events in an operational status database; and
constructing a decision-tree model for identifying outlier objects based on the operational status database.

18. The medium of claim 15 wherein constructing the root causes and recommendations database comprises:
for each of the objects
for each location of a sliding runtime window
computing a runtime distribution of events associated with an object;
computing a mismatch distribution between the runtime distribution and the baseline distribution of the object, the mismatch distribution comprising absolute differences between probabilities of the baseline distribution and probabilities of the runtime distribution and each absolute difference corresponding to an event;
rank ordering the absolute differences of the mismatch distribution from a largest absolute difference to smallest absolute difference;
assigning a rank to each event based on a magnitude of a corresponding absolute difference to form a list of rank events; and
storing the list of event ranks, a root cause of a performance problem associated with the list of event ranks, and a recommendation for resolving the performance problem in the root causes and recommendations database.

19. The medium of claim 15 wherein using the model to monitor the objects for performance problems in the sliding runtime window comprises:
for each of the objects
computing a runtime distribution of events associated with an object in a runtime window,
computing a distance between the runtime distribution and each of the event distributions of clusters of event distributions, each cluster having a status label that identifies the event distributions of the cluster as corresponding to an abnormal operational state, rank ordering the distances and identifying a fixed number of nearest neighbor event distributions to the runtime distribution, and labeling the object with a status label of the cluster with a largest number of the fixed number of nearest neighbor event distributions to the runtime distribution, the status label identifying the object as being in a normal operational state or in an abnormal operational state.

20. The medium of claim 15 wherein using the model to monitor the objects for performance problems in the sliding runtime window comprises:

for each of the objects computing a runtime distribution of events associated with an object in a runtime window, identifying significant events of the runtime distribution, applying rules of a decision-tree model to the significant events of the object to identify to status label the object, and applying the status label that identifies the object as being in a normal operational state or in an abnormal operational state based on the rules.

21. The medium of claim 15 wherein using the root causes and recommendations database to identify the root cause of the performance problem and generate the recommendation for resolving the performance problem comprises:

computing a mismatch distribution between a runtime distribution of events associated with the object and baseline distribution of the object, the mismatch distribution comprising absolute differences between probabilities of the baseline distribution and probabilities of the runtime distribution and each absolute difference corresponding to an event;

rank ordering the absolute differences of the mismatch distribution from a largest absolute difference to a smallest absolute difference;

assigning a rank to each event based on a magnitude of a corresponding absolute difference to form a list of event ranks;

computing a rank list distance between the list of event ranks of the object and each list of event ranks in the root causes and recommendations database;

if the rank list distance is less than a rank list distance threshold, identifying the root cause and recommendation associated with the minimum rank list distance as the root cause and the recommendation for resolving the performance problem with the object; and if the rank list distance is greater than the rank list distance threshold, generating an alert in a GUI indicating that the root cause and the recommendation for resolving the performance problem with the object is undetermined.

* * * * *